US012516388B2

(12) United States Patent
Williams et al.

(10) Patent No.: US 12,516,388 B2
(45) Date of Patent: Jan. 6, 2026

(54) BIOSENSORS FOR POLYKETIDE EXTENDER UNITS AND USES THEREOF

(71) Applicant: NORTH CAROLINA STATE UNIVERSITY, Raleigh, NC (US)

(72) Inventors: Gavin John Williams, Raleigh, NC (US); Robert Edward Kalkreuter, Palm Beach Gardens, FL (US); Alexandra Anderson Malico, Raleigh, NC (US); Melissa Mitchler, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 986 days.

(21) Appl. No.: 17/612,277

(22) PCT Filed: May 21, 2020

(86) PCT No.: PCT/US2020/033960
§ 371 (c)(1),
(2) Date: Nov. 18, 2021

(87) PCT Pub. No.: WO2020/237028
PCT Pub. Date: Nov. 26, 2020

(65) Prior Publication Data
US 2022/0243288 A1 Aug. 4, 2022

Related U.S. Application Data

(60) Provisional application No. 62/850,608, filed on May 21, 2019.

(51) Int. Cl.
*C12Q 1/6897* (2018.01)
*C12N 15/65* (2006.01)
*C12N 15/70* (2006.01)

(52) U.S. Cl.
CPC ........... *C12Q 1/6897* (2013.01); *C12N 15/65* (2013.01); *C12N 15/70* (2013.01)

(58) Field of Classification Search
CPC ...... C12Q 1/6897; C12N 15/65; C12N 15/70; C07K 14/32
See application file for complete search history.

(56) References Cited

U.S. PATENT DOCUMENTS

2004/0209270 A1 10/2004 Eberz et al.
2009/0181854 A1 7/2009 Thorson et al.
2019/0085416 A1 3/2019 Williams et al.
2019/0112598 A1 4/2019 Church et al.

FOREIGN PATENT DOCUMENTS

WO WO 2017196983 A1 * 11/2017
WO 2018/007526 A1 1/2018
WO 2018/035158 A1 2/2018

OTHER PUBLICATIONS

Whisstock et al. Quaterly Reviews of Biophysics, 2003, "Prediction of protein function from protein sequence and structure", 36(3): 307-340. (Year: 2003).*
Witkowski et al. Conversion of a beta-ketoacyl synthase to a malonyl decarboxylase by replacement of the active-site cysteine with glutamine, Biochemistry. Sep. 7, 1999;38(36):11643-50. (Year: 1999).*
Kisselev L., Polypeptide release factors in prokaryotes and eukaryotes: same function, different structure. Structure, 2002, vol. 10: 8-9. (Year: 2002).*
Albanesi, D., Reh, G., Guerin, M. E., Schaeffer, F., Debarbouille, M., Buschiazzo, A., Schujman, G. E., de Mendoza, D., and Alzari, P. M. (2013) Structural basis for feed-forward transcriptional regulation of membrane lipid homeostasis in *Staphylococcus aureus*, PLoS Pathog 9, e1003108.
Altschul, Stephen F., et al. "Basic local alignment search tool." Journal of molecular biology 215.3 (1990): 403-410.
Altschul, Stephen F., et al. "Gapped BLAST and PSI-BLAST: a new generation of protein database search programs." Nucleic acids research 25.17 (1997): 3389-3402.
Beaucage, S. L., and M. H. Caruthers. "Deoxynucleoside phosphoramidites—a new class of key intermediates for deoxypolynucleotide synthesis." Tetrahedron letters 22.20 (1981): 1859-1862.
Cai, W., and Zhang, W. (2018) Engineering modular polyketide synthases for production of biofuels and industrial chemicals, Curr. Opin. Biotechnol. 50, 32-38.
Carpenter, A. C., Paulsen, I. T., and Williams, T. C. (2018) Blueprints for biosensors: design, limitations, and applications, Genes (Basel) 9.
Chan, Y. A., Podevels, A. M., Kevany, B. M., and Thomas, M. G. (2009) Biosynthesis of polyketide synthase extender units, Nat. Prod. Rep. 26, 90.
Dahl, R. H., Zhang, F., Alonso-Gutierrez, J., Baidoo, E., Batth, T. S., Redding-Johanson, A. M., Petzold, C. J., Mukhopadhyay, A., Lee, T. S., Adams, P. D., and Keasling, J. D. (2013) Engineering dynamic pathway regulation using stress-response promoters, Nat. Biotechnol. 31, 1039-1046.
David, F., Nielsen, J., and Siewers, V. (2016) Flux control at the malonyl-CoA node through hierarchical dynamic pathway regulation in *Saccharomyces cerevisiae*, ACS Synth. Biol. 5, 224-233.
Dayem, L. C., Carney, J. R., Santi, D. V., Pfeifer, B. A., Khosla, C., and Kealey, J. T. (2002) Metabolic engineering of a methylmalonyl-CoA mutase-epimerase pathway for complex polyketide biosynthesis in *Escherichia coli*, Biochemistry 41, 5193-5201.

(Continued)

*Primary Examiner* — Iqbal H Chowdhury
(74) *Attorney, Agent, or Firm* — Meunier Carlin & Curfman LLC

(57) ABSTRACT

The present disclosure relates to biosensors and uses thereof for detecting polyketide extender units. Disclosed herein are biosensor systems and methods for detecting polyketide synthase extender units. In some aspects, disclosed herein is a biosensor system comprising: a first nucleic acid comprising a genetically modified fapR gene, wherein the nucleic acid comprises at least one genetic mutation when compared to the wild-type fapR gene, and wherein the first nucleic acid is operably linked to a first promoter; and a second nucleic acid comprising a reporter gene whose transcription is under the control of a second promoter which is regulated by the fapR transcription factor.

17 Claims, 8 Drawing Sheets

Specification includes a Sequence Listing.

(56) References Cited

OTHER PUBLICATIONS

Dillon, Shane C., and Alex Bateman. "The Hotdog fold: wrapping up a superfamily of thioesterases and dehydratases." BMC bioinformatics 5 (2004): 1-14.
Ellis, J. M., and Wolfgang, M. J. (2012) A genetically encoded metabolite sensor for malonyl-CoA, Chem. Biol. 19, 1333-1339.
Espah Borujeni, A., Channarasappa, A. S., and Salis, H. M. (2014) Translation rate is controlled by coupled trade-offs between site accessibility, selective RNA unfolding and sliding at upstream standby sites, Nucleic Acids Res. 42, 2646-2659.
Farasat, I., Kushwaha, M., Collens, J., Easterbrook, M., Guido, M., and Salis, H. M.(2014) Efficient search, mapping, and optimization of multi-protein genetic systems in diverse bacteria, Mol. Syst. Biol. 10, 731.
Fowler, Z. L., Gikandi, W. W., and Koffas, M. A. (2009) Increased malonyl coenzyme A biosynthesis by tuning the *Escherichia coli* metabolic network and its application to flavanone production, Appl. Environ. Microbiol. 75, 5831-5839.
Hansen, D. A., Rath, C. M., Eisman, E. B., Narayan, A. R., Kittendorf, J. D., Mortison, J. D., Yoon, Y. J., and Sherman, D. H. (2013) Biocatalytic synthesis of pikromycin, methymycin, neomethymycin, novamethymycin, and ketomethymycin, J. Am. Chem. Soc. 135, 11232-11238.
Henikoff, Steven, and Jorja G. Henikoff. "Amino acid substitution matrices from protein blocks." Proceedings of the National Academy of Sciences 89.22 (1992): 10915-10919.
Johnson, A. O., Gonzalez-Villanueva, M., Wong, L., Steinbuchel, A., Tee, K. L., Xu, P., and Wong, T. S. (2017) Design and application of genetically-encoded malonyl-CoA biosensors for metabolic engineering of microbial cell factories, Metab. Eng. 44, 253-264.
Karlin, Samuel, and Stephen F. Altschul. "Applications and statistics for multiple high-scoring segments in molecular sequences." Proceedings of the National Academy of Sciences 90.12 (1993): 5873-5877.
Kasey, C. M., Zerrad, M., Li, Y., Cropp, T. A., and Williams, G. J. (2018) Development of transcription factor-based designer macrolide biosensors for metabolic engineering and synthetic biology, ACS Synth. Biol. 7, 227-239.
Kasey, C., and Williams, G. J. (2018) Chapter 8: Customizing transcription-factor biosensors for modern biotechnology, In Modern Biocatalysis: Advances Towards Synthetic Biological Systems, pp. 205-233, The Royal Society of Chemistry. https://books.google.ro/books?id=47WrDwAAQBAJ&lpg=PA205&ots=vKGFvskid7&lr&pg=PA210#y=twopage&q&f=false.
Koryakina, I., and Williams, G. J. (2011) Mutant malonyl-CoA synthetases with altered specificity for polyketide synthase extender unit generation, ChemBioChem 12, 2289-2293.
Koryakina, I., McArthur, J. B., Draelos, M. M., and Williams, G. J. (2013) Promiscuity of a modular polyketide synthase towards natural and non-natural extender units, Org. Biomol. Chem. 11, 4449-4458.
Koryakina, I., McArthur, J., Randall, S., Draelos, M. M., Musiol, E. M., Muddiman, D. C., Weber, T., and Williams, G. J. (2013) Poly specific trans-acyltransferase machinery revealed via engineered acyl-CoA synthetases, ACS Chem. Biol. 8, 200-208.
Leonard, E., Yan, Y., Fowler, Z. L., Li, Z., Lim, C. G., Lim, K. H., and Koffas, M. A. (2008) Strain improvement of recombinant *Escherichia coli* for efficient production of plant flavonoids, Mol Pharm 5, 257-265.
Li, S., Si, T., Wang, M., and Zhao, H. (2015) Development of a synthetic malonyl-CoA sensor in *Saccharomyces cerevisiae* for intracellular metabolite monitoring and genetic screening, ACS Synth. Biol. 4, 1308-1315.
Li, Y., Zhang, W., Zhang, H., Tian, W., Wu, L., Wang, S., Zheng, M., Zhang, J., Sun, C., Deng, Z., Sun, Y., Qu, X., and Zhou, J. (2018) Structural basis of a broadly selective acyltransferase from the polyketide synthase of splenocin, Angew. Chem. Int. Ed. Engl. 57, 5823-5827.
Liu, D., Xiao, Y., Evans, B. S., and Zhang, F. (2015) Negative feedback regulation of fatty acid production based on a malonyl-CoA sensor-actuator, ACS Synth. Biol. 4, 132-140.
Lombo, F., Pfeifer, B., Leaf, T., Ou, S., Kim, Y. S., Cane, D. E., Licari, P., and Khosla, C. (2001) Enhancing the atom economy of polyketide biosynthetic processes through metabolic engineering, Biotechnol. Prog. 17, 612-617.
Martinez, M. A., Zaballa, M. E., Schaeffer, F., Bellinzoni, M., Albanesi, D., Schujman, G. E., Vila, A. J., Alzari, P. M., and de Mendoza, D. (2010) A novel role of malonyl-ACP in lipid homeostasis, Biochemistry 49, 3161-3167.
Matteucci, Mark Douglas, and M. Ho Caruthers. "Synthesis of deoxyoligonucleotides on a polymer support." Journal of the American Chemical Society 103.11 (1981): 3185-3191.
Mo, et al., (2011) Biosynthesis of the allylmalonyl-CoA extender unit for the FK506 polyketide synthase proceeds through a dedicated polyketide synthase and facilitates the mutasynthesis of analogues, J. Am. Chem. Soc. 133, 976-985.
Murli, S., Kennedy, J., Dayem, L. C., Carney, J. R., and Kealey, J. T. (2003) Metabolic engineering of *Escherichia coli* for improved 6-deoxyerythronolide B production, J Ind Microbiol Biotechnol 30, 500-509.
Nagaraj, V. H., Greene, J. M., Sengupta, A. M., and Sontag, E. D. (2017) Translation inhibition and resource balance in the TX-TL cell-free gene expression system, Synthetic Biology 2.
Penumetcha, P., Lau, K., Zhu, X., Davis, K., Eckdahl, T. T., and Campbell, A. M. (2010) Improving the Lac system for synthetic biology, BIOS 81, 7-15.
Peter, D. M., Vogeli, B., Cortina, N. S., and Erb, T. J. (2016) A Chemo-Enzymatic Road Map to the Synthesis of CoA Esters, Molecules 21.
Pizer, E. S., Thupari, J., Han, W. F., Pinn, M. L., Chrest, F. J., Frehywot, G. L., Townsend, C. A., and Kuhajda, F. P. (2000) Malonyl-coenzyme-A is a potential mediator of cytotoxicity induced by fatty-acid synthase inhibition in human breast cancer cells and xenografts, Cancer Res. 60, 213-218.
Price, A. C., Choi, K. H., Heath, R. J., Li, Z., White, S. W., and Rock, C. O. (2001) Inhibition of beta-ketoacyl-acyl carrier protein synthases by thiolactomycin and cerulenin. Structure and mechanism, J. Biol. Chem. 276, 6551-6559.
Rodriguez, E., and Gramajo, H. (1999) Genetic and biochemical characterization of the alpha and beta components of a propionyl-CoA carboxylase complex of Streptomyces coelicolor A3(2), Microbiology 145 ( Pt 11), 3109-3119.
Salis, H. M., Mirsky, E. A., and Voigt, C. A. (2009) Automated design of synthetic ribosome binding sites to control protein expression, Nat. Biotechnol. 27, 946-950.
Schujman, G. E., Guerin, M., Buschiazzo, A., Schaeffer, F., Llarrull, L. I., Reh, G., Vila, A. J., Alzari, P. M., and de Mendoza, D. (2006) Structural basis of lipid biosynthesis regulation in Gram-positive bacteria, EMBO J. 25, 4074-4083.
Schujman, G. E., Paoletti, L., Grossman, A. D., and de Mendoza, D. (2003) FapR, a bacterial transcription factor involved in global regulation of membrane lipid biosynthesis, Dev Cell 4, 663-672.
Shaner, N. C., Lambert, G. G., Chammas, A., Ni, Y., Cranfill, P. J., Baird, M. A., Sell, B. R., Allen, J. R., Day, R. N., Israelsson, M., Davidson, M. W., and Wang, J. (2013) A bright monomeric green fluorescent protein derived from Branchiostoma lanceolatum, Nat. Methods 10, 407-409.
Shi, S., Ang, E. L., and Zhao, H. (2018) In vivo biosensors: mechanisms, development, and applications, J Ind Microbiol Biotechnol 45, 491-516.
Siedler, S., Schendzielorz, G., Binder, S., Eggeling, L., Bringer, S., and Bott, M. (2014) SoxR as a single-cell biosensor for NADPH-consuming enzymes in *Escherichia coli*, ACS Synth. Biol. 3, 41-47.
Taylor, N. D., Garruss, A. S., Moretti, R., Chan, S., Arbing, M. A., Cascio, D., Rogers, J. K., Isaacs, F. J., Kosuri, S., Baker, D., Fields, S., Church, G. M., and Raman, S. (2016) Engineering an allosteric transcription factor to respond to new ligands, Nat. Methods 13, 177-183.
Thupari, J. N., Pinn, M. L., and Kuhajda, F. P. (2001) Fatty acid synthase inhibition in human breast cancer cells leads to malonyl-CoA-induced inhibition of fatty acid oxidation and cytotoxicity, Biochem. Biophys. Res. Commun. 285, 217-223.

(56) References Cited

OTHER PUBLICATIONS

Vogeli, B., Geyer, K., Gerlinger, P. D., Benkstein, S., Cortina, N. S., and Erb, T. J. (2018) Combining promiscuous acyl-CoA oxidase and enoyl-CoA carboxylase/reductases for atypical polyketide extender unit biosynthesis, Cell Chem Biol 25, 833-839 e834.
Walker, M. C., Thuronyi, B. W., Charkoudian, L. K., Lowry, B., Khosla, C., and Chang, M. C. (2013) Expanding the fluorine chemistry of living systems using engineered polyketide synthase pathways, Science 341, 1089-1094.
Wang, H., Jewett, M. C., and Li, J. (2018) Development of a Pseudomonas putida cell-free protein synthesis platform for rapid screening of gene regulatory elements, Synthetic Biology 3.
Xu, P., Li, L., Zhang, F., Stephanopoulos, G., and Koffas, M. (2014) Improving fatty acids production by engineering dynamic pathway regulation and metabolic control, Proc. Natl. Acad. Sci. USA 111, 11299-11304.
Xu, P., Wang, W., Li, L., Bhan, N., Zhang, F., and Koffas, M. A. (2014) Design and kinetic analysis of a hybrid promoter-regulator system for malonyl-CoA sensing in *Escherichia coli*, ACS Chem. Biol. 9, 451-458.
Yuzawa, S., Backman, T. W. H., Keasling, J. D., & Katz, L. (2018). Synthetic biology of polyketide synthases. Journal of Industrial Microbiology & Biotechnology, 112(7), 1-13. http://doi.org/10.1007/s10295-018-2021-9.
Zhang, F., Carothers, J. M., and Keasling, J. D. (2012) Design of a dynamic sensor-regulator system for production of chemicals and fuels derived from fatty acids, Nat. Biotechnol. 30, 354-359.
Zhang, H., Boghigian, B. A., and Pfeifer, B. A. (2010) Investigating the role of native propionyl-CoA and methylmalonyl-CoA metabolism on heterologous polyketide production in *Escherichia coli*, Biotechnol. Bioeng. 105, 567-573.
Xu et al. "Design and Kinetic Analysis of a Hybrid Promoter-Regulator System for Malonyl-CoA Sensing in *Escherichia coli*," ACS Chem. Biol, Nov. 5, 2013, vol. 9, pp. 451-458.
Chan et al. "Biosynthesis of polyketide synthase extender units," Nat Prod Rep, Oct. 27, 2008, vol. 26, pp. 90-114.
International Search Report and Written Opinion issued in PCT/US2020/033960, dated Oct. 6, 2020, 12 pages.

* cited by examiner

FIGS. 2A-B

*E. coli* K207-3

SEQUENCE LISTING

```
<160> NUMBER OF SEQ ID NOS: 37

<210> SEQ ID NO 1
<211> LENGTH: 9
<212> TYPE: DNA
<213> ORGANISM: Artificial Sequence
<220> FEATURE:
<223> OTHER INFORMATION: Sythentic Construct

<400> SEQUENCE: 1

caaggaggt                                                              9


<210> SEQ ID NO 2
<211> LENGTH: 9
<212> TYPE: DNA
<213> ORGANISM: Artificial Sequence
<220> FEATURE:
<223> OTHER INFORMATION: Synthetic Construct
<220> FEATURE:
<221> NAME/KEY: V
<222> LOCATION: (1)..(9)
<223> OTHER INFORMATION: A, C, or G
<220> FEATURE:
<221> NAME/KEY: R
<222> LOCATION: (1)..(9)
<223> OTHER INFORMATION: A or G
<220> FEATURE:
<221> NAME/KEY: H
<222> LOCATION: (1)..(9)
<223> OTHER INFORMATION: A, C, or T

<400> SEQUENCE: 2

tavrcaggh                                                              9


<210> SEQ ID NO 3
<211> LENGTH: 9
<212> TYPE: DNA
<213> ORGANISM: Artificial Sequence
```

-continued

<220> FEATURE:
<223> OTHER INFORMATION: Synthetic Construct

<400> SEQUENCE: 3 taaacagga 9

<210> SEQ ID NO 4
<211> LENGTH: 9
<212> TYPE: DNA
<213> ORGANISM: Artificial Sequence
<220> FEATURE:
<223> OTHER INFORMATION: Synthetic Construct

<400> SEQUENCE: 4 tacacagga 9

<210> SEQ ID NO 5
<211> LENGTH: 9
<212> TYPE: DNA
<213> ORGANISM: Artificial Sequence
<220> FEATURE:
<223> OTHER INFORMATION: Synthetic Construct

<400> SEQUENCE: 5 tagacagga 9

<210> SEQ ID NO 6
<211> LENGTH: 9
<212> TYPE: DNA
<213> ORGANISM: Artificial Sequence
<220> FEATURE:
<223> OTHER INFORMATION: Synthetic Construct

<400> SEQUENCE: 6 taagcagga 9

<210> SEQ ID NO 7
<211> LENGTH: 9
<212> TYPE: DNA
<213> ORGANISM: Artificial Sequence
<220> FEATURE:
<223> OTHER INFORMATION: Synthetic Construct

<400> SEQUENCE: 7 tacgcagga 9

<210> SEQ ID NO 8
<211> LENGTH: 9
<212> TYPE: DNA
<213> ORGANISM: Artificial Sequence
<220> FEATURE:
<223> OTHER INFORMATION: Synthetic Construct

<400> SEQUENCE: 8 taggcagga 9

<210> SEQ ID NO 9
<211> LENGTH: 9
<212> TYPE: DNA
<213> ORGANISM: Artificial Sequence
<220> FEATURE:
<223> OTHER INFORMATION: Synthetic Construct

<400> SEQUENCE: 9 taaacaggc 9

<210> SEQ ID NO 10
<211> LENGTH: 9
<212> TYPE: DNA
<213> ORGANISM: Artificial Sequence
<220> FEATURE:
<223> OTHER INFORMATION: Synthetic Construct

<400> SEQUENCE: 10 tacacaggc 9

<210> SEQ ID NO 11
<211> LENGTH: 9
<212> TYPE: DNA
<213> ORGANISM: Artificial Sequence
<220> FEATURE:
<223> OTHER INFORMATION: Synthetic Construct

<400> SEQUENCE: 11 tagacaggc 9

<210> SEQ ID NO 12
<211> LENGTH: 9
<212> TYPE: DNA
<213> ORGANISM: Artificial Sequence
<220> FEATURE:
<223> OTHER INFORMATION: Synthetic Construct

<400> SEQUENCE: 12 taagcaggc 9

<210> SEQ ID NO 13
<211> LENGTH: 9
<212> TYPE: DNA
<213> ORGANISM: Artificial Sequence
<220> FEATURE:
<223> OTHER INFORMATION: Synthetic Construct

<400> SEQUENCE: 13 tacgcaggc 9

<210> SEQ ID NO 14
<211> LENGTH: 9
<212> TYPE: DNA
<213> ORGANISM: Artificial Sequence
<220> FEATURE:
<223> OTHER INFORMATION: Synthetic Construct

<400> SEQUENCE: 14 taggcaggc 9

<210> SEQ ID NO 15
<211> LENGTH: 9
<212> TYPE: DNA
<213> ORGANISM: Artificial Sequence
<220> FEATURE:
<223> OTHER INFORMATION: Synthetic Construct

<400> SEQUENCE: 15 taaacaggt 9

<210> SEQ ID NO 16
<211> LENGTH: 9
<212> TYPE: DNA
<213> ORGANISM: Artificial Sequence
<220> FEATURE:
<223> OTHER INFORMATION: Synthetic Construct

<400> SEQUENCE: 16 tacacaggt 9

<210> SEQ ID NO 17
<211> LENGTH: 9
<212> TYPE: DNA
<213> ORGANISM: Artificial Sequence
<220> FEATURE:
<223> OTHER INFORMATION: Synthetic Construct

<400> SEQUENCE: 17 tagacaggt 9

<210> SEQ ID NO 18
<211> LENGTH: 9
<212> TYPE: DNA
<213> ORGANISM: Artificial Sequence
<220> FEATURE:
<223> OTHER INFORMATION: Synthetic Construct

<400> SEQUENCE: 18 taagcaggt 9

<210> SEQ ID NO 19
<211> LENGTH: 9
<212> TYPE: DNA
<213> ORGANISM: Artificial Sequence
<220> FEATURE:
<223> OTHER INFORMATION: Synthetic Construct

<400> SEQUENCE: 19 tacgcaggt 9

<210> SEQ ID NO 20
<211> LENGTH: 9
<212> TYPE: DNA
<213> ORGANISM: Artificial Sequence
<220> FEATURE:
<223> OTHER INFORMATION: Synthetic Construct

<400> SEQUENCE: 20 taggcaggt 9

<210> SEQ ID NO 21
<211> LENGTH: 5800
<212> TYPE: DNA
<213> ORGANISM: Artificial Sequence
<220> FEATURE:
<223> OTHER INFORMATION: Synthetic Construct

<400> SEQUENCE: 21
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180
gttccgattt agtgctttac ggcacctcga ccccaaaaaa cttgattagg gtgatggttc 240
acgtagtggg ccatcgccct gatagacggt ttttcgccct ttgacgttgg agtccacgtt 300
ctttaatagt ggactcttgt tccaaactgg aacaacactc aaccctatct cggtctattc 360
ttttgattta taagggattt tgccgatttc ggcctattgg ttaaaaaatg agctgattta 420
acaaaaattt aacgcgaatt ttaacaaaat attaacgttt acaatttcag gtggcacttt 480

-continued

```
tcggggaaat gtgcgcggaa cccctatttg tttatttttc taaatacatt caaatatgta    540
tccgctcatg aattaattct tagaaaaact catcgagcat caaatgaaac tgcaatttat    600
tcatatcagg attatcaata ccatattttt gaaaaagccg tttctgtaat gaaggagaaa    660
actcaccgag gcagttccat aggatggcaa gatcctggta tcggtctgcg attccgactc    720
gtccaacatc aatacaacct attaatttcc cctcgtcaaa aataaggtta tcaagtgaga    780
aatcaccatg agtgacgact gaatccggtg agaatggcaa aagtttatgc atttctttcc    840
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg gggtaatga taccgatgaa    2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
```

-continued

```
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataaagaaga cagtcataag tgcggcgacg atagtcatgc cccgcgccca   3420
ccggaaggag ctgactgggt tgaaggctct caagggcatc ggtcgagatc ccggtgccta   3480
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacgatg ccctcattca   3900
gcatttgcat ggtttgttga aaaccggaca tggcactcca gtcgccttcc cgttccgcta   3960
tcggctgaat ttgattgcga gtgagatatt tatgccagcc agccagacgc agacgcgccg   4020
agacagaact taatgggccc gctaacagcg cgatttgctg gtgacccaat gcgaccagat   4080
gctccacgcc cagtcgcgta ccgtcttcat gggagaaaat aatactgttg atgggtgtct   4140
ggtcagagac atcaagaaat aacgccggaa cattagtgca ggcagcttcc acagcaatgg   4200
catcctggtc atccagcgga tagttaatga tcagcccact gacgcgttgc gcgagaagat   4260
tgtgcaccgc cgctttacag gcttcgacgc cgcttcgttc taccatcgac accaccacgc   4320
tggcacccag ttgatcggcg cgagatttaa tcgccgcgac aatttgcgac ggcgcgtgca   4380
gggccagact ggaggtggca acgccaatca gcaacgactg tttgcccgcc agttgttgtg   4440
ccacgcggtt gggaatgtaa ttcagctccg ccatcgccgc ttccactttt tcccgcgttt   4500
tcgcagaaac gtggctggcc tggttcacca cgcgggaaac ggtctgataa gagacaccgg   4560
catactctgc gacatcgtat aacgttactg gtttcacatt caccaccctg aattgactct   4620
cttccgggcg ctatcatgcc ataccgcgaa aggttttgcg ccattcgatg gtgtccggga   4680
tctcgacgct ctcccttatg cgactcctgc attaggaagc agcccagtag taggttgagg   4740
ccgttgagca ccgccgccgc aaggaatggt gcatgcaagg agatggcgcc caacagtccc   4800
ccggccacgg ggcctgccac catacccacg ccgaaacaag cgctcatgag cccgaagtgg   4860
cgagcccgat cttccccatc ggtgatgtcg gcgatatagg cgccagcaac cgcacctgtg   4920
gcgccggtga tgccggccac gatgcgtccg gcgtagagga tcgagatctc gatcccgcga   4980
aattaatacg actcactata ggggaattgt gagcggataa caattcccct ctagaaataa   5040
ttttgtttaa ctttaagaag gagatatacc atggggcgcc gcaacaaacg cgaacgtcaa   5100
gagctgttac agcaaaccat ccaggcgacg ccgtttatta ccgacgaaga attggcaggt   5160
aagttcggcg tctcgattca gacaatccgt ctggatcgtc tggagttgtc cattccggaa   5220
```

-continued

```
ttgcgtgaac gtattaaaaa cgtcgccgaa aagacgttag aagacgaggt gaaatcttta   5280

tcattggacg aggtaattgg cgaaattatt gaccttgaat tagacgacca ggctatttca   5340

attttggaga ttaaacagga acacgtgttc agtcgtaacc agatcgcccg cggtcatcat   5400

ctgttcgcgc aggccaacag cctggctgtg gctgttattg atgacgaact tgcgctgacc   5460

gcttcggcag acatccgctt tacccgtcag gtgaaacaag gcgagcgcgt cgtagcgaaa   5520

gctaaagtta ccgcggttga gaaggaaaaa ggtcgtacgg ttgtggaagt caactcatac   5580

gtcggcgaag aaatcgtgtt ttcaggacgt tttgatatgt accgcagcaa acacagcctc   5640

gagcaccacc accaccacca ctgagatccg gctgctaaca aagcccgaaa ggaagctgag   5700

ttggctgctg ccaccgctga gcaataacta gcataacccc ttggggcctc taaacgggtc   5760

ttgaggggtt ttttgctgaa aggaggaact atatccggat                          5800
```

<210> SEQ ID NO 22
<211> LENGTH: 4638
<212> TYPE: DNA
<213> ORGANISM: Artificial Sequence
<220> FEATURE:
<223> OTHER INFORMATION: Synthetic Construct

<400> SEQUENCE: 22

```
ggtaatacgg ttatccacag aatcagggga taacgcagga aagaacatgt gagcaaaagg     60

ccagcaaaag gccaggaacc gtaaaaaggc cgcgttgctg gcgtttttcc ataggctccg    120

cccccctgac gagcatcaca aaaatcgacg ctcaagtcag aggtggcgaa acccgacagg    180

actataaaga taccaggcgt ttccccctgg aagctccctc gtgcgctctc ctgttccgac    240

cctgccgctt accggatacc tgtccgcctt tctcccttcg ggaagcgtgg cgctttctca    300

tagctcacgc tgtaggtatc tcagttcggt gtaggtcgtt cgctccaagc tgggctgtgt    360

gcacgaaccc cccgttcagc ccgaccgctg cgccttatcc ggtaactatc gtcttgagtc    420

caacccggta agacacgact tatcgccact ggcagcagcc actggtaaca ggattagcag    480

agcgaggtat gtaggcggtg ctacagagtt cttgaagtgg tggcctaact acggctacac    540

tagaaggaca gtatttggta tctgcgctct gctgaagcca gttaccttcg gaaaaagagt    600

tggtagctct tgatccggca aacaaaccac cgctggtagc ggtggttttt ttgtttgcaa    660

gcagcagatt acgcgcagaa aaaaaggatc tcaagaagat cctttgatct tttctacggg    720

gtctgacgct cagtggaacg aaaactcacg ttaagggatt ttggtcatga gattatcaaa    780

aaggatcttc acctagatcc ttttaaatta aaaatgaagt tttaaatcaa tctaaagtat    840

ccatggatat gagtaaactt ggtctgacag ttaccaatgc ttaatcagtg aggcacctat    900

ctcagcgatc tgtctatttc gttcatccat agttgcctga ctccccgtcg tgtagataac    960

tacgatacgg gagggcttac catctggccc cagtgctgca atgataccgc gagacccacg   1020

ctcaccggct ccagatttat cagcaataaa ccagccagcc ggaagggccg agcgcagaag   1080

tggtcctgca actttatccg cctccatcca gtctattaat tgttgccggg aagctagagt   1140

aagtagttcg ccagttaata gtttgcgcaa cgttgttgcc attgctacag gcatcgtggt   1200

gtcacgctcg tcgtttggta tggcttcatt cagctccggt tcccaacgat caaggcgagt   1260

tacatgatcc cccatgttgt gcaaaaaagc ggttagctcc ttcggtcctc cgatcgttgt   1320

cagaagtaag ttggccgcag tgttatcact catggttatg gcagcactgc ataattctct   1380

tactgtcatg ccatccgtaa gatgcttttc tgtgactggt gagtactcaa ccaagtcatt   1440

ctgagaatag tgtatgcggc gaccgagttg ctcttgcccg gcgtcaacac gggataatac   1500
```

-continued

```
cgcgccacat agcagaactt taaaagtgct catcattgga aaacgttctt cggggcgaaa   1560
actctcaagg atcttaccgc tgttgagatc cagttcgatg taacccactc gtgcacccaa   1620
ctgatcttca gcatctttta ctttcaccag cgtttctggg tgagcaaaaa caggaaggca   1680
aaatgccgca aaaaagggaa taagggcgac acggaaatgt tgaatactca tactcttcct   1740
ttttcaatat tattgaagca tttatcaggg ttattgtctc atgagcggat acatatttga   1800
atgtatttag aaaaataaac aaaaagagca tgcgtttgta gaaacgcaaa aaggccatcc   1860
gtcaggatgg ccttctgctt aatttgatgc ctggcagttt atggcgggcg tcctgcccgc   1920
caccctccgg gccgttgctt cgcaacgttc aaatccgctc ccggcggatt tgtcctactc   1980
aggagagcgt tcaccgacaa acaacagata aaacgaaagg cccagtcttt cgactgagcc   2040
tttcgtttta tttgatgcct ggcagttccc tactctcgca tggggagacc ccacactacc   2100
atcggcgcta cggcgtttca cttctgagtt cggcatgggg tcaggtggga ccaccgcgct   2160
actgccgcca ggcaaattct gttttatcag accgcttctg cgttctgatt taatctgtat   2220
caggctgaaa atcttctctc atccgccaaa acagccaagc tggagaccgt ttaaacgggc   2280
ccaagctttt tgtagagctc atccatgcca tgtgtaatcc cagcagcagt tacaaactca   2340
agaaggacca tgtggtcacg cttttcgttg ggatctttcg aaaggacaga ttgtgtcgac   2400
aggtaatggt tgtctggtaa aaggacaggg ccatcgccaa ttggagtatt ttgttgataa   2460
tggtctgcta gttgaacgga accatcttca acgttgtggc gaattttgaa gttagctttg   2520
attccattct tttgtttgtc tgccgtgatg tatacattgt gtgagttaaa gttgtactcg   2580
agtttgtgtc caagaatgtt tccatcttct ttaaaatcaa taccctttaa ctcgatacga   2640
ttaacaaggg tatcaccttc aaacttgact tcagcacgcg tcttgtaggt cccgtcatct   2700
ttgaaagata tagtgcgttc ctgtacataa ccttcgggca tggcactctt gaaaaagtca   2760
tgccgtttca tgtgatccgg ataacgggaa aagcattgaa caccataggt cagagtagtg   2820
acaagtgttg gccacggaac aggtagtttt ccagtagtgc aaataaattt aagggtgagt   2880
tttccgtttg tagcatcacc ttcaccctct ccacggacag aaaatttgtg cccattaaca   2940
tcaccatcta attcaacaag aattgggaca actccagtga aaagttcttc tcctttgctc   3000
atactagtaa ctccttagct gtttcggatg ccggacaatt aagactaggt actaatagtc   3060
ctaggcaaca tacgagccgg aagcataaag tgtaaagcct ggggtgccta atgagtgagc   3120
taactcacat taattgcgtt gcgctctaga tggtgcaaaa cctttcgcgg tatggcatga   3180
tagcgcccaa cgatcctcca ctccgcggca aggaggttgc catatgcgcc gcaacaaacg   3240
cgaacgtcaa gagctgttac agcaaaccat ccaggcgacg ccgtttatta ccgacgaaga   3300
attggcaggt aagttcggcg tctcgattca gacaatccgt ctggatcgtc tggagttgtc   3360
cattccggaa ttgcgtgaac gtattaaaaa cgtcgccgaa aagacgttag aagacgaggt   3420
gaaatcttta tcattggacg aggtaattgg cgaaattatt gaccttgaat tagacgacca   3480
ggctatttca attttggaga ttaaacagga acacgtgttc agtcgtaacc agatcgcccg   3540
cggtcatcat ctgttcgcgc aggccaacag cctggctgtg gctgttattg atgacgaact   3600
tgcgctgacc gcttcggcag acatccgctt tacccgtcag gtgaaacaag gcgagcgcgt   3660
cgtagcgaaa gctaaagtta ccgcggttga gaaggaaaaa ggtcgtacgg ttgtggaagt   3720
caactcatac gtcggcgaag aaatcgtgtt ttcaggacgt tttgatatgt accgcagcaa   3780
acacagctaa ggtacccata gtatccaaaa taaggctaag aattcatggt cagcaagggc   3840
```

-continued

```
gaagaggaca atatggcgat catcaaggag tttatgagat tcaaggtaca catggagggt   3900

agcgttaacg gccacgagtt tgaaatcgag ggtgagggcg agggtcgccc gtacgagggg   3960

actcagacgg caaagttaaa agttactaaa ggtggtccgc ttccttttgc gtgggacatt   4020

ctttctccgc agtttatgta tgggagtaaa gcgtacgtca agcatccagc cgacatacca   4080

gactacctta aattatcgtt ccccgagggg ttcaagtggg agcgcgtgat gaacttcgaa   4140

gatggcggag tggtcactgt gacccaggac tcctcccttc aggatgggga gttcatatat   4200

aaagtgaaac ttcgggggac caatttcccg tcagacggcc ctgtcatgca gaaaaagact   4260

atgggatggg aagcatcgag cgaacgtatg tacccagaag atggggcgtt aaagggggag   4320

atcaaacagc gtctgaaatt aaaagacggt ggacactacg atgctgaggt caaaactact   4380

tacaaggcta aaaaacccgt gcagcttccc ggtgcctata atgttaatat taagttggac   4440

atcacgtccc ataacgaaga ctatacaatt gtagaacagt atgagcgggc cgaaggacgc   4500

cactcaactg gagggatgga tgagttgtac aaatagctta aggtgtgcag agtccctgcg   4560

gcaggcgacg aacacgaccg tcgtcgatta gtaccggtac ggtcggtggt atcgaagtct   4620

tgatcactgt acactaga                                                4638
```

<210> SEQ ID NO 23
<211> LENGTH: 5446
<212> TYPE: DNA
<213> ORGANISM: Artificial Sequence
<220> FEATURE:
<223> OTHER INFORMATION: Synthetic Construct

<400> SEQUENCE: 23

```
acggttatcc acagaatcag gggataacgc aggaaagaac atgtgagcaa aaggccagca     60

aaaggccagg aaccgtaaaa aggccgcgtt gctggcgttt ttccataggc tccgcccccc    120

tgacgagcat cacaaaaatc gacgctcaag tcagaggtgg cgaaacccga caggactata    180

aagataccag gcgtttcccc ctggaagctc cctcgtgcgc tctcctgttc cgaccctgcc    240

gcttaccgga tacctgtccg cctttctccc ttcgggaagc gtggcgcttt ctcatagctc    300

acgctgtagg tatctcagtt cggtgtaggt cgttcgctcc aagctgggct gtgtgcacga    360

acccccgtt cagcccgacc gctgcgcctt atccggtaac tatcgtcttg agtccaaccc     420

ggtaagacac gacttatcgc cactggcagc agccactggt aacaggatta gcagagcgag    480

gtatgtaggc ggtgctacag agttcttgaa gtggtggcct aactacggct acactagaag    540

gacagtattt ggtatctgcg ctctgctgaa gccagttacc ttcggaaaaa gagttggtag    600

ctcttgatcc ggcaaacaaa ccaccgctgg tagcggtggt ttttttgttt gcaagcagca    660

gattacgcgc agaaaaaaag gatctcaaga agatcctttg atcttttcta cggggtctga    720

cgctcagtgg aacgaaaact cacgttaagg gattttggtc atgagattat caaaaaggat    780

cttcacctag atccttttaa attaaaaatg aagttttaaa tcaatctaaa gtatccatgg    840

atatgagtaa acttggtctg acagttacca atgcttaatc agtgaggcac ctatctcagc    900

gatctgtcta tttcgttcat ccatagttgc ctgactcccc gtcgtgtaga taactacgat    960

acgggagggc ttaccatctg gccccagtgc tgcaatgata ccgcgagacc cacgctcacc   1020

ggctccagat ttatcagcaa taaaccagcc agccggaagg gccgagcgca gaagtggtcc   1080

tgcaacttta tccgcctcca tccagtctat taattgttgc cgggaagcta gagtaagtag   1140

ttcgccagtt aatagtttgc gcaacgttgt tgccattgct acaggcatcg tggtgtcacg   1200

ctcgtcgttt ggtatggctt cattcagctc cggttcccaa cgatcaaggc gagttacatg   1260
```

atcccccatg ttgtgcaaaa aagcggttag ctccttcggt cctccgatcg ttgtcagaag 1320
taagttggcc gcagtgttat cactcatggt tatggcagca ctgcataatt ctcttactgt 1380
catgccatcc gtaagatgct tttctgtgac tggtgagtac tcaaccaagt cattctgaga 1440
atagtgtatg cggcgaccga gttgctcttg cccggcgtca acacgggata ataccgcgcc 1500
acatagcaga actttaaaag tgctcatcat tggaaaacgt tcttcggggc gaaaactctc 1560
aaggatctta ccgctgttga gatccagttc gatgtaaccc actcgtgcac ccaactgatc 1620
ttcagcatct tttactttca ccagcgtttc tgggtgagca aaaacaggaa ggcaaaatgc 1680
cgcaaaaaag ggaataaggg cgacacggaa atgttgaata ctcatactct tcctttttca 1740
atattattga agcatttatc agggttattg tctcatgagc ggatacatat ttgaatgtat 1800
ttagaaaaat aaacaaaaag agcatgcgtt tgtagaaacg caaaaaggcc atccgtcagg 1860
atggccttct gcttaatttg atgcctggca gtttatggcg ggcgtcctgc ccgccaccct 1920
ccgggccgtt gcttcgcaac gttcaaatcc gctcccggcg gatttgtcct actcaggaga 1980
gcgttcaccg acaaacaaca gataaaacga aaggcccagt ctttcgactg agcctttcgt 2040
tttatttgat gcctggcagt tccctactct cgcatgggga gaccccacac taccatcggc 2100
gctacggcgt ttcacttctg agttcggcat ggggtcaggt gggaccaccg cgctactgcc 2160
gccaggcaaa ttctgtttta tcagaccgct tctgcgttct gatttaatct gtatcaggct 2220
gaaaatcttc tctcatccgc caaaacagcc aagctggaga ccgtttaaac gggcccaagc 2280
tttttgtaga gctcatccat gccatgtgta atcccagcag cagttacaaa ctcaagaagg 2340
accatgtggt cacgcttttc gttgggatct ttcgaaagga cagattgtgt cgacaggtaa 2400
tggttgtctg gtaaaaggac agggccatcg ccaattggag tattttgttg ataatggtct 2460
gctagttgaa cggaaccatc ttcaacgttg tggcgaattt tgaagttagc tttgattcca 2520
ttcttttgtt tgtctgccgt gatgtataca ttgtgtgagt taaagttgta ctcgagtttg 2580
tgtccaagaa tgtttccatc ttctttaaaa tcaataccct ttaactcgat acgattaaca 2640
agggtatcac cttcaaactt gacttcagca cgcgtcttgt aggtcccgtc atctttgaaa 2700
gatatagtgc gttcctgtac ataaccttcg ggcatggcac tcttgaaaaa gtcatgccgt 2760
ttcatgtgat ccggataacg ggaaaagcat tgaacaccat aggtcagagt agtgacaagt 2820
gttggccacg gaacaggtag ttttccagta gtgcaaataa atttaagggt gagttttccg 2880
tttgtagcat caccttcacc ctctccacgg acagaaaatt tgtgcccatt aacatcacca 2940
tctaattcaa caagaattgg gacaactcca gtgaaaagtt cttctccttt gctcatacta 3000
gtaactcctt agctgtttcg gatgccggac aattaagact aggtactaat agtcctaggc 3060
aacatacgag ccggaagcat aaagtgtaaa gcctggggtg cctaatgagt gagctaactc 3120
acattaattg cgttgcgctc tagatggtgc aaaacctttc gcggtatggc atgatagcgc 3180
ccaacgatcc tccactccgc ggcaaggagg ttgccatatg cgccgcaaca aacgcgaacg 3240
tcaagagctg ttacagcaaa ccatccaggc gacgccgttt attaccgacg aagaattggc 3300
aggtaagttc ggcgtctcga ttcagacaat ccgtctggat cgtctggagt tgtccattcc 3360
ggaattgcgt gaacgtatta aaaacgtcgc cgaaaagacg ttagaagacg aggtgaaatc 3420
tttatcattg gacgaggtaa ttggcgaaat tattgacctt gaattagacg accaggctat 3480
ttcaattttg gagattaaac aggaacacgt gttcagtcgt aaccagatcg cccgcggtca 3540
tcatctgttc gcgcaggcca acagcctggc tgtggctgtt attgatgacg aacttgcgct 3600

-continued

```
gaccgcttcg gcagacatcc gctttacccg tcaggtgaaa caaggcgagc gcgtcgtagc   3660

gaaagctaaa gttaccgcgg ttgagaagga aaaaggtcgt acggttgtgg aagtcaactc   3720

atacgtcggc gaagaaatcg tgttttcagg acgttttgat atgtaccgca gcaaacacag   3780

ctaaggtacc attttgttta actttaagaa ggagatatac catgagcaac cacctgtttg   3840

acgctatgcg tgcggcggct ccgggtgatg ccccgtttat ccgtatcgac aatgctcgta   3900

cctggaccta cgatgacgca attgcgctga gcggtcgtat tgccggtgca atggatgcac   3960

tgggcattcg tccgggtgac cgcgttgctg tccaggtgga aaaatctgca gaagctctga   4020

tcctgtatct ggcgtgcctg cgtaccggtg ccgtgtatct gccgctgaac accgcgtaca   4080

cgctggccga actggattat tttattggcg acgcagaacc gcgtctggtg gttgttgctc   4140

cggccgcacg cggcggtgtc gaaacgattg cgaaacgtca tggtgccatc gtggaaaccc   4200

tggatgcgga cggccgtggt agtctgctgg atctggcacg cgacgaaccg gctgatttcg   4260

tggacgcaag ccgctctgct gatgacctgg cagctattct gtacacgagc ggcaccacgg   4320

gtcgttctaa aggcgcgatg ctgacccatg gtaacctgct gtccaatgcc ctgacgctgc   4380

gtgattattg gcgcgttacc gcggatgacc gcctgattca cgccctgccg atctttcata   4440

cccacggtct gttcgttgcc accaatgtga ccctgctggc cggtgcctca atgtttctgc   4500

tgtcgaaatt cgatgccgac gaagttgtta gtctgatgcc gcaggcaacg atgctgatgg   4560

gcgttccgac cttttacgtc cgtctgctgc aaagtccgcg cctggaaaaa ggtgcagtgg   4620

cttccattcg tctgtttatc agtggttccg ccccgctgct ggcggaaacc catgcagaat   4680

tccacgctcg taccggtcac gcgattctgg aacgctacgg catgaccgaa acgaacatga   4740

atacgtctaa cccgtatgaa ggtaaacgca tcgcaggcac cgttggtttt ccgctgccgg   4800

atgttaccgt ccgtgtgacc gacccggcaa ccggtctggt gctgccgccg gaagaaaccg   4860

gcatgatcga aatcaaaggt ccgaacgttt tcaaaggcta ctggcgcatg ccggaaaaaa   4920

cggcggccga attcaccgcg gatggctttt tcattagcgg cgatctgggt aaaatcgacc   4980

gcgaaggcta tgttcatatt gtcggccgtg gtaaagatct ggttatttca ggcggttata   5040

acatctaccc gaaagaagtc gaaggtgaaa ttgatcaaat cgaaggcgtc gtggaatcgg   5100

cggtgattgg tgttccgcac ccggattttg gcgaaggtgt gaccgcggtt gtcgtgtgta   5160

aaccgggcgc cgtgctggat gaaaaaacca tcgttagcgc actgcaggat cgtctggctc   5220

gctataaaca accgaaacgc attatcttcg ccgatgacct gccgcgtaat accatgggca   5280

aagtccagaa aaacatcctg cgtcagcaat atgcggacct gtacacccgt cgctaagcgg   5340

ccgcgtgtgc agagtccctg cggcaggcga cgaacacgac cgtcgtcgat tagtaccggt   5400

acggtcggtg gtatcgaagt cttgatcact gtacactaga ggtaat                  5446
```

```
<210> SEQ ID NO 24
<211> LENGTH: 567
<212> TYPE: DNA
<213> ORGANISM: Artificial Sequence
<220> FEATURE:
<223> OTHER INFORMATION: Synthetic Construct

<400> SEQUENCE: 24

atgcgccgca acaaacgcga acgtcaagag ctgttacagc aaaccatcca ggcgacgccg     60

tttattaccg acgaagaatt ggcaggtaag ttcggcgtct cgattcagac aatccgtctg    120

gatcgtctgg agttgtccat tccggaattg cgtgaacgta ttaaaaacgt cgccgaaaag    180

acgttagaag acgaggtgaa atctttatca ttggacgagg taattggcga aattattgac    240
```

cttgaattag acgaccaggc tatttcaatt ttggagatta aacaggaaca cgtgctcagt 300
cgtaaccaga tcgcccgcgg tcatcatctg ttcgcgcagg ccaacagcct ggctgtggct 360
gttattgatg acgaacttgc gctgaccgct tcggcagaca tccgctttac ccgtcaggtg 420
aaacaaggcg agcgcgtcgt agcgaaagct aaagttaccg cggttgagaa ggaaaaaggt 480
cgtacggttg tggaagtcaa ctcatacgtc ggcgaagaaa tcgtgttttc aggacgtttt 540
gatatgtacc gcagcaaaca cagctaa 567

<210> SEQ ID NO 25
<211> LENGTH: 567
<212> TYPE: DNA
<213> ORGANISM: Artificial Sequence
<220> FEATURE:
<223> OTHER INFORMATION: Synthetic Construct

<400> SEQUENCE: 25
atgcgccgca acaaacgcga acgtcaagag ctgttacagc aaaccatcca ggcgacgccg 60
tttattaccg acgaagaatt ggcaggtaag ttcggcgtct cgattcagac aatccgtctg 120
gatcgtctgg agttgtccat tccggaattg cgtgaacgta ttaaaaacgt cgccgaaaag 180
acgttagaag acgaggtgaa atctttatca ttggacgagg taattggcga aattattgac 240
cttgaattag acgaccaggc tatttcaatt ttggagatta aacaggaaca cgtgttcagt 300
cgtaaccaga tcgcccgcgg tcatcatctg ttcgcgcagg ccaacagcct ggctgtggct 360
gttattgatg acgaacttgc gctgaccgct tcggcagaca tccgctttac ccgtcaggtg 420
aaacaaggcg agcgcgtcgt agcgaaagct aaagttaccg cggttgagaa ggaaaaaggt 480
cgtacggttg tggaagtcaa ctcatacgtc ggcgaagaaa tcgtgttttc aggacgtttt 540
gatatgtacc gcagcaaaca cagctaa 567

<210> SEQ ID NO 26
<211> LENGTH: 5443
<212> TYPE: DNA
<213> ORGANISM: Artificial Sequence
<220> FEATURE:
<223> OTHER INFORMATION: Synthetic Construct

<400> SEQUENCE: 26
acggttatcc acagaatcag gggataacgc aggaaagaac atgtgagcaa aaggccagca 60
aaaggccagg aaccgtaaaa aggccgcgtt gctggcgttt ttccataggc tccgcccccc 120
tgacgagcat cacaaaaatc gacgctcaag tcagaggtgg cgaaacccga caggactata 180
aagataccag gcgtttcccc ctggaagctc cctcgtgcgc tctcctgttc cgaccctgcc 240
gcttaccgga tacctgtccg cctttctccc ttcgggaagc gtggcgcttt ctcatagctc 300
acgctgtagg tatctcagtt cggtgtaggt cgttcgctcc aagctgggct gtgtgcacga 360
accccccgtt cagcccgacc gctgcgcctt atccggtaac tatcgtcttg agtccaaccc 420
ggtaagacac gacttatcgc cactggcagc agccactggt aacaggatta gcagagcgag 480
gtatgtaggc ggtgctacag agttcttgaa gtggtggcct aactacggct acactagaag 540
gacagtattt ggtatctgcg ctctgctgaa gccagttacc ttcggaaaaa gagttggtag 600
ctcttgatcc ggcaaacaaa ccaccgctgg tagcggtggt ttttttgttt gcaagcagca 660
gattacgcgc agaaaaaaag gatctcaaga agatcctttg atcttttcta cggggtctga 720
cgctcagtgg aacgaaaact cacgttaagg gattttggtc atgagattat caaaaaggat 780

-continued

```
cttcacctag atccttttaa attaaaaatg aagttttaaa tcaatctaaa gtatccatgg    840
atatgagtaa acttggtctg acagttacca atgcttaatc agtgaggcac ctatctcagc    900
gatctgtcta tttcgttcat ccatagttgc ctgactcccc gtcgtgtaga taactacgat    960
acgggagggc ttaccatctg gccccagtgc tgcaatgata ccgcgagacc cacgctcacc   1020
ggctccagat ttatcagcaa taaaccagcc agccggaagg gccgagcgca gaagtggtcc   1080
tgcaacttta tccgcctcca tccagtctat taattgttgc cgggaagcta gagtaagtag   1140
ttcgccagtt aatagtttgc gcaacgttgt tgccattgct acaggcatcg tggtgtcacg   1200
ctcgtcgttt ggtatggctt cattcagctc cggttcccaa cgatcaaggc gagttacatg   1260
atcccccatg ttgtgcaaaa aagcggttag ctccttcggt cctccgatcg ttgtcagaag   1320
taagttggcc gcagtgttat cactcatggt tatggcagca ctgcataatt ctcttactgt   1380
catgccatcc gtaagatgct tttctgtgac tggtgagtac tcaaccaagt cattctgaga   1440
atagtgtatg cggcgaccga gttgctcttg cccggcgtca acacgggata ataccgcgcc   1500
acatagcaga actttaaaag tgctcatcat tggaaaacgt tcttcggggc gaaaactctc   1560
aaggatctta ccgctgttga gatccagttc gatgtaaccc actcgtgcac ccaactgatc   1620
ttcagcatct tttactttca ccagcgtttc tgggtgagca aaaacaggaa ggcaaaatgc   1680
cgcaaaaaag ggaataaggg cgacacggaa atgttgaata ctcatactct tcctttttca   1740
atattattga agcatttatc agggttattg tctcatgagc ggatacatat ttgaatgtat   1800
ttagaaaaat aaacaaaaag agcatgcgtt tgtagaaacg caaaaaggcc atccgtcagg   1860
atggccttct gcttaatttg atgcctggca gtttatggcg ggcgtcctgc ccgccaccct   1920
ccgggccgtt gcttcgcaac gttcaaatcc gctcccggcg gatttgtcct actcaggaga   1980
gcgttcaccg acaaacaaca gataaaacga aaggcccagt ctttcgactg agcctttcgt   2040
tttatttgat gcctggcagt tccctactct cgcatgggga gaccccacac taccatcggc   2100
gctacggcgt ttcacttctg agttcggcat ggggtcaggt gggaccaccg cgctactgcc   2160
gccaggcaaa ttctgtttta tcagaccgct tctgcgttct gatttaatct gtatcaggct   2220
gaaaatcttc tctcatccgc caaaacagcc aagctggaga ccgtttaaac gggcccaagc   2280
tttttgtaga gctcatccat gccatgtgta atcccagcag cagttacaaa ctcaagaagg   2340
accatgtggt cacgcttttc gttgggatct ttcgaaagga cagattgtgt cgacaggtaa   2400
tggttgtctg gtaaaaggac agggccatcg ccaattggag tattttgttg ataatggtct   2460
gctagttgaa cggaaccatc ttcaacgttg tggcgaattt tgaagttagc tttgattcca   2520
ttcttttgtt tgtctgccgt gatgtataca ttgtgtgagt taaagttgta ctcgagtttg   2580
tgtccaagaa tgtttccatc ttctttaaaa tcaatacect ttaactcgat acgattaaca   2640
agggtatcac cttcaaactt gacttcagca cgcgtcttgt aggtcccgtc atctttgaaa   2700
gatatagtgc gttcctgtac ataaccttcg ggcatggcac tcttgaaaaa gtcatgccgt   2760
ttcatgtgat ccggataacg ggaaaagcat tgaacaccat aggtcagagt agtgacaagt   2820
gttggccacg gaacaggtag ttttccagta gtgcaaataa atttaagggt gagttttccg   2880
tttgtagcat caccttcacc ctctccacgg acagaaaatt tgtgcccatt aacatcacca   2940
tctaattcaa caagaattgg gacaactcca gtgaaaagtt cttctccttt gctcatacta   3000
gtaactcctt agctgtttcg gatgccggac aattaagact aggtactaat agtcctaggc   3060
aacatacgag ccggaagcat aaagtgtaaa gcctggggtg cctaatgagt gagctaactc   3120
acattaattg cgttgcgctc tagatggtgc aaaacctttc gcggtatggc atgatagcgc   3180
```

```
ccaacgatcc tccactccgc ggcaaggagg ttgccatatg cgccgcaaca aacgcgaacg   3240
tcaagagctg ttacagcaaa ccatccaggc gacgccgttt attaccgacg aagaattggc   3300
aggtaagttc ggcgtctcga ttcagacaat ccgtctggat cgtctggagt tgtccattcc   3360
ggaattgcgt gaacgtatta aaaacgtcgc cgaaaagacg ttagaagacg aggtgaaatc   3420
tttatcattg gacgaggtaa ttggcgaaat tattgacctt gaattagacg accaggctat   3480
ttcaattttg gagattaaac aggaacacgt gttcagtcgt aaccagatcg cccgcggtca   3540
tcatctgttc gcgcaggcca acagcctggc tgtggctgtt attgatgacg aacttgcgct   3600
gaccgcttcg gcagacatcc gctttacccg tcaggtgaaa caaggcgagc gcgtcgtagc   3660
gaaagctaaa gttaccgcgg ttgagaagga aaaaggtcgt acggttgtgg aagtcaactc   3720
atacgtcggc gaagaaatcg tgttttcagg acgttttgat atgtaccgca gcaaacacag   3780
ctaaggtacc attttgttta actttaagaa ggagatatac catgaacgcg aatctgtttg   3840
cccgtttgtt cgacaaactg gatgatcccc ataaattggc cattgagaca gcagccggcg   3900
acaagatctc gtatgcggaa ctggtagctc gtgcaggtcg tgtcgcaaac gttcttgttg   3960
ctcgcggact gcaagtaggc gaccgcgtgg cagcacagac agaaaagtca gttgaggccc   4020
ttgtattata tcttgccaca gtacgtgcag gaggtgtcta cttaccactg aacactgcgt   4080
atacgctgca cgaactggat tatttcatta cggacgctga gccaaagatc gttgtgtgcg   4140
atccttctaa acgtgatggg attgccgcaa ttgctgctaa agtgggtgct actgtggaga   4200
cattaggccc cgatggccgt ggctcattaa ctgacgcggc ggcgggagca tctgaagcgt   4260
ttgctacaat cgaccgcggg gcagatgatc tggcggccat tttatacacc tctgggacta   4320
cagggcgctc caaaggtgct atgctgtcac acgataatct tgccagcaac tcattaaccc   4380
tggtagacta ttggcgtttc actcccgatg acgtacttat ccatgcactt cccatctatc   4440
atacccatgg gttgttcgtc gcctccaacg ttactttatt cgcccgtggc agcatgatct   4500
tcctgcccaa gttcgaccct gataagatcc tggatcttat ggcacgcgca acagttttga   4560
tgggtgtacc tacattctat acccgcttat tacaatcacc gcgcttaacg aaagaaacca   4620
cgggacacat gcgccttttc atttccggct cggccccact tttggcagat acgcaccgtg   4680
aatggtctgc gaagaccggg cacgcagttt tggaacgtta tggtatgact gagaccaata   4740
tgaataccag caacccgtat gacggagacc gcgtgcctgg tgcagtgggg cctgccctgc   4800
ccggtgtaag tgcacgtgtc acggacccgg agactggcaa ggagttaccg cgtggggata   4860
ttggtatgat cgaagtcaag ggtccaaacg tctttaaagg ctattggcgt atgccagaaa   4920
aaactaaatc agaattccgt gacgatggtt tttttattac cggcgacctg ggtaaaatcg   4980
atgaacgtgg ttatgttcat atccttggcc gcggtaaaga ccttgttatt actggtgggt   5040
tcaacgtata tccgaaagaa attgaatcag agattgacgc aatgccgggg gtagtagagt   5100
cagcggtcat tggggtcccg cacgcggact ttggtgaagg tgttaccgcc gtcgttgtac   5160
gcgacaaggg agccacaatc gatgaggctc aagttttgca tggattggac ggtcagttag   5220
ccaaatttaa aatgccgaaa aaagttatct tcgtggatga tttgccacgc aacaccatgg   5280
ggaaggtgca gaaaaatgtc ttgcgtgaga cttacaaaga catctataag taagcggccg   5340
cgtgtgcaga gtccctgcgg caggcgacga acacgaccgt cgtcgattag taccggtacg   5400
gtcggtggta tcgaagtctt gatcactgta cactagaggt aat                     5443
```

<210> SEQ ID NO 27

<211> LENGTH: 6432
<212> TYPE: DNA
<213> ORGANISM: Artificial Sequence
<220> FEATURE:
<223> OTHER INFORMATION: Synthetic Construct

<400> SEQUENCE: 27
ggggaattgt gagcggataa caattcccct gtagaaataa ttttgtttaa ctttaataag 60
gagatatacc atgagcaacc acctgtttga cgctatgcgt gcggcggctc cgggtgatgc 120
cccgtttatc cgtatcgaca atgctcgtac ctggacctac gatgacgcaa ttgcgctgag 180
cggtcgtatt gccggtgcaa tggatgcact gggcattcgt ccgggtgacc gcgttgctgt 240
ccaggtggaa aaatctgcag aagctctgat cctgtatctg gcgtgcctgc gtaccggtgc 300
cgtgtatctg ccgctgaaca ccgcgtacac gctggccgaa ctggattatt ttattggcga 360
cgcagaaccg cgtctggtgg ttgttgctcc ggccgcacgc ggcggtgtcg aaacgattgc 420
gaaacgtcat ggtgccatcg tggaaaccct ggatgcggac ggccgtggta gtctgctgga 480
tctggcacgc gacgaaccgg ctgatttcgt ggacgcaagc cgctctgctg atgacctggc 540
agctattctg tacacgagcg gcaccacggg tcgttctaaa ggcgcgatgc tgacccatgg 600
taacctgctg tccaatgccc tgacgctgcg tgattattgg cgcgttaccg cggatgaccg 660
cctgattcac gccctgccga tctttcatac ccacggtctg ttcgttgcca ccaatgtgac 720
cctgctggcc ggtgcctcaa tgtttctgct gtcgaaattc gatgccgacg aagttgttag 780
tctgatgccg caggcaacga tgctgatggg cgttccgacc ttttacgtcc gtctgctgca 840
aagtccgcgc ctggaaaaag gtgcagtggc ttccattcgt ctgtttatca gtggttccgc 900
cccgctgctg gcggaaaccc atgcagaatt ccacgctcgt accggtcacg cgattctgga 960
acgctacggc atgaccgaaa cgaacatgaa tacgtctaac ccgtatgaag gtaaacgcat 1020
cgcaggcacc gttggttttc cgctgccgga tgttaccgtc cgtgtgaccg acccggcaac 1080
cggtctggtg ctgccgccgg aagaaaccgg catgatcgaa atcaaaggtc cgaacgtttt 1140
caaaggctac tggcgcatgc cggaaaaaac ggcggccgaa ttcaccgcgg atggcttttt 1200
cattagcggc gatctgggta aaatcgaccg cgaaggctat gttcatattg tcggccgtgg 1260
taaagatctg gttatttcag gcggttataa catctacccg aaagaagtcg aaggtgaaat 1320
tgatcaaatc gaaggcgtcg tggaatcggc ggtgattggt gttccgcacc cggattttgg 1380
cgaaggtgtg accgcggttg tcgtgtgtaa accgggcgcc gtgctggatg aaaaaaccat 1440
cgttagcgca ctgcaggatc gtctggctcg ctataaacaa ccgaaacgca ttatcttcgc 1500
cgatgacctg ccgcgtaata ccatgggcaa agtccagaaa aacatcctgc gtcagcaata 1560
tgcggacctg tacacccgtc gctaaagctt gcggccgcat aatgcttaag tcgaacagaa 1620
agtaatcgta ttgtacacgg ccgcataatc gaaattaata cgactcacta taggggaatt 1680
gtgagcggat aacaattccc catcttagta tattagttaa gtataagaag gagatataca 1740
tatggggatc gagttacttg caattggcct gcttgtagcg atgtttatta tcgcgacaat 1800
tcagccgatt aacatgggcg cacttgcctt cgccggcgcc ttcgtgttgg ggtcgatgat 1860
catcggaatg aagaccagtg acatttttgc cggcttccca tcagacttat tcctgaccct 1920
ggtggctgta acctaccttt ttgccatcgc tcaaattaac ggcactatcg actggctggt 1980
ggagtgtgca gtacgtttag tccgcgggcg tatcggactg atcccttggg tcatgttctt 2040
agtggcggcc attatcacag ggtttggagc cttgggtccc gctgcagtcg ccattttagc 2100
cccggttgca ctttccttcg cggtgcaata ccgtattcac cccgtaatga tgggcctgat 2160

-continued

```
ggtcattcat ggtgcccaag ctggtggttt cagtccaatt agcatttacg gaggaatcac   2220
aaatcaaatc gtagcaaaag ccggcctgcc gtttgcgccg acgtcccttt ttctgtcatc   2280
atttttcttc aatctggcga ttgctgttct tgtattcttc gtgtttgggg gagcccgtgt   2340
gatgaagcag gatcctgcca gtttcggccc acttcctgaa ctgcacccag agggggtctc   2400
agaaagtatc cgcggccacg gagggacacc ggccaagcct attcgcgaac acgcatacgg   2460
gactgccgca gacaccgcca cttcattacg tctgaataat gaacgtatca caaccctgat   2520
cggattgact gcgttaggta tcggagcttt agtgtttaaa ttcaatgtcg ggcttgtggc   2580
aatgaccgtc gccgtggcac ttgcgttgtt gagtccaaag acacagaagg cagcaattga   2640
caaggtgagt tggagtacag ttctgttaat tagtgggatc attacttatg tgggtgtaat   2700
ggaaaaggcg ggcacagttg actatgttgc taatggtatt tcgagccttg gaatgcccct   2760
gctggtcgca ttactgttgt gttttacggg ggctattgtc tctgccttcg cgtcatcgac   2820
cgccctgttg ggagcgatta ttccactggc tgtaccattc cttttgcaag gccacgtgtc   2880
ggcaattggc gtcgtggcag ctatcgctat ttctaccacc atcgtagaca ccagcccgtt   2940
cagcacaaac ggagcgctgg tagtagctaa tgctccagat gatcgccgtg aacaagtctt   3000
gcgccaactt cttatctact cagctctgat cgcaatcatt ggtccgatcg ttgcatggtt   3060
cgtattcgta gttagtggtc tggtgtaagc tgctgccacc gctgagcaat aactagcata   3120
acccettggg gcctctaaac gggtcttgag gggttttttg ctgaaacctc aggcatttga   3180
gaagcacacg gtcacactgc ttccggtagt caataaaccg gtaaaccagc aatagacata   3240
agcggctatt taacgaccct gccctgaacc gacgaccggg tcatcgtggc cggatcttgc   3300
ggcccctcgg cttgaacgaa ttgttagaca ttatttgccg actaccttgg tgatctcgcc   3360
tttcacgtag tggacaaatt cttccaactg atctgcgcgc gaggccaagc gatcttcttc   3420
ttgtccaaga taagcctgtc tagcttcaag tatgacgggc tgatactggg ccggcaggcg   3480
ctccattgcc cagtcggcag cgacatcctt cggcgcgatt ttgccggtta ctgcgctgta   3540
ccaaatgcgg gacaacgtaa gcactacatt tcgctcatcg ccagcccagt cgggcggcga   3600
gttccatagc gttaaggttt catttagcgc ctcaaataga tcctgttcag gaaccggatc   3660
aaagagttcc tccgccgctg gacctaccaa ggcaacgcta tgttctcttg cttttgtcag   3720
caagatagcc agatcaatgt cgatcgtggc tggctcgaag atacctgcaa gaatgtcatt   3780
gcgctgccat tctccaaatt gcagttcgcg cttagctgga taacgccacg gaatgatgtc   3840
gtcgtgcaca acaatggtga cttctacagc gcggagaatc tcgctctctc caggggaagc   3900
cgaagtttcc aaaaggtcgt tgatcaaagc tcgccgcgtt gtttcatcaa gccttacggt   3960
caccgtaacc agcaaatcaa tatcactgtg tggcttcagg ccgccatcca ctgcggagcc   4020
gtacaaatgt acggccagca acgtcggttc gagatggcgc tcgatgacgc caactacctc   4080
tgatagttga gtcgatactt cggcgatcac cgcttccctc atactcttcc tttttcaata   4140
ttattgaagc atttatcagg gttattgtct catgagcgga tacatatttg aatgtattta   4200
gaaaaataaa caaatagcta gctcactcgg tcgctacgct ccgggcgtga gactgcggcg   4260
ggcgctgcgg acacatacaa agttacccac agattccgtg gataagcagg ggactaacat   4320
gtgaggcaaa acagcagggc cgcgccggtg gcgtttttcc ataggctccg ccctcctgcc   4380
agagttcaca taaacagacg cttttccggt gcatctgtgg gagccgtgag gctcaaccat   4440
gaatctgaca gtacgggcga aacccgacag gacttaaaga tccccaccgt ttccggcggg   4500
```

-continued

```
tcgctccctc ttgcgctctc ctgttccgac cctgccgttt accggatacc tgttccgcct   4560

ttctccctta cgggaagtgt ggcgctttct catagctcac acactggtat ctcggctcgg   4620

tgtaggtcgt tcgctccaag ctgggctgta agcaagaact ccccgttcag cccgactgct   4680

gcgccttatc cggtaactgt tcacttgagt ccaacccgga aagcacggt aaaacgccac    4740

tggcagcagc cattggtaac tgggagttcg cagaggattt gtttagctaa acacgcggtt   4800

gctcttgaag tgtgcgccaa agtccggcta cactggaagg acagatttgg ttgctgtgct   4860

ctgcgaaagc cagttaccac ggttaagcag ttccccaact gacttaacct tcgatcaaac   4920

cacctcccca ggtggttttt tcgtttacag ggcaaaagat tacgcgcaga aaaaaaggat   4980

ctcaagaaga tcctttgatc ttttctactg aaccgctcta gatttcagtg caatttatct   5040

cttcaaatgt agcacctgaa gtcagcccca tacgatataa gttgtaattc tcatgttagt   5100

catgccccgc gcccaccgga aggagctgac tgggttgaag gctctcaagg gcatcggtcg   5160

agatcccggt gcctaatgag tgagctaact tacattaatt gcgttgcgct cactgcccgc   5220

tttccagtcg ggaaacctgt cgtgccagct gcattaatga atcggccaac gcgcggggag   5280

aggcggtttg cgtattgggc gccagggtgg tttttctttt caccagtgag acgggcaaca   5340

gctgattgcc cttcaccgcc tggccctgag agagttgcag caagcggtcc acgctggttt   5400

gccccagcag gcgaaaatcc tgtttgatgg tggttaacgg cgggatataa catgagctgt   5460

cttcggtatc gtcgtatccc actaccgaga tgtccgcacc aacgcgcagc ccggactcgg   5520

taatggcgcg cattgcgccc agcgccatct gatcgttggc aaccagcatc gcagtgggaa   5580

cgatgccctc attcagcatt tgcatggttt gttgaaaacc ggacatggca ctccagtcgc   5640

cttcccgttc cgctatcggc tgaatttgat tgcgagtgag atatttatgc cagccagcca   5700

gacgcagacg cgccgagaca gaacttaatg ggcccgctaa cagcgcgatt tgctggtgac   5760

ccaatgcgac cagatgctcc acgcccagtc gcgtaccgtc ttcatgggag aaaataatac   5820

tgttgatggg tgtctggtca gagacatcaa gaaataacgc cggaacatta gtgcaggcag   5880

cttccacagc aatggcatcc tggtcatcca gcggatagtt aatgatcagc ccactgacgc   5940

gttgcgcgag aagattgtgc accgccgctt tacaggcttc gacgccgctt cgttctacca   6000

tcgacaccac cacgctggca cccagttgat cggcgcgaga tttaatcgcc gcgacaattt   6060

gcgacggcgc gtgcagggcc agactggagg tggcaacgcc aatcagcaac gactgtttgc   6120

ccgccagttg ttgtgccacg cggttgggaa tgtaattcag ctccgccatc gccgcttcca   6180

ctttttcccg cgttttcgca gaaacgtggc tggcctggtt caccacgcgg gaaacggtct   6240

gataagagac accggcatac tctgcgacat cgtataacgt tactggtttc acattcacca   6300

ccctgaattg actctcttcc gggcgctatc atgccatacc gcgaaaggtt ttgcgccatt   6360

cgatggtgtc cgggatctcg acgctctccc ttatgcgact cctgcattag gaaattaata   6420

cgactcacta ta                                                        6432
```

```
<210> SEQ ID NO 28
<211> LENGTH: 188
<212> TYPE: PRT
<213> ORGANISM: Artificial Sequence
<220> FEATURE:
<223> OTHER INFORMATION: Synthetic Construct

<400> SEQUENCE: 28

Met Arg Arg Asn Lys Arg Glu Arg Gln Glu Leu Leu Gln Gln Thr Ile
1               5                   10                  15
```

-continued

```
Gln Ala Thr Pro Phe Ile Thr Asp Glu Glu Leu Ala Gly Lys Phe Gly
            20                  25                  30

Val Ser Ile Gln Thr Ile Arg Leu Asp Arg Leu Glu Leu Ser Ile Pro
        35                  40                  45

Glu Leu Arg Glu Arg Ile Lys Asn Val Ala Glu Lys Thr Leu Glu Asp
    50                  55                  60

Glu Val Lys Ser Leu Ser Leu Asp Glu Val Ile Gly Glu Ile Ile Asp
65                  70                  75                  80

Leu Glu Leu Asp Asp Gln Ala Ile Ser Ile Leu Glu Ile Lys Gln Glu
                85                  90                  95

His Val Leu Ser Arg Asn Gln Ile Ala Arg Gly His His Leu Phe Ala
            100                 105                 110

Gln Ala Asn Ser Leu Ala Val Ala Val Ile Asp Asp Glu Leu Ala Leu
        115                 120                 125

Thr Ala Ser Ala Asp Ile Arg Phe Thr Arg Gln Val Lys Gln Gly Glu
    130                 135                 140

Arg Val Val Ala Lys Ala Lys Val Thr Ala Val Glu Lys Glu Lys Gly
145                 150                 155                 160

Arg Thr Val Val Glu Val Asn Ser Tyr Val Gly Glu Glu Ile Val Phe
                165                 170                 175

Ser Gly Arg Phe Asp Met Tyr Arg Ser Lys His Ser
            180                 185


<210> SEQ ID NO 29
<211> LENGTH: 188
<212> TYPE: PRT
<213> ORGANISM: Artificial Sequence
<220> FEATURE:
<223> OTHER INFORMATION: Synthetic Construct

<400> SEQUENCE: 29

Met Arg Arg Asn Lys Arg Glu Arg Gln Glu Leu Leu Gln Gln Thr Ile
1               5                   10                  15

Gln Ala Thr Pro Phe Ile Thr Asp Glu Glu Leu Ala Gly Lys Phe Gly
            20                  25                  30

Val Ser Ile Gln Thr Ile Arg Leu Asp Arg Leu Glu Leu Ser Ile Pro
        35                  40                  45

Glu Leu Arg Glu Arg Ile Lys Asn Val Ala Glu Lys Thr Leu Glu Asp
    50                  55                  60

Glu Val Lys Ser Leu Ser Leu Asp Glu Val Ile Gly Glu Ile Ile Asp
65                  70                  75                  80

Leu Glu Leu Asp Asp Gln Ala Ile Ser Ile Leu Glu Ile Lys Gln Glu
                85                  90                  95

His Val Phe Ser Arg Asn Gln Ile Ala Arg Gly His His Leu Phe Ala
            100                 105                 110

Gln Ala Asn Ser Leu Ala Val Ala Val Ile Asp Asp Glu Leu Ala Leu
        115                 120                 125

Thr Ala Ser Ala Asp Ile Arg Phe Thr Arg Gln Val Lys Gln Gly Glu
    130                 135                 140

Arg Val Val Ala Lys Ala Lys Val Thr Ala Val Glu Lys Glu Lys Gly
145                 150                 155                 160

Arg Thr Val Val Glu Val Asn Ser Tyr Val Gly Glu Glu Ile Val Phe
                165                 170                 175

Ser Gly Arg Phe Asp Met Tyr Arg Ser Lys His Ser
            180                 185
```

-continued

<210> SEQ ID NO 30
<211> LENGTH: 40
<212> TYPE: DNA
<213> ORGANISM: Artificial Sequence
<220> FEATURE:
<223> OTHER INFORMATION: Synthetic Construct

<400> SEQUENCE: 30
cctaggacta ttagtaccta gtcttaattg tccggcatcc 40

<210> SEQ ID NO 31
<211> LENGTH: 40
<212> TYPE: DNA
<213> ORGANISM: Artificial Sequence
<220> FEATURE:
<223> OTHER INFORMATION: Synthetic Construct

<400> SEQUENCE: 31
ggatgccgga caattaagac taggtactaa tagtcctagg 40

<210> SEQ ID NO 32
<211> LENGTH: 32
<212> TYPE: DNA
<213> ORGANISM: Artificial Sequence
<220> FEATURE:
<223> OTHER INFORMATION: Synthetic Construct

<400> SEQUENCE: 32
gtactaatag tcccacacct atagtgagtc gt 32

<210> SEQ ID NO 33
<211> LENGTH: 21
<212> TYPE: DNA
<213> ORGANISM: Artificial Sequence
<220> FEATURE:
<223> OTHER INFORMATION: Synthetic Construct

<400> SEQUENCE: 33
ctctacaaaa agcttgggcc c 21

<210> SEQ ID NO 34
<211> LENGTH: 37
<212> TYPE: DNA
<213> ORGANISM: Artificial Sequence
<220> FEATURE:
<223> OTHER INFORMATION: Synthetic Construct

<400> SEQUENCE: 34
tataggtgtg ggactattag tacctagtct taattgt 37

<210> SEQ ID NO 35
<211> LENGTH: 19
<212> TYPE: DNA
<213> ORGANISM: Artificial Sequence
<220> FEATURE:
<223> OTHER INFORMATION: Synthetic Construct

<400> SEQUENCE: 35
gcccaagctt tttgtagag 19

<210> SEQ ID NO 36
<211> LENGTH: 42
<212> TYPE: DNA
<213> ORGANISM: Artificial Sequence
<220> FEATURE:
<223> OTHER INFORMATION: Synthetic Construct -continued

```
<220> FEATURE:
<221> NAME/KEY: V
<222> LOCATION: (1)..(42)
<223> OTHER INFORMATION: A, C, or G
<220> FEATURE:
<221> NAME/KEY: R
<222> LOCATION: (1)..(42)
<223> OTHER INFORMATION: A or G
<220> FEATURE:
<221> NAME/KEY: H
<222> LOCATION: (1)..(42)
<223> OTHER INFORMATION: A, C, or T

<400> SEQUENCE: 36

gatcctccac tccgcggtav rgagghtgcc atatgcgccg ca                    42


<210> SEQ ID NO 37
<211> LENGTH: 42
<212> TYPE: DNA
<213> ORGANISM: Artificial Sequence
<220> FEATURE:
<223> OTHER INFORMATION: Synthetic Construct
<220> FEATURE:
<221> NAME/KEY: D
<222> LOCATION: (1)..(42)
<223> OTHER INFORMATION: A, G, or T
<220> FEATURE:
<221> NAME/KEY: Y
<222> LOCATION: (1)..(42)
<223> OTHER INFORMATION: C or T
<220> FEATURE:
<221> NAME/KEY: B
<222> LOCATION: (1)..(42)
<223> OTHER INFORMATION: C, G, or T

<400> SEQUENCE: 37

tgcggcgcat atggcadcct cybtaccgcg gagtggagga tc                    42
```

BIOSENSORS FOR POLYKETIDE EXTENDER UNITS AND USES THEREOF

CROSS-REFERENCE TO RELATED APPLICATIONS

This is a national stage application of International Application No. PCT/US2020/033960, filed May 21, 2020, and titled "BIOSENSORS FOR POLYKETIDE EXTENDER UNITS AND USES THEREOF,", which claims priority to U.S. Provisional Application 62/850,608, filed on May 21, 2019, the entire contents of which are fully incorporated herein by reference.

STATEMENT REGARDING FEDERALLY SPONSORED RESEARCH

This invention was made with government support under grant numbers GM104258 and GM124112 awarded by the National Institutes of Health. The government has certain rights in the invention.

FIELD

The present disclosure relates to biosensors for detecting polyketide extender units.

BACKGROUND

Engineered bacterial transcriptional regulators have contributed immensely to chemical and synthetic biology by providing highly modular and tunable devices for sensing small molecules. By coupling them to fluorescent or chromogenic readouts, transcription factor-based biosensors have been applied as tools that detect key metabolites, regulate biosynthetic circuits, guide metabolic engineering, and enable directed evolution of enzymes and pathways. Yet, biosensors for the detection of natural products and their biosynthetic precursors are not yet widely available, limiting the ability of high-throughput strategies to be applied to many important classes of molecules. For instance, malonyl-CoA (mCoA) plays an integral role in cellular primary and secondary metabolism as a building block for fatty acids, phenylpropanoids, polyketides, and hybrid natural products. Because of this, mCoA biosynthesis has been a longstanding target of metabolic engineering efforts. Accordingly, genetically-encoded biosensors for the detection of mCoA have been constructed using FapR, a transcriptional regulator found in nearly all Gram-positive bacteria and acts as a global regulator for fatty acid biosynthesis. Crystal structures of FapR indicate a dimer, whereby each monomer is comprised of a C-terminal ligand-binding domain and an N-terminal domain that binds to its cognate DNA operator, fapO. Depending on the promoter, FapR has been shown to act as either an activator or a repressor in the presence of its native ligand, mCoA.

Given its utility as a transcriptional regulator, FapR has been developed and utilized as a mCoA biosensor in several hosts including *E. coli*, yeast, and mammalian cells. Notably, none of the previously reported FapR-based mCoA biosensors were utilized for detection of ligands beyond mCoA. Indeed, compounds related to mCoA such as acetyl-CoA, propionyl-CoA, succinyl-CoA, and butyryl-CoA have been reported to be non-effectors of FapR. Furthermore, despite the important role of mCoA derivatives substituted at the C2 position as extender unit building blocks for many biologically-relevant polyketides, genetically-encoded biosensors for C2-derivatives of mCoA have yet to be reported. What is needed are improved systems and methods for detecting a broad range of polyketide extender units beyond mCoA.

SUMMARY

Disclosed herein are biosensor systems and methods for detecting polyketide synthase extender units.

In some aspects, disclosed herein is a biosensor system comprising:

- a first nucleic acid comprising a genetically modified fapR gene, wherein the nucleic acid comprises at least one genetic mutation when compared to the wild-type fapR gene, and wherein the first nucleic acid is operably linked to a first promoter; and
- a second nucleic acid comprising a reporter gene whose transcription is under the control of a second promoter which is regulated by the fapR transcription factor.

In some embodiments, the first nucleic acid and the second nucleic acid are located on one recombinant DNA vector.

In some embodiments, the first nucleic acid and second nucleic acid do not comprise a lacO sequence.

In some embodiments, the first nucleic acid comprises a first ribosome binding site. In some embodiments, the second nucleic acid comprises a second ribosome binding site and a fapO operator. In some embodiments, the first promoter and the second promoter initiate transcription in opposite directions. In some embodiments, the first promoter and the second promoter initiate transcription in the same direction.

In some embodiments, the first ribosome binding site sequence is TAVRCAGGH (SEQ ID NO:2); wherein V is A, C, or G; wherein R is A or G; and wherein H is A, C, or T. In some embodiments, the first ribosome binding site sequence is selected from the group consisting of SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, and SEQ ID NO:20.

In some embodiments, the wild-type fapR gene comprises the polynucleotide sequence of SEQ ID NO:25. In some embodiments, the genetically modified fapR gene encodes a fapR protein comprising a F99L amino acid substitution when compared to SEQ ID NO:29. In some embodiments, the genetically modified fapR gene comprises the polynucleotide sequence of SEQ ID NO:24. In some embodiments, the genetically modified fapR gene confers detection of one or more polyketide synthase extender units. In some embodiments, the one or more polyketide synthase extender units comprise malonyl-CoA or an α-substituted derivative thereof. In some embodiments, the α-substituted derivative comprises a substituent selected from the group consisting of alkyl, alkynyl, and alkenyl. In some embodiments, the α-substituted derivative comprises methylmalonyl-CoA or propargylmalonyl-CoA.

In some embodiments, the reporter gene comprises a gene encoding for chloramphenicol acetyltransferase, beta-galactosidase, luciferase, or a fluorescent protein. In some embodiments, the fluorescent protein comprises Superfolder GFP.

In some aspects, disclosed herein is a recombinant DNA vector comprising the biosensor system of any preceding aspect.

In some aspects, disclosed herein is a method for detecting one or more polyketide synthase extender units, said method comprising:

1) introducing into a cell a recombinant DNA vector comprising:
   a first nucleic acid comprising a genetically modified fapR gene, wherein the nucleic acid comprises at least one genetic mutation when compared to the wild-type fapR gene, and wherein the first nucleic acid is operably linked to a first promoter; and
   a second nucleic acid comprising a reporter gene whose transcription is under the control of a second promoter which is regulated by the fapR transcription factor; and
2) measuring the one or more polyketide synthase extender units based on the expression of the reporter gene in the cell.

In some embodiments, the cell comprises a bacterial cell, a mammalian cell, or a yeast cell. In some embodiments, the bacterial cell comprises an *E. coli* cell.

In some aspects, disclosed herein is a cell-free biosensor system, comprising:

a recombinant DNA vector comprising: a reporter gene whose transcription is under the control of a promoter, a fapO operator, and a ribosome binding site;
a fapR transcription factor; and
transcription-translation reagents comprising a polymerase and/or a ribosome.

In some embodiments, the promoter comprises a T7 promoter. In some embodiments, the fapR transcription factor confers detection of one or more polyketide synthase extender units.

In some aspects, disclosed herein is a cell-free method for detecting one or more polyketide synthase extender units, said method comprising:

combining the cell-free biosensor system of any preceding aspect with one or more polyketide synthase extender units; and
measuring the one or more polyketide synthase extender units based on the expression of the reporter gene.

BRIEF DESCRIPTION OF THE DRAWINGS

The accompanying figures, which are incorporated in and constitute a part of this specification, illustrate several aspects described below.

FIG. 2A is a scheme showing a previous synthetic gene circuit regulated by IPTG and mCoA. FIG. 2B is a scheme showing a redesigned synthetic gene circuit regulated only by mCoA. At low levels of mCoA, FapR binds to its cognate operator and represses transcription. At increased levels, mCoA binds to FapR and causes a conformational change, allowing transcription of a fluorescent reporter gene. IPTG, isopropyl β-D-1-thiogalactopyranoside; lacI, *E. coli* lactose repressor; T7, bacteriophage T7 promoter; lacO, lad repressor binding site; RBS, ribosome binding site; fapR, *B. subtilis* fatty acid biosynthetic pathway repressor; fapO, FapR repressor binding site; eGFP, enhanced GFP; mCoA, malonyl-CoA; $Pro_{fapR/sfGFP}$, constitutive lac promoters; sfGFP, superfolder GFP.

FIG. 5A shows the mCoA-binding pocket of FapR (PDB: 2F3X) with key residues highlighted (green sticks). Dashed lines are hydrogen bonds (purple). The bound mCoA is shown (white sticks). The ribbon structure of each subunit of the homodimer is shown in light green and light cyan. FIG. 5B shows structures of each analogue tested with FapR. FIG. 5C is a scheme showing the layout of the cell-free biosensor, pET28a-T7-fapO-sfGFP. FIG. 5D shows fluorescence output of the cell-free biosensor pET28a-FapR/T7-fapO-sfGFP in the presence of each thioester at 200 μM. The output in the presence of the native effector mCoA is set to 100%. The (–) thioester control is boiled MatB. Error bars are the standard deviation of the mean (3 biological replicates). *$p<0.05$ by Student's unpaired two-tailed t-test vs. (–) thioester control. **$p<0.01$ by Student's unpaired two-tailed t-test vs. (–) thioester control.

DETAILED DESCRIPTION

Figure 1:
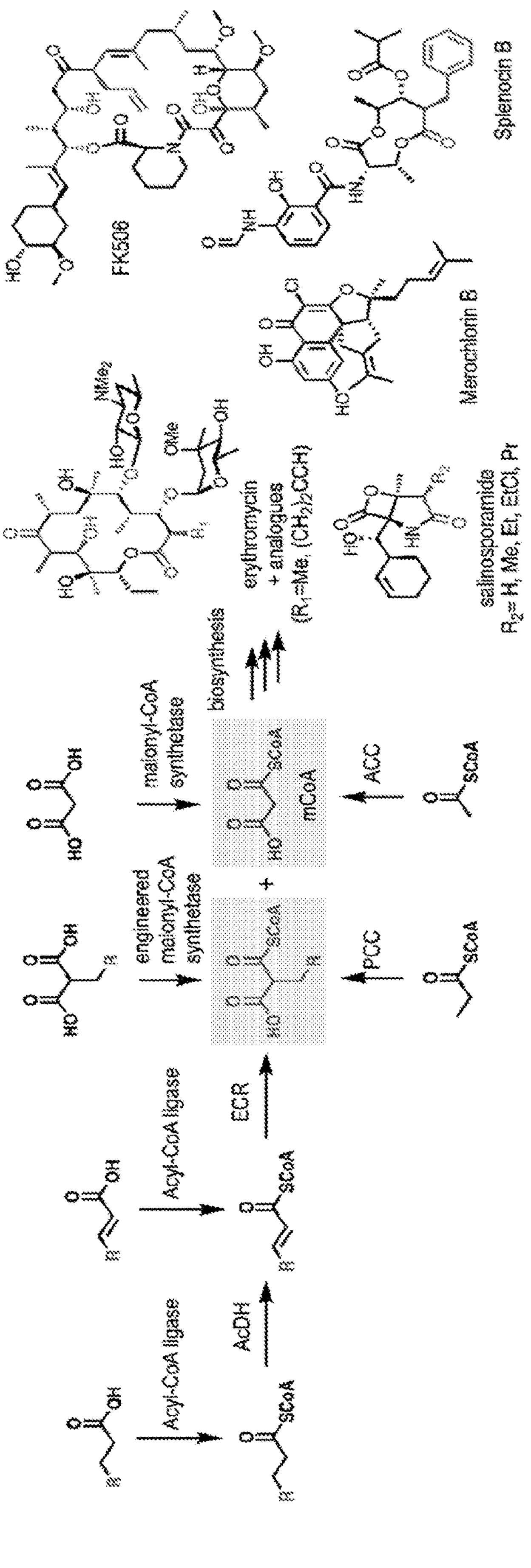
FIG. 1 shows biosynthesis and uses of malonyl-CoA analogues. Natural and engineered biosynthetic pathways for mCoA (1) and derivatives involve acyl-CoA ligases, acetyl-CoA dehydrogenases (AcDH), enoyl-CoA-reductases (ECR), malonyl-CoA synthetases, and various acyl-CoA carboxylases (propionyl-CoA carboxylase, PCC; acetyl-CoA carboxylase, ACC). Co-substrates and cofactors are omitted for clarity. Examples of clinically-relevant compounds that utilize malonyl-CoA and its derivatives are shown.

Engineered bacterial transcriptional regulators have contributed immensely to chemical and synthetic biology by providing highly modular and tunable devices for sensing small molecules. By coupling them to fluorescent or chromogenic readouts, transcription factor-based biosensors have been applied as tools that detect key metabolites, regulate biosynthetic circuits, guide metabolic engineering, and enable directed evolution of enzymes and pathways. Yet, biosensors for the detection of natural products and their biosynthetic precursors are not yet widely available, limiting the ability of high-throughput strategies to be applied to many important classes of molecules. For instance, malonyl-CoA (mCoA) plays an integral role in cellular primary and secondary metabolism as a building block for fatty acids, phenylpropanoids, polyketides, and hybrid natural products. Because of this, mCoA biosynthesis has been a longstanding target of metabolic engineering efforts. Accordingly, genetically-encoded biosensors for the detection of mCoA have been constructed using FapR, a transcriptional regulator found in nearly all Gram-positive bacteria and acts as a global regulator for fatty acid biosynthesis. Crystal structures of FapR indicate a dimer, whereby each monomer is comprised of a C-terminal ligand-binding domain and an N-terminal domain that binds to its cognate DNA operator, fapO. Dependent on the promoter, FapR has been shown to act as either an activator or a repressor in the presence of its native ligand, mCoA.

Given its utility as a transcriptional regulator, FapR has been developed and utilized as a mCoA biosensor in several hosts including *E. coli*, yeast, and mammalian cells. Notably, none of the previously reported FapR-based mCoA biosensors were utilized for detection of ligands beyond mCoA. Indeed, compounds related to mCoA such as acetyl-CoA, propionyl-CoA, succinyl-CoA, and butyryl-CoA have been reported to be non-effectors of FapR. Furthermore, despite the important role of mCoA derivatives substituted at the C2 position as extender unit building blocks for many biologically-relevant polyketides, genetically-encoded biosensors for C2-derivatives of mCoA have yet to be reported. What is needed are improved systems and methods for detecting a broad range of polyketide extender units beyond just mCoA.

Herein, the FapR biosensor was re-engineered for a range of mCoA concentrations across a panel of *E. coli* strains. The effector specificity of FapR was probed by cell-free transcription-translation, revealing that a variety of non-native and non-natural acyl-thioesters are FapR effectors. This FapR promiscuity proved sufficient for the detection of the polyketide extender unit methylmalonyl-CoA in *E. coli*, providing the first reported genetically encoded biosensor for this important metabolite. As such, the previously unknown broad effector promiscuity of FapR provides a platform to develop new tools and approaches that can be leveraged to overcome limitations of pathways that construct diverse α-carboxyacyl-CoAs and those that are dependent on them, including biofuels, antibiotics, anticancer drugs, and other value-added products.

Described herein is a platform technology that comprises genetically-encoded biosensors and methods for detection of a class of small molecules called polyketides. Such biosensors broadly recognize malonyl-CoA and its derivatives.

Reference will now be made in detail to the embodiments of the invention, examples of which are illustrated in the drawings and the examples. This invention may, however, be embodied in many different forms and should not be construed as limited to the embodiments set forth herein.

Unless defined otherwise, all technical and scientific terms used herein have the same meaning as commonly understood to one of ordinary skill in the art to which this disclosure belongs.

Terminology

Terms used throughout this application are to be construed with ordinary and typical meaning to those of ordinary skill in the art. However, Applicant desires that the following terms be given the particular definition as defined below.

As used herein, the article “a,” “an,” and “the” means “at least one,” unless the context in which the article is used clearly indicates otherwise.

The term “comprising” and variations thereof as used herein is used synonymously with the term “including” and variations thereof and are open, non-limiting terms. Although the terms “comprising” and “including” have been used herein to describe various embodiments, the terms “consisting essentially of” and “consisting of” can be used in place of “comprising” and “including” to provide for more specific embodiments and are also disclosed.

As used herein, the terms “may,” “optionally,” and “may optionally” are used interchangeably and are meant to include cases in which the condition occurs as well as cases in which the condition does not occur. Thus, for example, the statement that a formulation “may include an excipient” is meant to include cases in which the formulation includes an excipient as well as cases in which the formulation does not include an excipient.

The terms “about” and “approximately” are defined as being “close to” as understood by one of ordinary skill in the art. In one non-limiting embodiment, the terms are defined to be within 10%. In another non-limiting embodiment, the terms are defined to be within 5%. In still another non-limiting embodiment, the terms are defined to be within 1%.

The term “biosensor” is defined as an analytical tool comprised of biological components that are used to detect the presence of target ligand(s) and to generate a signal. As used herein, biosensors can detect polyketide synthase extender units.

A "composition" is intended to include a combination of active agent and another compound or composition, inert (for example, a detectable agent or label) or active, such as an adjuvant.

The term "nucleic acid" as used herein means a polymer composed of nucleotides, e.g. deoxyribonucleotides or ribonucleotides.

The terms "ribonucleic acid" and "RNA" as used herein mean a polymer composed of ribonucleotides.

The terms "deoxyribonucleic acid" and "DNA" as used herein mean a polymer composed 20 of deoxyribonucleotides.

The term "oligonucleotide" denotes single- or double-stranded nucleotide multimers of from about 2 to up to about 100 nucleotides in length. Suitable oligonucleotides may be prepared by the phosphoramidite method described by Beaucage and Carruthers, *Tetrahedron Lett.,* 22: 1859-1862 (1981), or by the triester method according to Matteucci, et al., *J. Am. Chem. Soc.,* 103:3185 (1981), both incorporated herein by reference, or by other chemical methods using either a commercial automated oligonucleotide synthesizer or VLSIPS™ technology. When oligonucleotides are referred to as "double-stranded," it is understood by those of skill in the art that a pair of oligonucleotides exist in a hydrogen-bonded, helical array typically associated with, for example, DNA. In addition to the 100% complementary form of double-stranded oligonucleotides, the term "double-stranded," as used herein is also meant to refer to those forms which include such structural features as bulges and loops, described more fully in such biochemistry texts as Stryer, *Biochemistry*, Third Ed., (1988), incorporated herein by reference for all purposes.

The term "polynucleotide" refers to a single or double stranded polymer composed of nucleotide monomers.

The term "polypeptide" refers to a compound made up of a single chain of D- or L-amino acids or a mixture of D- and L-amino acids joined by peptide bonds.

The term "promoter" or "regulatory element" refers to a region or sequence determinants located upstream or downstream from the start of transcription and which are involved in recognition and binding of RNA polymerase and other proteins to initiate transcription. Promoters need not be of bacterial origin, for example, promoters derived from viruses or from other organisms can be used in the compositions, systems, or methods described herein.

The term "recombinant" refers to a human manipulated nucleic acid (e.g. polynucleotide) or a copy or complement of a human manipulated nucleic acid (e.g. polynucleotide), or if in reference to a protein (i.e, a "recombinant protein"), a protein encoded by a recombinant nucleic acid (e.g. polynucleotide). In some embodiments, a recombinant expression cassette comprising a promoter operably linked to a second nucleic acid (e.g. polynucleotide) may include a promoter that is heterologous to the second nucleic acid (e.g. polynucleotide) as the result of human manipulation (e.g., by methods described in Sambrook et al., *Molecular Cloning—A Laboratory Manual*, Cold Spring Harbor Laboratory, Cold Spring Harbor, N.Y., (1989) or Current Protocols in Molecular Biology Volumes 1-3, John Wiley & Sons, Inc. (1994-1998)). In another example, a recombinant expression cassette may comprise nucleic acids (e.g. polynucleotides) combined in such a way that the nucleic acids (e.g. polynucleotides) are extremely unlikely to be found in nature. For instance, human manipulated restriction sites or plasmid vector sequences may flank or separate the promoter from the second nucleic acid (e.g. polynucleotide). One of skill will recognize that nucleic acids (e.g. polynucleotides) can be manipulated in many ways and are not limited to the examples above.

The term "expression cassette" or "vector" refers to a nucleic acid construct, which when introduced into a host cell, results in transcription and/or translation of a RNA or polypeptide, respectively. In some embodiments, an expression cassette comprising a promoter operably linked to a second nucleic acid (e.g. polynucleotide) may include a promoter that is heterologous to the second nucleic acid (e.g. polynucleotide) as the result of human manipulation (e.g., by methods described in Sambrook et al., *Molecular Cloning—A Laboratory Manual*, Cold Spring Harbor Laboratory, Cold Spring Harbor, N.Y., (1989) or Current Protocols in Molecular Biology Volumes 1-3, John Wiley & Sons, Inc. (1994-1998)).

The terms "identical" or percent "identity," in the context of two or more nucleic acids or polypeptide sequences, refer to two or more sequences or subsequences that are the same or have a specified percentage of amino acid residues or nucleotides that are the same (i.e., about 60% identity, preferably 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or higher identity over a specified region when compared and aligned for maximum correspondence over a comparison window or designated region) as measured using a BLAST or BLAST 2.0 sequence comparison algorithms with default parameters described below, or by manual alignment and visual inspection (see, e.g., NCBI web site or the like). Such sequences are then said to be "substantially identical." This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 10 amino acids or 20 nucleotides in length, or more preferably over a region that is 10-50 amino acids or 20-50 nucleotides in length. As used herein, percent (%) nucleotide sequence identity is defined as the percentage of amino acids in a candidate sequence that are identical to the nucleotides in a reference sequence, after aligning the sequences and introducing gaps, if necessary, to achieve the maximum percent sequence identity. Alignment for purposes of determining percent sequence identity can be achieved in various ways that are within the skill in the art, for instance, using publicly available computer software such as BLAST, BLAST-2, ALIGN, ALIGN-2 or Megalign (DNASTAR) software. Appropriate parameters for measuring alignment, including any algorithms needed to achieve maximal alignment over the full-length of the sequences being compared can be determined by known methods.

For sequence comparisons, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

One example of an algorithm that is suitable for determining percent sequence identity and sequence similarity are the BLAST and BLAST 2.0 algorithms, which are described in Altschul et al. (1977) *Nuc. Acids Res.* 25:3389-3402, and Altschul et al. (1990) *J. Mol. Biol.* 215:403-410, respectively. Software for performing BLAST analyses is publicly available through the National Center for Biotechnology Information. This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al. (1990) *J. Mol. Biol.* 215:403-410). These initial neighborhood word hits act as seeds for initiating searches to find longer HSPs containing them. The word hits are extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) or 10, M=5, N=−4 and a comparison of both strands. For amino acid sequences, the BLASTP program uses as defaults a wordlength of 3, and expectation (E) of 10, and the BLOSUM62 scoring matrix (see Henikoff and Henikoff (1989) *Proc. Natl. Acad. Sci. USA* 89:10915) alignments (B) of 50, expectation (E) of 10, M=5, N=−4, and a comparison of both strands.

The BLAST algorithm also performs a statistical analysis of the similarity between two sequences (see, e.g., Karlin and Altschul (1993) *Proc. Natl. Acad. Sci. USA* 90:5873-5787). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, more preferably less than about 0.01.

The phrase "codon optimized" as it refers to genes or coding regions of nucleic acid molecules for the transformation of various hosts, refers to the alteration of codons in the gene or coding regions of polynucleic acid molecules to reflect the typical codon usage of a selected organism without altering the polypeptide encoded by the DNA. Such optimization includes replacing at least one, or more than one, or a significant number, of codons with one or more codons that are more frequently used in the genes of that selected organism.

Nucleic acid is "operably linked" when it is placed into a functional relationship with another nucleic acid sequence. For example, DNA for a presequence or secretory leader is operably linked to DNA for a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are near each other, and, in the case of a secretory leader, contiguous and in reading phase. However, operably linked nucleic acids (e.g. enhancers and coding sequences) do not have to be contiguous. Linking is accomplished by ligation at convenient restriction sites. If such sites do not exist, the synthetic oligonucleotide adaptors or linkers are used in accordance with conventional practice. In some embodiments, a promoter is operably linked with a coding sequence when it is capable of affecting (e.g. modulating relative to the absence of the promoter) the expression of a protein from that coding sequence (i.e., the coding sequence is under the transcriptional control of the promoter).

"Ribosome binding site" or "RBS" is also called the Shine Dalgarno sequence and generally has a sequence complementary to the 3' terminal of 16S rRNA. The ribosomal binding site is found in bacterial and archaeal messenger RNA, and is generally located about 8 bases upstream of the start codon AUG. In particular, the RBS sequence which appears at high frequency in AGGAGG or AAGGAGG (hereinafter these sequences are referred to as "consensus RBS sequences"), or a sequence homologous with "consensus RBS sequence". Although these sequences appear at various sites of genes, it is understood that the RBS sequences appear at high frequency in regions upstream of start codons. Also included in the term "RBS" is the RBS sequence from the FapR gene as disclosed herein (CAAGGAGGT (SEQ ID NO:1)). Other functional RBS sequences can also be used in place of the specific sequences disclosed herein. When discussing nucleotide mutations in the RBS, the first C is labeled as nucleotide "1" and the final T is labelled as nucleotide "9". Alternatively, the mutations may sometimes referred to by their relative position to the ATG start codon. The basic structure of a prokaryote gene consists of a promoter which starts the synthesis of mRNA, a ribosome binding site which participates in the binding between mRNA and ribosomes and in the translation initiation, a start codon, a translation stop codon and a terminator which terminates the synthesis of mRNA. AUG codon is the most appropriate as a start codon. Since the start codons and coding regions are determined usually based upon a DNA sequence, in the present specification, the sequences of start codons and stop codons and sequences involved in the binding of ribosomes and mRNA are expressed as DNA sequences appropriately as well as RNA sequences, unless mentioned specifically.

The term "gene" or "gene sequence" refers to the coding sequence or control sequence, or fragments thereof. A gene may include any combination of coding sequence and control sequence, or fragments thereof. Thus, a "gene" as referred to herein may be all or part of a native gene. A polynucleotide sequence as referred to herein may be used interchangeably with the term "gene", or may include any coding sequence, non-coding sequence or control sequence, fragments thereof, and combinations thereof. The term "gene" or "gene sequence" includes, for example, control sequences upstream of the coding sequence (for example, the ribosome binding site).

Compositions, Biosensors, and Methods of Use

In some aspects, disclosed herein is a biosensor system comprising:

a first nucleic acid comprising a genetically modified fapR gene, wherein the nucleic acid comprises at least one genetic mutation when compared to the wild-type fapR gene, and wherein the first nucleic acid is operably linked to a first promoter; and a second nucleic acid comprising a reporter gene whose transcription is under the control of a second promoter which is regulated by the fapR transcription factor.

In some embodiments, the first nucleic acid and the second nucleic acid are located on one recombinant DNA vector.

In some embodiments, the first nucleic acid and second nucleic acid do not comprise a lacO sequence.

In some embodiments, the first nucleic acid comprises a first ribosome binding site. In some embodiments, the second nucleic acid comprises a second ribosome binding site and a fapO operator. In some embodiments, the first promoter and the second promoter initiate transcription in opposite directions. In some embodiments, the first promoter and the second promoter initiate transcription in the same direction.

In some embodiments, the first ribosome binding site sequence is TAVRCAGGH (SEQ ID NO:2); wherein V is A, C, or G; wherein R is A or G; and wherein H is A, C, or T.

In some embodiments, the first ribosome binding site sequence is selected from the group consisting of SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, and SEQ ID NO:20. In some embodiments, the first ribosome binding site sequence comprises SEQ ID NO:3. In some embodiments, the first ribosome binding site sequence comprises SEQ ID NO:4. In some embodiments, the first ribosome binding site sequence comprises SEQ ID NO:5. In some embodiments, the first ribosome binding site sequence comprises SEQ ID NO:6. In some embodiments, the first ribosome binding site sequence comprises SEQ ID NO:7. In some embodiments, the first ribosome binding site sequence comprises SEQ ID NO:8. In some embodiments, the first ribosome binding site sequence comprises SEQ ID NO:9. In some embodiments, the first ribosome binding site sequence comprises SEQ ID NO:10. In some embodiments, the first ribosome binding site sequence comprises SEQ ID NO:11. In some embodiments, the first ribosome binding site sequence comprises SEQ ID NO:12. In some embodiments, the first ribosome binding site sequence comprises SEQ ID NO:13. In some embodiments, the first ribosome binding site sequence comprises SEQ ID NO:14. In some embodiments, the first ribosome binding site sequence comprises SEQ ID NO:15. In some embodiments, the first ribosome binding site sequence comprises SEQ ID NO:16. In some embodiments, the first ribosome binding site sequence comprises SEQ ID NO:17. In some embodiments, the first ribosome binding site sequence comprises SEQ ID NO:18. In some embodiments, the first ribosome binding site sequence comprises SEQ ID NO:19. In some embodiments, the first ribosome binding site sequence comprises SEQ ID NO:20.

In some embodiments, the first ribosome binding site sequence is selected from the group comprising a nucleic acid sequence at least 60% (for example, at least 60%, at least 65%, at least 70%, at least 75%, at least 80%, at least 85%, at least 90%, at least 95%, at least 96%, at least 97%, at least 98%, at least 99%) identical to SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, or SEQ ID NO:20.

In some embodiments, the wild-type fapR gene comprises a polynucleotide sequence at least 60% (for example, at least 60%, at least 65%, at least 70%, at least 75%, at least 80%, at least 85%, at least 90%, at least 95%, at least 96%, at least 97%, at least 98%, at least 99%) identical to SEQ ID NO:25. In some embodiments, the wild-type fapR gene comprises the polynucleotide sequence of SEQ ID NO:25.

In some embodiments, the genetically modified fapR gene comprises a polynucleotide sequence at least 60% (for example, at least 60%, at least 65%, at least 70%, at least 75%, at least 80%, at least 85%, at least 90%, at least 95%, at least 96%, at least 97%, at least 98%, at least 99%) identical to SEQ ID NO:24. In some embodiments, the genetically modified fapR gene comprises the polynucleotide sequence of SEQ ID NO:24. In some embodiments, the genetically modified fapR gene encodes a fapR protein comprising an amino acid substitution at residue F99 when compared to SEQ ID NO:29. In some embodiments, the genetically modified fapR gene encodes a fapR protein comprising a F99L amino acid substitution when compared to SEQ ID NO:29. In some embodiments, the genetically modified fapR gene encodes a fapR protein comprising the amino acid sequence of SEQ ID NO:28.

In some embodiments, the genetically modified fapR gene of the biosensor system disclosed herein comprises the polynucleotide sequence of SEQ ID NO:24 and the first ribosomal binding site comprises a polynucleotide sequence selected from SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, and SEQ ID NO:20. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:1. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:2. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:3. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:4. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:5. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:6. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:7. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:8. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:9. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:10. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:11. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:12. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:13. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:14. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:15. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:16. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:17. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:18. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:19. In some embodiments, the genetically modified fapR gene of the biosensor system disclosed herein comprises the polynucleotide sequence of SEQ ID NO:24 and the first ribosomal binding site comprises the polynucleotide sequence of SEQ ID NO:20.

In some embodiments, the genetically modified fapR gene confers detection of one or more polyketide synthase extender units.

Polyketides are assembled by successive rounds of decarboxylative Claisen condensations between a thioesterified malonate derivative and an acyl thioester. The enzyme that catalyzes these condensations is a "polyketide synthase". Polyketide synthases catalyze condensation reactions between an activated carboxylic acid (e.g. acetyl-CoA, which is the activated form of acetate) and an activated dicarboxylic acid (e.g. malonyl-CoA, which is the activated form of malonate). These condensation reactions take place through a decarboxylative Claisen condensation mechanism in which the activated carboxylic acid (e.g. acetyl-CoA) serves as "starter" or "primer" and the activated dicarboxylic acid (e.g. malonyl-CoA) serves as "extender" unit. This reaction involves the decarboxylation of the extender and results in the formation of a di- or polyketide that is two carbons longer than the starter.

In some embodiments, the one or more polyketide synthase extender units comprise malonyl-CoA or an α-substituted derivative thereof. The structure of malonyl-CoA is shown below:

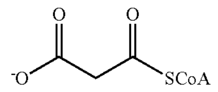

In some embodiments, the one or more polyketide synthase extender units is an α-substituted derivative of malonyl-CoA. The structure is shown below:

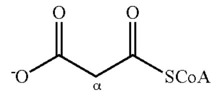

In some embodiments, the α-substituted derivative of malonyl-CoA comprises a substituent selected from the group consisting of alkyl, alkynyl, and alkenyl. In some embodiments, the α-substituted derivative of malonyl-CoA comprises an alkyl substituent. In some embodiments, the α-substituted derivative of malonyl-CoA comprises an alkynyl substituent. In some embodiments, the α-substituted derivative comprises an alkenyl substituent.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol.

The term "alkenyl" as used herein is a hydrocarbon group of from 2 to 24 carbon atoms with a structural formula containing at least one carbon-carbon double bond. Asymmetric structures such as (A1A2)C═C(A3A4) are intended to include both the E and Z isomers. This may be presumed in structural formulae herein wherein an asymmetric alkene is present, or it may be explicitly indicated by the bond symbol C═C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol.

The term "aryl" as used herein is a group that contains any carbon-based aromatic group including, but not limited to, benzene, naphthalene, phenyl, biphenyl, phenoxybenzene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl and heteroaryl group can be substituted or unsubstituted. The aryl and heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

In some embodiments, the α-substituted derivative of malonyl-CoA comprises methylmalonyl-CoA or propargylmalonyl-CoA. In some embodiments, the α-substituted derivative of malonyl-CoA is methylmalonyl-CoA. In some embodiments, the α-substituted derivative of malonyl-CoA is propargylmalonyl-CoA. The structures of methylmalonyl-CoA and propargylmalonyl-CoA are shown below:

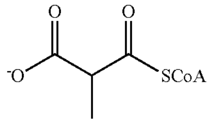

methylmalonyl-CoA (mmCoA)

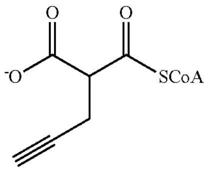

propargylmalonyl-CoA (pgmCoA)

In some embodiments, the α-substituted derivative of malonyl-CoA comprises a $C_1$-$C_6$ alkyl, a $C_2$-$C_6$ alkynyl, or a $C_2$-$C_6$ alkenyl. The structure can be, but is not limited to, the examples shown below:

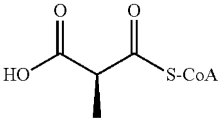

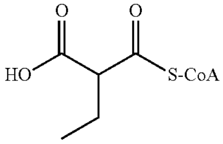

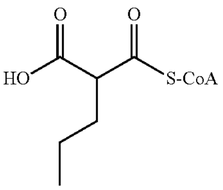

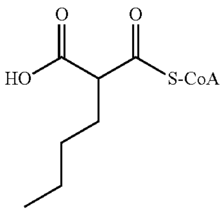

-continued

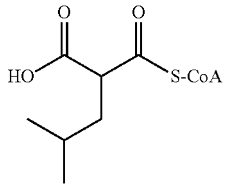

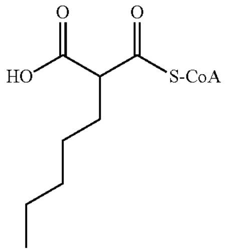

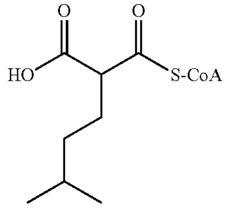

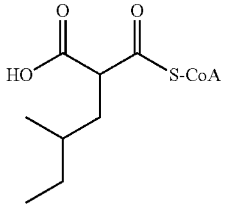

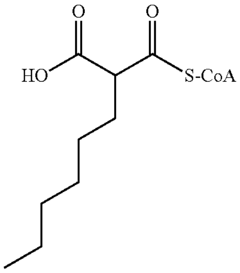

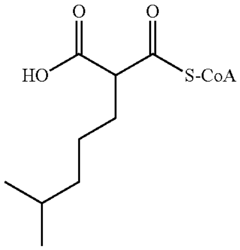

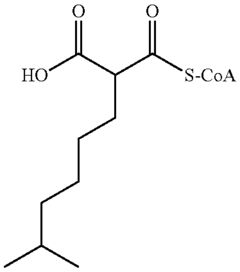

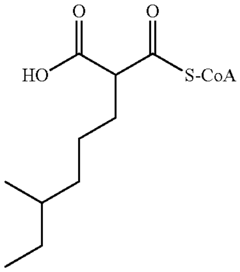

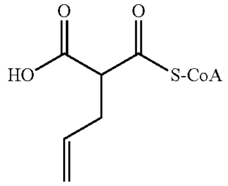

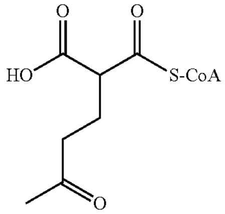

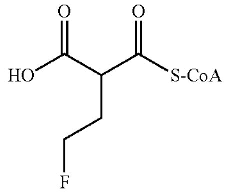

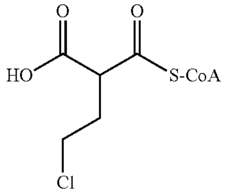

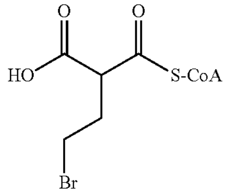

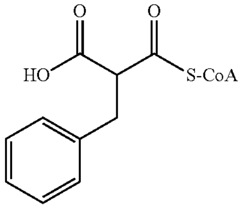

-continued

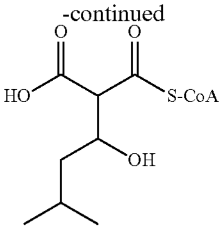

In some embodiments, the reporter gene (or marker gene) comprises a gene encoding for chloramphenicol acetyltransferase, beta-galactosidase, luciferase, or a fluorescent protein. In some embodiments, the fluorescent protein is Superfolder GFP.

In some embodiments, the biosensor system of any preceding aspect further comprises a gene encoding MatC and/or a gene encoding MatB. In some embodiments, the biosensor comprises a polynucleotide sequence at least 60% (for example, at least 60%, at least 65%, at least 70%, at least 75%, at least 80%, at least 85%, at least 90%, at least 95%, at least 96%, at least 97%, at least 98%, at least 99%) identical to SEQ ID NO:26. In some embodiments, the biosensor comprises the polynucleotide of SEQ ID NO:26. In some embodiments, the biosensor comprises a polynucleotide sequence at least 60% (for example, at least 60%, at least 65%, at least 70%, at least 75%, at least 80%, at least 85%, at least 90%, at least 95%, at least 96%, at least 97%, at least 98%, at least 99%) identical to SEQ ID NO:27. In some embodiments, the biosensor comprises the polynucleotide of SEQ ID NO:27.

In some aspects, disclosed herein is a recombinant DNA vector comprising the biosensor system of any preceding aspect.

In some aspects, disclosed herein is a method for making (manufacturing) a recombinant DNA vector comprising the biosensor system of any preceding aspect, said method comprising: construct a first nucleic acid and a second nucleic acid into the DNA vector; wherein the first nucleic acid comprising a genetically modified fapR gene that has at least one genetic mutation when compared to the wild-type fapR gene, and wherein the first nucleic acid is operably linked to a first promoter; and wherein the second nucleic acid comprising a reporter gene whose transcription is under the control of a second promoter which is regulated by the fapR transcription factor.

In some aspects, disclosed herein is a method for detecting one or more polyketide synthase extender units, said method comprising: 1) introducing into a cell a recombinant DNA vector comprising: a first nucleic acid comprising a genetically modified fapR gene, wherein the nucleic acid comprises at least one genetic mutation when compared to the wild-type fapR gene, and wherein the first nucleic acid is operably linked to a first promoter; and a second nucleic acid comprising a reporter gene whose transcription is under the control of a second promoter which is regulated by the fapR transcription factor; and 2) measuring the one or more polyketide synthase extender units based on the expression of the reporter gene in the cell.

In some embodiments, the cell comprises a bacterial cell, a mammalian cell, or a yeast cell. In some embodiments, the cell is a bacterial cell. In some embodiments, the bacterial cell comprises an *E. coli* cell.

In some embodiments, the vector comprises a plasmid based vector, an adenovirus vector, a vaccinia vector, or a retroviral vector. In some embodiments, the vector integrates into the genomic DNA of the cell. In some embodiments, the vector is an episomal vector.

In some aspects, disclosed herein is a cell-free biosensor system, comprising: a recombinant DNA vector comprising: a reporter gene whose transcription is under the control of a promoter, a fapO operator, and a ribosome binding site; a fapR transcription factor; and transcription-translation reagents comprising a polymerase and/or a ribosome.

In some aspects, disclosed herein is a cell-free biosensor system, comprising: a recombinant DNA vector comprising: a reporter gene whose transcription is under the control of a promoter, a fapO operator, and a ribosome binding site; wherein the DNA vector does not comprise a lacO sequence.

In some embodiments, the transcription-translation reagents are provided from a reconstituted protein synthesis system that comprises all the necessary components for in vitro transcription and translation (for example, PURExpress In Vitro Protein Synthesis Kit from New England Biolabs).

In some embodiments, the promoter comprises a T7 promoter. In some embodiments, the fapR transcription factor confers detection of one or more polyketide synthase extender units.

In some aspects, disclosed herein is a cell-free method for detecting one or more polyketide synthase extender units, said method comprising: combining the cell-free biosensor system of any preceding aspect with one or more polyketide synthase extender units; and measuring the one or more polyketide synthase extender units based on the expression of the reporter gene.

EXAMPLES

The following examples are set forth below to illustrate the compounds, systems, methods, and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1. Development of a Genetically-Encoded Biosensor for Detection of Polyketide Synthase Extender Units in *Escherichia coli*

Figure 2:
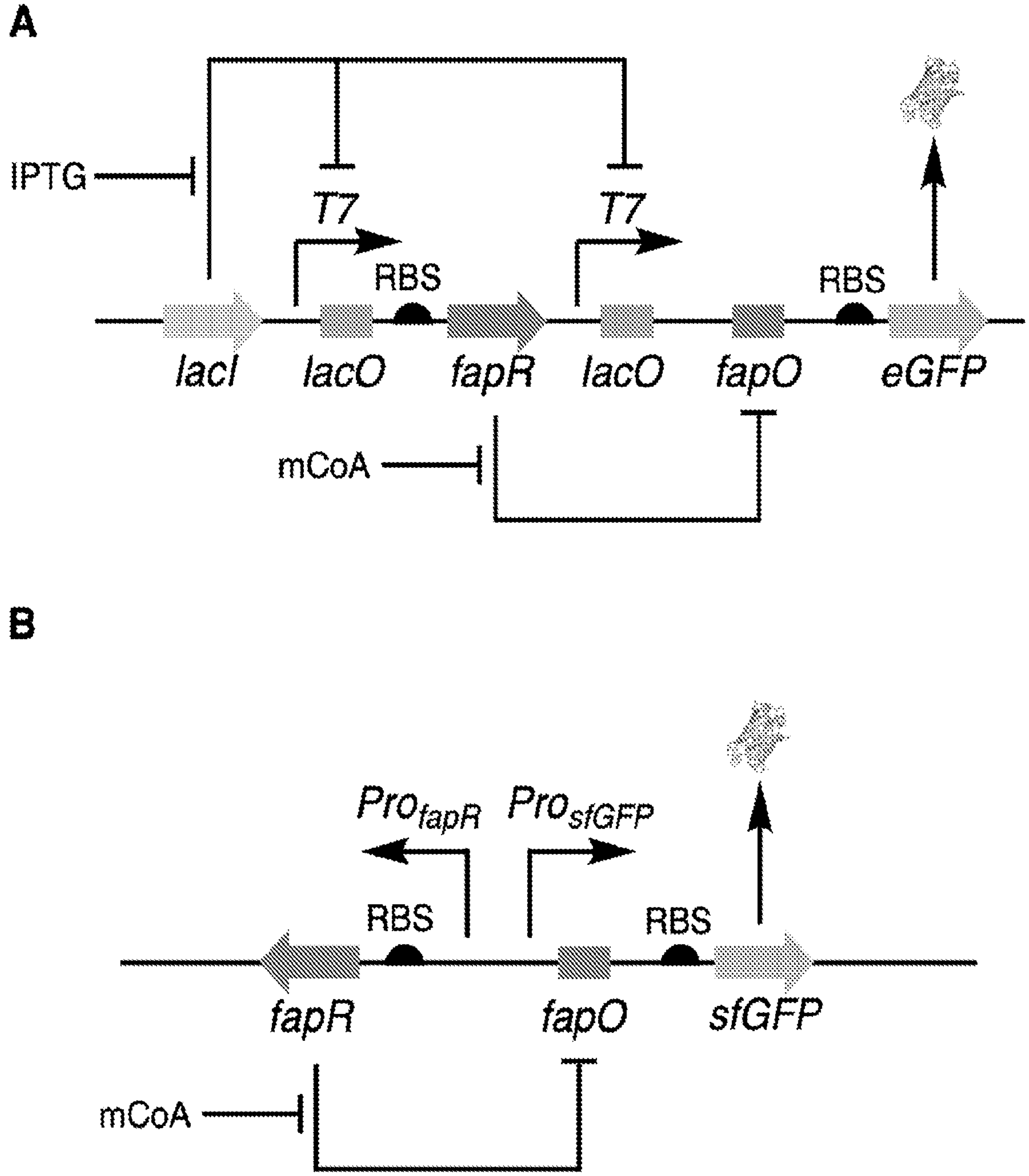
FIGS. 2A-2B illustrate redesigned malonyl-CoA biosensors.

Refactoring the FapR Operon for an Efficient Prototype Malonyl-CoA Biosensor. Previously published *E. coli* malonyl-CoA biosensors were based on FapR as a repressor (with the addition of a second effector molecule, e.g. IPTG) or FapR as an activator. Thus, these biosensors have been limited in their ability to be coupled with other protein expression systems and unnecessarily increase the metabolic burden on the host strain. To address this constraint, a biosensor construct was desired that required no external inputs to function and that was robust enough to use as a template for directed evolution of FapR or other proteins of interest. Towards this end, a new plasmid, pSENSE2FF, was designed based on the a previously described macrolide biosensor. Two constitutive lac promoters, ProsfGFP and ProfapR (pLacIQ), control the transcription of a fluorescent reporter gene (super-folder GFP, sfGFP) and a codon-optimized version of the fapR gene from *B. subtilis*, respectively. Downstream of ProsfGFP, a single copy of the 17 bp fapO operator was introduced to afford FapR control of reporter transcription (FIG. 2B and Table 1). Superfolder GFP (sfGFP) was selected due to its higher brightness, rapid folding, and low photobleaching compared with other GFP variants.

TABLE 1

Sequences of DNA Constructs. RBS 1A1 (CAAGGAGGT, SEQ ID NO: 1) for fapR in pSENSE2FF is underlined. For RBS 2H8, the sequence was TACACAGGC (SEQ ID NO: 10). The fapR_fapO fragment is bolded in pSENSE2FF.

| Construct | Nucleotide Sequences |
|---|---|
| FapR_pET28a | TGGCGAATGGGACGCGCCCTGTAGCGGCGCATTAAGCGCGGCGGGTGTGG |
| (SEQ ID NO: 21) | TGGTTACGCGCAGCGTGACCGCTACACTTGCCAGCGCCCTAGCGCCCGCT |
| | CCTTTCGCTTTCTTCCCTTCCTTTCTCGCCACGTTCGCCGGCTTTCCCCG |
| | TCAAGCTCTAAATCGGGGGCTCCCTTTAGGGTTCCGATTTAGTGCTTTAC |
| | GGCACCTCGACCCCAAAAAACTTGATTAGGGTGATGGTTCACGTAGTGGG |
| | CCATCGCCCTGATAGACGGTTTTTCGCCCTTTGACGTTGGAGTCCACGTT |
| | CTTTAATAGTGGACTCTTGTTCCAAACTGGAACAACACTCAACCCTATCT |
| | CGGTCTATTCTTTTGATTTATAAGGGATTTTGCCGATTTCGGCCTATTGG |
| | TTAAAAAATGAGCTGATTTAACAAAAATTTAACGCGAATTTTAACAAAAT |
| | ATTAACGTTTACAATTTCAGGTGGCACTTTTCGGGGAAATGTGCGCGGAA |
| | CCCCTATTTGTTTATTTTTCTAAATACATTCAAATATGTATCCGCTCATG |
| | AATTAATTCTTAGAAAAACTCATCGAGCATCAAATGAAACTGCAATTTAT |
| | TCATATCAGGATTATCAATACCATATTTTTGAAAAAGCCGTTTCTGTAAT |
| | GAAGGAGAAAACTCACCGAGGCAGTTCCATAGGATGGCAAGATCCTGGTA |
| | TCGGTCTGCGATTCCGACTCGTCCAACATCAATACAACCTATTAATTTCC |
| | CCTCGTCAAAAATAAGGTTATCAAGTGAGAAATCACCATGAGTGACGACT |
| | GAATCCGGTGAGAATGGCAAAAGTTTATGCATTTCTTTCCAGACTTGTTC |
| | AACAGGCCAGCCATTACGCTCGTCATCAAAATCACTCGCATCAACCAAAC |
| | CGTTATTCATTCGTGATTGCGCCTGAGCGAGACGAAATACGCGATCGCTG |
| | TTAAAAGGACAATTACAAACAGGAATCGAATGCAACCGGCGCAGGAACAC |
| | TGCCAGCGCATCAACAATATTTTCACCTGAATCAGGATATTCTTCTAATA |
| | CCTGGAATGCTGTTTTCCCGGGGATCGCAGTGGTGAGTAACCATGCATCA |
| | TCAGGAGTACGGATAAAATGCTTGATGGTCGGAAGAGGCATAAATTCCGT |
| | CAGCCAGTTTAGTCTGACCATCTCATCTGTAACATCATTGGCAACGCTAC |
| | CTTTGCCATGTTTCAGAAACAACTCTGGCGCATCGGGCTTCCCATACAAT |
| | CGATAGATTGTCGCACCTGATTGCCCGACATTATCGCGAGCCCATTTATA |
| | CCCATATAAATCAGCATCCATGTTGGAATTTAATCGCGGCCTAGAGCAAG |
| | ACGTTTCCCGTTGAATATGGCTCATAACACCCCTTGTATTACTGTTTATG |
| | TAAGCAGACAGTTTTATTGTTCATGACCAAAATCCCTTAACGTGAGTTTT |
| | CGTTCCACTGAGCGTCAGACCCCGTAGAAAAGATCAAAGGATCTTCTTGA |
| | GATCCTTTTTTTCTGCGCGTAATCTGCTGCTTGCAAACAAAAAAACCACC |
| | GCTACCAGCGGTGGTTTGTTTGCCGGATCAAGAGCTACCAACTCTTTTTC |
| | CGAAGGTAACTGGCTTCAGCAGAGCGCAGATACCAAATACTGTCCTTCTA |
| | GTGTAGCCGTAGTTAGGCCACCACTTCAAGAACTCTGTAGCACCGCCTAC |
| | ATACCTCGCTCTGCTAATCCTGTTACCAGTGGCTGCTGCCAGTGGCGATA |
| | AGTCGTGTCTTACCGGGTTGGACTCAAGACGATAGTTACCGGATAAGGCG |
| | CAGCGGTCGGGCTGAACGGGGGGTTCGTGCACACAGCCCAGCTTGGAGCG |
| | AACGACCTACACCGAACTGAGATACCTACAGCGTGAGCTATGAGAAAGCG |
| | CCACGCTTCCCGAAGGGAGAAAGGCGGACAGGTATCCGGTAAGCGGCAGG |
| | GTCGGAACAGGAGAGCGCACGAGGGAGCTTCCAGGGGGAAACGCCTGGTA |
| | TCTTTATAGTCCTGTCGGGTTTCGCCACCTCTGACTTGAGCGTCGATTTT |
| | TGTGATGCTCGTCAGGGGGGCGGAGCCTATGGAAAAACGCCAGCAACGCG |
| | GCCTTTTTACGGTTCCTGGCCTTTTGCTGGCCTTTTGCTCACATGTTCTT |
| | TCCTGCGTTATCCCCTGATTCTGTGGATAACCGTATTACCGCCTTTGAGT |
| | GAGCTGATACCGCTCGCCGCAGCCGAACGACCGAGCGCAGCGAGTCAGTG |
| | AGCGAGGAAGCGGAAGAGCGCCTGATGCGGTATTTTCTCCTTACGCATCT |
| | GTGCGGTATTTCACACCGCATATATGGTGCACTCTCAGTACAATCTGCTC |
| | TGATGCCGCATAGTTAAGCCAGTATACACTCCGCTATCGCTACGTGACTG |
| | GGTCATGGCTGCGCCCCGACACCCGCCAACACCCGCTGACGCGCCCTGAC |
| | GGGCTTGTCTGCTCCCGGCATCCGCTTACAGACAAGCTGTGACCGTCTCC |
| | GGGAGCTGCATGTGTCAGAGGTTTTCACCGTCATCACCGAAACGCGCGAG |
| | GCAGCTGCGGTAAAGCTCATCAGCGTGGTCGTGAAGCGATTCACAGATGT |
| | CTGCCTGTTCATCCGCGTCCAGCTCGTTGAGTTTCTCCAGAAGCGTTAAT |
| | GTCTGGCTTCTGATAAAGCGGGCCATGTTAAGGGCGGTTTTTTCCTGTTT |
| | GGTCACTGATGCCTCCGTGTAAGGGGGATTTCTGTTCATGGGGGTAATGA |
| | TACCGATGAAACGAGAGAGGATGCTCACGATACGGGTTACTGATGATGAA |
| | CATGCCCGGTTACTGGAACGTTGTGAGGGTAAACAACTGGCGGTATGGAT |
| | GCGGCGGGACCAGAGAAAAATCACTCAGGGTCAATGCCAGCGCTTCGTTA |
| | ATACAGATGTAGGTGTTCCACAGGGTAGCCAGCAGCATCCTGCGATGCAG |
| | ATCCGGAACATAATGGTGCAGGGCGCTGACTTCCGCGTTTCCAGACTTTA |
| | CGAAACACGGAAACCGAAGACCATTCATGTTGTTGCTCAGGTCGCAGACG |
| | TTTTGCAGCAGCAGTCGCTTCACGTTCGCTCGCGTATCGGTGATTCATTC |
| | TGCTAACCAGTAAGGCAACCCCGCCAGCCTAGCCGGGTCCTCAACGACAG |
| | GAGCACGATCATGCGCACCCGTGGGGCCGCCATGCCGGCGATAATGGCCT |
| | GCTTCTCGCCGAAACGTTTGGTGGCGGGACCAGTGACGAAGGCTTGAGCG |
| | AGGGCGTGCAAGATTCCGAATACCGCAAGCGACAGGCCGATCATCGTCGC |
| | GCTCCAGCGAAAGCGGTCCTCGCCGAAAATGACCCAGAGCGCTGCCGGCA |
| | CCTGTCCTACGAGTTGCATGATAAAGAAGACAGTCATAAGTGCGGCGACG |
| | ATAGTCATGCCCCGCGCCCACCGGAAGGAGCTGACTGGGTTGAAGGCTCT |
| | CAAGGGCATCGGTCGAGATCCCGGTGCCTAATGAGTGAGCTAACTTACAT |
| | TAATTGCGTTGCGCTCACTGCCCGCTTTCCAGTCGGGAAACCTGTCGTGC |
| | CAGCTGCATTAATGAATCGGCCAACGCGCGGGGAGAGGCGGTTTGCGTAT |
| | TGGGCGCCAGGGTGGTTTTTCTTTTCACCAGTGAGACGGGCAACAGCTGA |
| | TTGCCCTTCACCGCCTGGCCCTGAGAGAGTTGCAGCAAGCGGTCCACGCT |

TABLE 1-continued

Sequences of DNA Constructs. RBS 1A1 (CAAGGAGGT, SEQ ID NO: 1) for fapR in pSENSE2FF is underlined. For RBS 2H8, the sequence was TACACAGGC (SEQ ID NO: 10). The fapR_fapO fragment is bolded in pSENSE2FF.

| Construct | Nucleotide Sequences |
|---|---|
| | GGTTTGCCCCAGCAGGCGAAAATCCTGTTTGATGGTGGTTAACGGCGGGA |
| | TATAACATGAGCTGTCTTCGGTATCGTCGTATCCCACTACCGAGATATCC |
| | GCACCAACGCGCAGCCCGGACTCGGTAATGGCGCGCATTGCGCCCAGCGC |
| | CATCTGATCGTTGGCAACCAGCATCGCAGTGGGAACGATGCCCTCATTCA |
| | GCATTTGCATGGTTTGTTGAAAACCGGACATGGCACTCCAGTCGCCTTCC |
| | CGTTCCGCTATCGGCTGAATTTGATTGCGAGTGAGATATTTATGCCAGCC |
| | AGCCAGACGCAGACGCGCCGAGACAGAACTTAATGGGCCCGCTAACAGCG |
| | CGATTTGCTGGTGACCCAATGCGACCAGATGCTCCACGCCCAGTCGCGTA |
| | CCGTCTTCATGGGAGAAAATAATACTGTTGATGGGTGTCTGGTCAGAGAC |
| | ATCAAGAAATAACGCCGGAACATTAGTGCAGGCAGCTTCCACAGCAATGG |
| | CATCCTGGTCATCCAGCGGATAGTTAATGATCAGCCCACTGACGCGTTGC |
| | GCGAGAAGATTGTGCACCGCCGCTTTACAGGCTTCGACGCCGCTTCGTTC |
| | TACCATCGACACCACCACGCTGGCACCCAGTTGATCGGCGCGAGATTTAA |
| | TCGCCGCGACAATTTGCGACGGCGCGTGCAGGGCCAGACTGGAGGTGGCA |
| | ACGCCAATCAGCAACGACTGTTTGCCCGCCAGTTGTTGTGCCACGCGGTT |
| | GGGAATGTAATTCAGCTCCGCCATCGCCGCTTCCACTTTTTCCCGCGTTT |
| | TCGCAGAAACGTGGCTGGCCTGGTTCACCACGCGGGAAACGGTCTGATAA |
| | GAGACACCGGCATACTCTGCGACATCGTATAACGTTACTGGTTTCACATT |
| | CACCACCCTGAATTGACTCTCTTCCGGGCGCTATCATGCCATACCGCGAA |
| | AGGTTTTGCGCCATTCGATGGTGTCCGGGATCTCGACGCTCTCCCTTATG |
| | CGACTCCTGCATTAGGAAGCAGCCCAGTAGTAGGTTGAGGCCGTTGAGCA |
| | CCGCCGCCGCAAGGAATGGTGCATGCAAGGAGATGGCGCCCAACAGTCCC |
| | CCGGCCACGGGGCCTGCCACCATACCCACGCCGAAACAAGCGCTCATGAG |
| | CCCGAAGTGGCGAGCCCGATCTTCCCCATCGGTGATGTCGGCGATATAGG |
| | CGCCAGCAACCGCACCTGTGGCGCCGGTGATGCCGGCCACGATGCGTCCG |
| | GCGTAGAGGATCGAGATCTCGATCCCGCGAAATTAATACGACTCACTATA |
| | GGGGAATTGTGAGCGGATAACAATTCCCCTCTAGAAATAATTTTGTTTAA |
| | CTTTAAGAAGGAGATATACCATGGGCGCCGCAACAAACGCGAACGTCAA |
| | GAGCTGTTACAGCAAACCATCCAGGCGACGCCGTTTATTACCGACGAAGA |
| | ATTGGCAGGTAAGTTCGGCGTCTCGATTCAGACAATCCGTCTGGATCGTC |
| | TGGAGTTGTCCATTCCGGAATTGCGTGAACGTATTAAAAACGTCGCCGAA |
| | AAGACGTTAGAAGACGAGGTGAAATCTTTATCATTGGACGAGGTAATTGG |
| | CGAAATTATTGACCTTGAATTAGACGACCAGGCTATTTCAATTTTGGAGA |
| | TTAAACAGGAACACGTGTTCAGTCGTAACCAGATCGCCCGCGGTCATCAT |
| | CTGTTCGCGCAGGCCAACAGCCTGGCTGTGGCTGTTATTGATGACGAACT |
| | TGCGCTGACCGCTTCGGCAGACATCCGCTTTACCCGTCAGGTGAAACAAG |
| | GCGAGCGCGTCGTAGCGAAAGCTAAAGTTACCGCGGTTGAGAAGGAAAAA |
| | GGTCGTACGGTTGTGGAAGTCAACTCATACGTCGGCGAAGAAATCGTGTT |
| | TTCAGGACGTTTTGATATGTACCGCAGCAAACACAGCCTCGAGCACCACC |
| | ACCACCACCACTGAGATCCGGCTGCTAACAAAGCCCGAAAGGAAGCTGAG |
| | TTGGCTGCTGCCACCGCTGAGCAATAACTAGCATAACCCCTTGGGGCCTC |
| | TAAACGGGTCTTGAGGGGTTTTTTGCTGAAAGGAGGAACTATATCCGGAT |
| pSENSE2FF | GGTAATACGGTTATCCACAGAATCAGGGGATAACGCAGGAAAGAACATGT |
| (SEQ ID NO: 22) | GAGCAAAAGGCCAGCAAAAGGCCAGGAACCGTAAAAAGGCCGCGTTGCTG |
| | GCGTTTTTCCATAGGCTCCGCCCCCCTGACGAGCATCACAAAAATCGACG |
| | CTCAAGTCAGAGGTGGCGAAACCCGACAGGACTATAAAGATACCAGGCGT |
| | TTCCCCCTGGAAGCTCCCTCGTGCGCTCTCCTGTTCCGACCCTGCCGCTT |
| | ACCGGATACCTGTCCGCCTTTCTCCCTTCGGGAAGCGTGGCGCTTTCTCA |
| | TAGCTCACGCTGTAGGTATCTCAGTTCGGTGTAGGTCGTTCGCTCCAAGC |
| | TGGGCTGTGTGCACGAACCCCCCGTTCAGCCCGACCGCTGCGCCTTATCC |
| | GGTAACTATCGTCTTGAGTCCAACCCGGTAAGACACGACTTATCGCCACT |
| | GGCAGCAGCCACTGGTAACAGGATTAGCAGAGCGAGGTATGTAGGCGGTG |
| | CTACAGAGTTCTTGAAGTGGTGGCCTAACTACGGCTACACTAGAAGGACA |
| | GTATTTGGTATCTGCGCTCTGCTGAAGCCAGTTACCTTCGGAAAAAGAGT |
| | TGGTAGCTCTTGATCCGGCAAACAAACCACCGCTGGTAGCGGTGGTTTTT |
| | TTGTTTGCAAGCAGCAGATTACGCGCAGAAAAAAAGGATCTCAAGAAGAT |
| | CCTTTGATCTTTTCTACGGGGTCTGACGCTCAGTGGAACGAAAACTCACG |
| | TTAAGGGATTTTGGTCATGAGATTATCAAAAAGGATCTTCACCTAGATCC |
| | TTTTAAATTAAAAATGAAGTTTTAAATCAATCTAAAGTATCCATGGATAT |
| | GAGTAAACTTGGTCTGACAGTTACCAATGCTTAATCAGTGAGGCACCTAT |
| | CTCAGCGATCTGTCTATTTCGTTCATCCATAGTTGCCTGACTCCCCGTCG |
| | TGTAGATAACTACGATACGCGAGGGCTTACCATCTGGCCCCAGTGCTGCA |
| | ATGATACCGCGAGACCCACGCTCACCGGCTCCAGATTTATCAGCAATAAA |
| | CCAGCCAGCCGGAAGGGCCGAGCGCAGAAGTGGTCCTGCAACTTTATCCG |
| | CCTCCATCCAGTCTATTAATTGTTGCCGGGAAGCTAGAGTAAGTAGTTCG |
| | CCAGTTAATAGTTTGCGCAACGTTGTTGCCATTGCTACAGGCATCGTGGT |
| | GTCACGCTCGTCGTTTGGTATGGCTTCATTCAGCTCCGGTTCCCAACGAT |
| | CAAGGCGAGTTACATGATCCCCCATGTTGTGCAAAAAAGCGGTTAGCTCC |
| | TTCGGTCCTCCGATCGTTGTCAGAAGTAAGTTGGCCGCAGTGTTATCACT |
| | CATGGTTATGGCAGCACTGCATAATTCTCTTACTGTCATGCCATCCGTAA |
| | GATGCTTTTCTGTGACTGGTGAGTACTCAACCAAGTCATTCTGAGAATAG |
| | TGTATGCGGCGACCGAGTTGCTCTTGCCCGGCGTCAACACGGGATAATAC |
| | CGCGCCACATAGCAGAACTTTAAAAGTGCTCATCATTGGAAAACGTTCTT |

TABLE 1-continued

Sequences of DNA Constructs. RBS 1A1 (CAAGGAGGT, SEQ ID NO: 1) for fapR in pSENSE2FF is underlined. For RBS 2H8, the sequence was TACACAGGC (SEQ ID NO: 10). The fapR_fapO fragment is bolded in pSENSE2FF.

| Construct | Nucleotide Sequences |
|---|---|
| | CGGGGCGAAAACTCTCAAGGATCTTACCGCTGTTGAGATCCAGTTCGATG<br>TAACCCACTCGTGCACCCAACTGATCTTCAGCATCTTTTACTTTCACCAG<br>CGTTTCTGGGTGAGCAAAAACAGGAAGGCAAAATGCCGCAAAAAAGGGAA<br>TAAGGGCGACAGGGAAATGTTGAATACTCATACTCTTCCTTTTTCAATAT<br>TATTGAAGCATTTATCAGGGTTATTGTCTCATGAGCGGATACATATTTGA<br>ATGTATTTAGAAAAATAAACAAAAAGAGCATGCGTTTGTAGAAACGCAAA<br>AAGGCCATCCGTCAGGATGGCCTTCTGCTTAATTTGATGCCTGGCAGTTT<br>ATGGCGGGCGTCCTGCCCGCCACCCTCCGGGCCGTTGCTTCGCAACGTTC<br>AAATCCGCTCCCGGCGGATTTGTCCTACTCAGGAGAGCGTTCACCGACAA<br>ACAACAGATAAAACGAAAGGCCCAGTCTTTCGACTGAGCCTTTCGTTTTA<br>TTTGATGCCTGGCAGTTCCCTACTCTCGCATGGGGAGACCCCACACTACC<br>ATCGGCGCTACGGCGTTTCACTTCTGAGTTCGGCATGGGGTCAGGTGGGA<br>CCACCGCGCTACTGCCGCCAGGCAAATTCTGTTTTATCAGACCGCTTCTG<br>CGTTCTGATTTAATCTGTATCAGGCTGAAAATCTTCTCTCATCCGCCAAA<br>ACAGCCAAGCTGGAGACCGTTTAAACGGGCCCAAGCTTTTTGTAGAGCTC<br>ATCCATGCCATGTGTAATCCCAGCAGCAGTTACAAACTCAAGAAGGACCA<br>TGTGGTCACGCTTTTCGTTGGGATCTTTCGAAAGGACAGATTGTGTCGAC<br>AGGTAATGGTTGTCTGGTAAAAGGACAGGGCCATCGCCAATTGGAGTATT<br>TTGTTGATAATGGTCTGCTAGTTGAACGGAACCATCTTCAACGTTGTGGC<br>GAATTTTGAAGTTAGCTTTGATTCCATTCTTTTGTTTGTCTGCCGTGATG<br>TATACATTGTGTGAGTTAAAGTTGTACTCGAGTTTGTGTCCAAGAATGTT<br>TCCATCTTCTTTAAAATCAATACCCTTTAACTCGATACGATTAACAAGGG<br>TATCACCTTCAAACTTGACTTCAGCACGCGTCTTGTAGGTCCCGTCATCT<br>TTGAAAGATATAGTGCGTTCCTGTACATAACCTTCGGGCATGGCACTCTT<br>GAAAAAGTCATGCCGTTTCATGTGATCCGGATAACGGGAAAAGCATTGAA<br>CACCATAGGTCAGAGTAGTGACAAGTGTTGGCCACGGAACAGGTAGTTTT<br>CCAGTAGTGCAAATAAATTTAAGGGTGAGTTTTCCGTTTGTAGCATCACC<br>TTCACCCTCTCCACGGACAGAAAATTTGTGCCCATTAACATCACCATCTA<br>ATTCAACAAGAATTGGGACAACTCCAGTGAAAAGTTCTTCTCCTTTGCTC<br>ATACTAGT**AACTCCTTAGCTGTTTCGGATGCCGGACAATTAAGACTAGGT**<br>**ACTAATAGTCCTAGGCAACATACGAGCCGGAAGCATAAAGTGTAAAGCCT**<br>**GGGGTGCCTAATGAGTGAGCTAACTCACATTAATTGCGTTGCGCTCTAGA**<br>**TGGTGCAAAACCTTTCGCGGTATGGCATGATAGCGCCCAACGATCCTCCA**<br>**CTCCGCGGCAAGGAGGTTGCCATATGCGCCGCAACAAACGCGAACGTCAA**<br>**GAGCTGTTACAGCAAACCATCCAGGCGACGCCGTTTATTACCGACGAAGA**<br>**ATTGGCAGGTAAGTTCGGCGTCTCGATTCAGACAATCCGTCTGGATCGTC**<br>**TGGAGTTGTCCATTCCGGAATTGCGTGAACGTATTAAAAACGTCGCCGAA**<br>**AAGACGTTAGAAGACGAGGTGAAATCTTTATCATTGGACGAGGTAATTGG**<br>**CGAAATTATTGACCTTGAATTAGACGACCAGGCTATTTCAATTTTGGAGA**<br>**TTAAACAGGAACACGTGTTCAGTCGTAACCAGATCGCCCGCGGTCATCAT**<br>**CTGTTCGCGCAGGCCAACAGCCTGGCTGTGGCTGTTATTGATGACGAACT**<br>**TGCGCTGACCGCTTCGGCAGACATCCGCTTTACCCGTCAGGTGAAACAAG**<br>**GCGAGCGCGTCGTAGCGAAAGCTAAAGTTACCGCGGTTGAGAAGGAAAAA**<br>**GGTCGTACGGTTGTGGAAGTCAACTCATACGTCGGCGAAGAAATCGTGTT**<br>**TTCAGGACGTTTTGATATGTACCGCAGCAAACACAGCTAA**GGTACCCATA<br>GTATCCAAAATAAGGCTAAGAATTCATGGTCAGCAAGGGCGAAGAGGACA<br>ATATGGCGATCATCAAGGAGTTTATGAGATTCAAGGTACACATGGAGGGT<br>AGCGTTAACGGCCACGAGTTTGAAATCGAGGGTGAGGGCGAGGGTCGCCC<br>GTACGAGGGGACTCAGACGGCAAAGTTAAAAGTTACTAAAGGTGGTCCGC<br>TTCCTTTTGCGTGGGACATTCTTTCTCCGCAGTTTATGTATGGGAGTAAA<br>GCGTACGTCAAGCATCCAGCCGACATACCAGACTACCTTAAATTATCGTT<br>CCCCGAGGGGTTCAAGTGGGAGCGCGTGATGAACTTCGAAGATGGCGGAG<br>TGGTCACTGTGACCCAGGACTCCTCCCTTCAGGATGGGGAGTTCATATAT<br>AAAGTGAAACTTCGGGGGACCAATTTCCCGTCAGACGGCCCTGTCATGCA<br>GAAAAAGACTATGGGATGGGAAGCATCGAGCGAACGTATGTACCCAGAAG<br>ATGGGGCGTTAAAGGGGGAGATCAAACAGCGTCTGAAATTAAAAGACGGT<br>GGACACTACGATGCTGAGGTCAAAACTACTTACAAGGCTAAAAAACCCGT<br>GCAGCTTCCCGGTGCCTATAATGTTAATATTAAGTTGGACATCACGTCCC<br>ATAACGAAGACTATACAATTGTAGAACAGTATGAGGGGGCCGAAGGACGC<br>CACTCAACTGGAGGGATGGATGAGTTGTACAAATAGCTTAAGGTGTGCAG<br>AGTCCCTGCGGCAGGCGACGAACACGACCGTCGTCGATTAGTACCGGTAC<br>GGTCGGTGGTATCGAAGTCTTGATCACTGTACACTAGA |
| T7_fapO_sfGFP (SEQ ID NO: 23) | ACGGTTATCCACAGAATCAGGGGATAACGCAGGAAAGAACATGTGAGCAA<br>AAGGCCAGCAAAAGGCCAGGAACCGTAAAAAGGCCGCGTTGCTGGCGTTT<br>TTCCATAGGCTCCGCCCCCCTGACGAGCATCACAAAAATCGACGCTCAAG<br>TCAGAGGTGGCGAAACCCGACAGGACTATAAAGATACCAGGCGTTTCCCC<br>CTGGAAGCTCCCTCGTGCGCTCTCCTGTTCCGACCCTGCCGCTTACCGGA<br>TACCTGTCCGCCTTTCTCCCTTCGGGAAGCGTGGCGCTTTCTCATAGCTC<br>ACGCTGTAGGTATCTCAGTTCGGTGTAGGTCGTTCGCTCCAAGCTGGGCT<br>GTGTGCACGAACCCCCCGTTCAGCCCGACCGCTGCGCCTTATCCGGTAAC<br>TATCGTCTTGAGTCCAACCCGGTAAGACACGACTTATCGCCACTGGCAGC<br>AGCCACTGGTAACAGGATTAGCAGAGCGAGGTATGTAGGCGGTGCTACAG<br>AGTTCTTGAAGTGGTGGCCTAACTACGGCTACACTAGAAGGACAGTATTT |

TABLE 1-continued

Sequences of DNA Constructs. RBS 1A1 (CAAGGAGGT, SEQ ID NO: 1) for fapR in pSENSE2FF is underlined. For RBS 2H8, the sequence was TACACAGGC (SEQ ID NO: 10). The fapR_fapO fragment is bolded in pSENSE2FF.

| Construct | Nucleotide Sequences |
|---|---|
| | GGTATCTGCGCTCTGCTGAAGCCAGTTACCTTCGGAAAAAGAGTTGGTAG<br>CTCTTGATCCGGCAAACAAACCACCGCTGGTAGCGGTGGTTTTTTTGTTT<br>GCAAGCAGCAGATTACGCGCAGAAAAAAAGGATCTCAAGAAGATCCTTTG<br>ATCTTTTCTACGGGGTCTGACGCTCAGTGGAACGAAAACTCACGTTAAGG<br>GATTTTGGTCATGAGATTATCAAAAAGGATCTTCACCTAGATCCTTTTAA<br>ATTAAAAATGAAGTTTTAAATCAATCTAAAGTATCCATGGATATGAGTAA<br>ACTTGGTCTGACAGTTACCAATGCTTAATCAGTGAGGCACCTATCTCAGC<br>GATCTGTCTATTTCGTTCATCCATAGTTGCCTGACTCCCCGTCGTGTAGA<br>TAACTACGATACGGGAGGGCTTACCATCTGGCCCCAGTGCTGCAATGATA<br>CCGCGAGACCCACGCTCACCGGCTCCAGATTTATCAGCAATAAACCAGCC<br>AGCCGGAAGGGCCGAGCGCAGAAGTGGTCCTGCAACTTTATCCGCCTCCA<br>TCCAGTCTATTAATTGTTGCCGGGAAGCTAGAGTAAGTAGTTCGCCAGTT<br>AATAGTTTGCGCAACGTTGTTGCCATTGCTACAGGCATCGTGGTGTCACG<br>CTCGTCGTTTGGTATGGCTTCATTCAGCTCCGGTTCCCAACGATCAAGGC<br>GAGTTACATGATCCCCCATGTTGTGCAAAAAAGCGGTTAGCTCCTTCGGT<br>CCTCCGATCGTTGTCAGAAGTAAGTTGGCCGCAGTGTTATCACTCATGGT<br>TATGGCAGCACTGCATAATTCTCTTACTGTCATGCCATCCGTAAGATGCT<br>TTTCTGTGACTGGTGAGTACTCAACCAAGTCATTCTGAGAATAGTGTATG<br>CGGCGACCGAGTTGCTCTTGCCCGGCGTCAACACGGGATAATACCGCGCC<br>ACATAGCAGAACTTTAAAAGTGCTCATCATTGGAAAACGTTCTTCGGGGC<br>GAAAACTCTCAAGGATCTTACCGCTGTTGAGATCCAGTTCGATGTAACCC<br>ACTCGTGCACCCAACTGATCTTCAGCATCTTTTACTTTCACCAGCGTTTC<br>TGGGTGAGCAAAAACAGGAAGGCAAAATGCCGCAAAAAAGGGAATAAGGG<br>CGACACGGAAATGTTGAATACTCATACTCTTCCTTTTTCAATATTATTGA<br>AGCATTTATCAGGGTTATTGTCTCATGAGCGGATACATATTTGAATGTAT<br>TTAGAAAAATAAACAAAAAGAGCATGCGTTTGTACAAACGCAAAAAGGCC<br>ATCCGTCAGGATGGCCTTCTGCTTAATTTGATGCCTGGCAGTTTATGGCG<br>GGCGTCCTGCCCGCCACCCTCCGGGCCGTTGCTTCGCAACGTTCAAATCC<br>GCTCCCGGCGGATTTGTCCTACTCAGGAGAGCGTTCACCGACAAACAACA<br>GATAAAACGAAAGGCCCAGTCTTTCGACTGAGCCTTTCGTTTTATTTGAT<br>GCCTGGCAGTTCCCTACTCTCGCATGGGGAGACCCCACACTACCATCGGC<br>GCTACGGCGTTTCACTTCTGAGTTCGGCATGGGGTCAGGTGGGACCACCG<br>CGCTACTGCCGCCAGGCAAATTCTGTTTTATCAGACCGCTTCTGCGTTCT<br>GATTTAATCTGTATCAGGCTGAAAATCTTCTCTCATCCGCCAAAACAGCC<br>AAGCTGGAGACCGTTTAAACGGGCCCAAGCTTTTTGTAGAGCTCATCCAT<br>GCCATGTGTAATCCCAGCAGCAGTTACAAACTCAAGAAGGACCATGTGGT<br>CACGCTTTTCGTTGGGATCTTTCGAAAGGACAGATTGTGTCGACAGGTAA<br>TGGTTGTCTGGTAAAAGGACAGGGCCATCGCCAATTGGAGTATTTTGTTG<br>ATAATGGTCTGCTAGTTGAACGGAACCATCTTCAACGTTGTGGCGAATTT<br>TGAAGTTAGCTTTGATTCCATTCTTTTGTTTGTCTGCCGTGATGTATACA<br>TTGTGTGAGTTAAAGTTGTACTCGAGTTTGTGTCCAAGAATGTTTCCATC<br>TTCTTTAAAATCAATACCCTTTAACTCGATACGATTAACAAGGGTATCAC<br>CTTCAAACTTGACTTGAGCACGCGTCTTGTAGGTCCCGTCATCTTTGAAA<br>GATATAGTGCGTTCCTGTACATAACCTTCGGGCATGGCACTCTTGAAAAA<br>GTCATGCCGTTTCATGTGATCCGGATAACGGAAAAGCATTGAACACCAT<br>AGGTCAGAGTAGTGACAAGTGTTGGCCACGGAACAGGTAGTTTTCCAGTA<br>GTGCAAATAAATTTAAGGGTGAGTTTTCCGTTTGTAGCATCACCTTCAOC<br>CTCTCCACGGACAGAAAATTTGTGCCCATTAACATCACCATCTAATTCAA<br>CAAGAATTGGGACAACTCCAGTGAAAAGTTCTTCTCCTTTGCTCATACTA<br>GTAACTCCTTAGCTGTTTCGGATGCCGGACAATTAAGACTAGGTACTAAT<br>AGTCCTAGGCAACATACGAGCCGGAAGCATAAAGTGTAAAGCCTGGGGTG<br>CCTAATGAGTGAGCTAACTCACATTAATTGCGTTGCGCTCTAGATGGTGC<br>AAAACCTTTCGCGGTATGGCATGATAGCGCCCAACGATCCTCCACTCCGC<br>GGCAAGGAGGTTGCCATATGCGCCGCAACAAACGCGAACGTCAAGAGCTG<br>TTACAGCAAACCATCCAGGCGACGCCGTTTATTACCGACGAAGAATTGGC<br>AGGTAAGTTCGGCGTCTCGATTCAGACAATCCGTCTGGATCGTCTGGAGT<br>TGTCCATTCCGGAATTGCGTGAACGTATTAAAAACGTCGCCGAAAAGACG<br>TTAGAAGACGAGGTGAAATCTTTATCATTGGACGAGGTAATTGGCGAAAT<br>TATTGACCTTGAATTAGACGACCAGGCTATTTCAATTTTGGAGATTAAAC<br>AGGAACACGTGTTCAGTCGTAACCAGATCGCCCGCGGTCATCATCTGTTC<br>GCGCAGGCCAACAGCCTGGCTGTGGCTGTTATTGATGACGAACTTGCGCT<br>GACCGCTTCGGCAGACATCCGCTTTACCCGTCAGGTGAAACAAGGCGAGC<br>GCGTCGTAGCGAAAGCTAAAGTTACCGCGGTTGAGAAGGAAAAAGGTCGT<br>ACGGTTGTGGAAGTCAACTCATACGTCGGCGAAGAAATCGTGTTTTCAGG<br>ACGTTTTGATATGTACCGCAGCAAACACAGCTAAGGTACCATTTTGTTTA<br>ACTTTAAGAAGGAGATATACCATGAGCAACCACCTGTTTGACGCTATGCG<br>TGCGGCGGCTCCGGGTGATGCCCCGTTTATCCGTATCGACAATGCTCGTA<br>CCTGGACCTACGATGACGCAATTGCGCTGAGCGGTCGTATTGCCGGTGCA<br>ATGGATGCACTGGGCATTCGTCCGGGTGACCGCGTTGCTGTCCAGGTGGA<br>AAAATCTGCAGAAGCTCTGATCCTGTATCTGGCGTGCCTGCGTACCGGTG<br>CCGTGTATCTGCCGCTGAACACCGCGTACACGCTGGCCGAACTGGATTAT<br>TTTATTGGCGACGCAGAACCGCGTCTGGTGGTTGTTGCTCCGGCCGCACG<br>CGGCGGTGTCGAAACGATTGCGAAACGTCATGGTGCCATCGTGGAAACCC<br>TGGATGCGGACGGCCGTGGTAGTCTGCTGGATCTGGCACGCGACGAACCG |

TABLE 1-continued

Sequences of DNA Constructs. RBS 1A1 (CAAGGAGGT, SEQ ID NO: 1) for fapR in pSENSE2FF is underlined. For RBS 2H8, the sequence was TACACAGGC (SEQ ID NO: 10). The fapR_fapO fragment is bolded in pSENSE2FF.

| Construct | Nucleotide Sequences |
|---|---|
| | GCTGATTTCGTGGACGCAAGCCGCTCTGCTGATGACCTGGCAGCTATTCT<br>GTACACGAGCGGCACCACGGGTCGTTCTAAAGGCGCGATGCTGACCCATG<br>GTAACCTGCTGTCCAATGCCCTGACGCTGCGTGATTATTGGCGCGTTACC<br>GCGGATGACCGCCTGATTCACGCCCTGCCGATCTTTCATACCCACGGTCT<br>GTTCGTTGCCACCAATGTGACCCTGCTGGCCGGTGCCTCAATGTTTCTGC<br>TGTCGAAATTCGATGCCGACGAAGTTGTTAGTCTGATGCCGCAGGCAACG<br>ATGCTGATGGGCGTTCCGACCTTTTACGTCCGTCTGCTGCAAAGTCCGCG<br>CCTGGAAAAAGGTGCAGTGGCTTCCATTCGTCTGTTTATCAGTGGTTCCG<br>CCCCGCTGCTGGCGGAAACCCATGCAGAATTCCACGCTCGTACCGGTCAC<br>GCGATTCTGGAACGCTACGGCATGACCGAAACGAACATGAATACGTCTAA<br>CCCGTATGAAGGTAAACGCATCGCAGGCACCGTTGGTTTTCCGCTGCCGG<br>ATGTTACCGTCCGTGTGACCGACCCGGCAACCGGTCTGGTGCTGCCGCCG<br>GAAGAAACCGGCATGATCGAAATCAAAGGTCCGAACGTTTTCAAAGGCTA<br>CTGGCGCATGCCGGAAAAAACGGCGGCCGAATTCACCGCGGATGGCTTTT<br>TCATTAGCGGCGATCTGGGTAAAATCGACCGCGAACKXTATGTTCATATT<br>GTCGGCCGTGGTAAAGATCTGGTTATTTCAGGCGGTTATAACATCTAGCC<br>GAAAGAAGTCGAAGGTGAAATTGATCAAATCGAAGGCGTCGTGGAATCGG<br>CGGTGATTGGTGTTCCGCACCCGGATTTTGGCGAAGGTGTGACCGCGGTT<br>GTCGTGTGTAAACCGGGCGCCGTGCTGGATGAAAAAACCATCGTTAGCGC<br>ACTGCAGGATCGTCTGGCTCGCTATAAACAACCGAAACGCATTATCTTCG<br>CCGATGACCTGCCGCGTAATACCATGGGCAAAGTCCAGAAAAACATCCTG<br>CGTCAGCAATATGCGGACCTGTACACCCGTCGCTAAGCGGCCGCGTGTGC<br>AGAGTCCCTGCGGCAGGCGACGAACACGACCGTCGTCGATTAGTACCGGT<br>ACGGTCGGTGGTATCGAAGTCTTGATCACTGTACACTAGAGGTAAT |

Figure 3:
FIG. 3 shows activation ratios of 93 variants from the FapR RBS library in *E. coli* 10G. The relative fluorescence (normalized to cell density) of each variant was determined at 0 μM and 25 μM cerulenin and divided to determine the fold activation. These values were compared with replicates (n=3) of the prototype biosensor RBS (1A1).

In Vivo Engineering of the Prototype Malonyl-CoA Biosensor. Following the construction of the prototype refactored biosensor system, an in vivo assay utilizing cerulenin was developed to determine its fold activation. Because mCoA is not cell-permeable, it is not possible to directly manipulate its intracellular concentration. Cerulenin acts as an equimolar inhibitor of the β-keto-acyl-ACP synthase and causes a build-up of intracellular mCoA due to its inability to be processed to fatty acids. The linear response of [mCoA] to [cerulenin] has been previously established for the concentrations used here. The fold activation of the prototype biosensor strain (RBS 1A1, SEQ ID NO:1) in response to mCoA was determined by measuring sfGFP fluorescence in the presence and absence of cerulenin supplemented to the culture media, revealing a modest activation ratio (~5-fold, FIG. 3). Thus, the prototype biosensor required further engineering to enhance its sensitivity and fold-activation. Lower concentrations of FapR results in higher fluorescence output at a fixed concentration of mCoA. Therefore, the RBS of fapR was targeted for mutagenesis by designing an 18-member RBS variant library (Table 2) with a maximum calculated transcription initiation rate (TIR) equal to that of the RBS of 1A1 (7,594 au). The fold-activation of ~300 members of the fapR RBS library was determined by again leveraging cerulenin to enhance the intracellular concentration of mCoA (FIG. 3). Most RBS variants resulted in significantly higher activation than the prototype 1A1 construct, with some reaching >60-fold activation under the assay conditions (FIG. 3).

TABLE 2

RBS Sequences
FapR RBS 1A1: CAAGGAGGT (SEQ ID NO: 1)
FapR RBS Library: TAVRCAGGH (SEQ ID NO: 2) V = A, C, or G; R = A or G; H = A, C, or T

| RBS NO. (SEQ ID NO) | Sequence |
|---|---|
| 2 (SEQ ID NO: 3) | **TAAACAGGA** |
| 3 (SEQ ID NO: 4) | **TACACAGGA** |
| 4 (SEQ ID NO: 5) | **TAGACAGGA** |
| 5 (SEQ ID NO: 6) | **TAAGCAGGA** |
| 6 (SEQ ID NO: 7) | **TACGCAGGA** |
| 7 (SEQ ID NO: 8) | **TAGGCAGGA** |
| 8 (SEQ ID NO: 9) | **TAAACAGGC** |
| 9 (2H8) (SEQ ID NO: 10) | **TACACAGGC** |
| 10 (SEQ ID NO: 11) | **TAGACAGGC** |
| 11 (SEQ ID NO: 12) | **TAAGCAGGC** |
| 12 (SEQ ID NO: 13) | **TACGCAGGC** |
| 13 (SEQ ID NO: 14) | **TAGGCAGGC** |
| 14 (SEQ ID NO: 15) | **TAAACAGGT** |
| 15 (SEQ ID NO: 16) | **TACACAGGT** |
| 16 (SEQ ID NO: 17) | **TAGACAGGT** |
| 17 (SEQ ID NO: 18) | **TAAGCAGGT** |
| 18 (SEQ ID NO: 19) | **TACGCAGGT** |
| 19 (SEQ ID NO: 20) | **TAGGCAGGT** |

Several variants were selected from the FapR RBS library and their dose-response curves with cerulenin determined in

Figure 4:
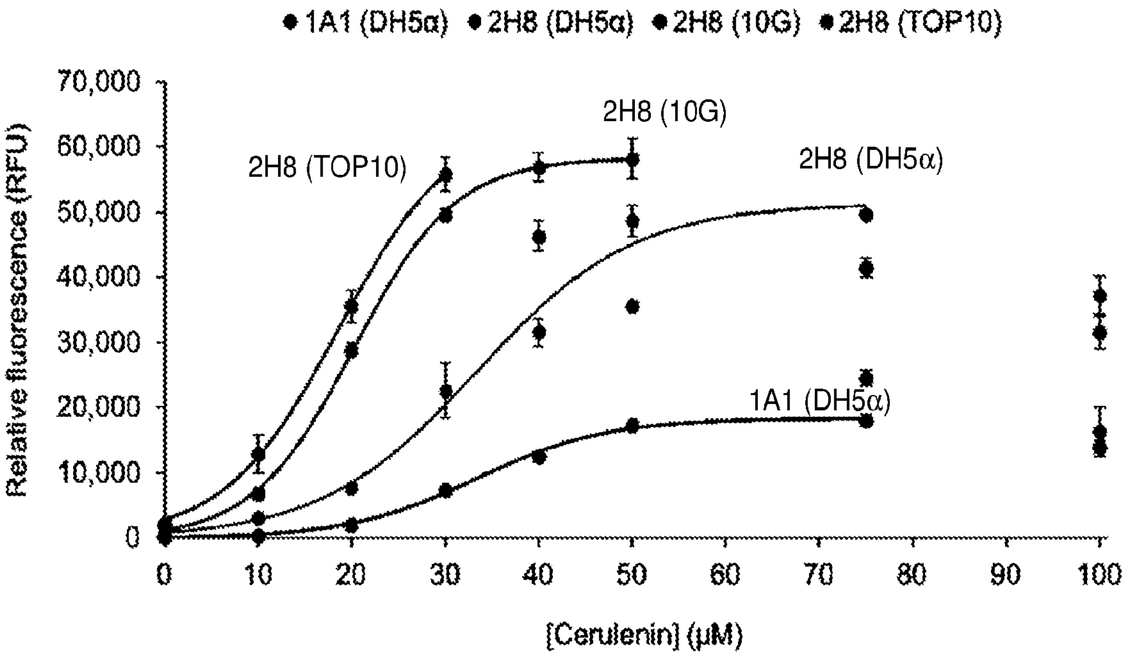
FIG. 4 shows cerulenin dose-response curves of the FapR biosensor in various *E. coli* strains. The relative fluorescence (normalized to cell density) was determined at each indicated cerulenin concentration and the curves were fit to the Hill equation. Error bars (where visible) are the standard deviation of the mean (3 biological replicates).

*E. coli* DH5α. One notable variant, 2H8 (SEQ ID NO:10), predicted to have the weakest calculated RBS (TIR=171 au), provided a higher fluorescence output than 1A1 across the entire range of cerulenin concentrations assayed. The variant 2H8 also displayed a robust activation ratio (~34, Table 3) and provided a maximal fluorescent response of 58,000 RFU (relative fluorescence units) that was more than 3-fold higher than that of 1A1 (FIG. 4 and Table 3). Notably, this advantage came with the side effect of a leaky OFF state of ~1,400 RFU, ~6-fold higher than that of 1A1, such that the $K_{1/2}$ of 2H8 with cerulenin was indistinguishable from that of 1A1 in this strain (Table 3). Nevertheless, this RBS engineering approach quickly arrived at a variant biosensor with the desired improvement in detection ability across a range of cerulenin concentrations.

FapR-Based Detection of Malonyl-CoA Across Various *E. coli* Strains. The FapR-based biosensor inherently accounts for basal levels of ligand as mCoA is required for cell growth and is always present. However, the contribution of background mCoA to overall biosensor activity under other conditions cannot be easily subtracted because the levels of mCoA fluctuate significantly during growth of a culture. Moreover, the effect of the inhibitor cerulenin across various strains of *E. coli* may not be consistent. To determine whether the engineered FapR biosensor response is dependent on the host strain, the best performing variant 2H8 was also transformed into *E. coli* 10G and *E. coli* TOP10, and the cerulenin dose-response curves determined. Notably, there are differences in how the three *E. coli* strains respond to cerulenin and consequently, the dose-response curves for each strain are significantly different (FIG. 4 and Table 3). For example, the maximum fluorescence output of the FapR biosensor in *E. coli* TOP10, 10G, and DH5α is reached at ~30, ~50, and ~75 μM cerulenin, respectively (Table 3). In addition, the fluorescence output of the FapR biosensor in *E. coli* TOP10 at high concentrations of cerulenin (>50 μM) is significantly lower than that in *E. coli* DH5α or 10G (FIG. 4). Thus, the FapR biosensor performs differently across various *E. coli* strains during growth of the culture but crucially always out-performs the prototype 1A1 in *E. coli* DH5α (FIG. 4). The strain-specific dose-response curves are a consequence of several factors, including unique FapR expression levels, unique sensitivity to cerulenin, or strain-dependent levels of mCoA in each strain. However, given that too much mCoA is toxic to the cell, a culture with higher endogenous levels of mCoA can result in both improved sensitivity to cerulenin and a lower fluorescence at lower concentrations of cerulenin. Interestingly, the few genomic differences between these strains are insufficient to directly explain large differences in mCoA production levels (Table 4). Regardless, the overall robust performance of the FapR 2H8 biosensor across several strains of *E. coli* indicates that the engineered prototype biosensor is a good starting point for development of a tool for detection of other malonyl-CoA derivatives.

TABLE 3

Biosensor Parameters in Various *E. coli* Strains.

| bio-sensor | RBS sequence[a] | TIR (au)[b] | *E. coli* strain | $GFP_{min}$[c] | $GFP_{max}$[d] | [Cerulenin] (μM)[e] | $K_{1/2}$ (μM)[f] | activation ratio[g] |
|---|---|---|---|---|---|---|---|---|
| 1A1 | CAAGGAGGT (SEQ ID NO: 1) | 7,594 | DH5a | 236 ± 2 | 18,000 ± 900 | 75 | 33.4 ± 0.5 | 77 + 4 |
| 2H8 | TACACAGGC (SEQ ID NO: 10) | 171 | DH5a | 1,442 ± 44 | 50,000 ± 700 | 75 | 33.5 ± 1.1 | 34 + 1 |
| 2H8 | TACACAGGC (SEQ ID NO: 10) | 171 | 10G | 2,031 ± 127 | 58,000 ± 3,000 | 50 | 20.3 ± 0.4 | 29 ± 2 |
| 2H8 | TACACAGGC (SEQ ID NO: 10) | 171 | TOP10 | 2,203 ± 72 | 56,000 ± 2,500 | 30 | 18.6 + 1.0 | 25 ± 1 |

[a]Mutated nucleotides are underlined.
[b]Transcription initiation rate (arbituary units).
[c]Relative GFP fluorescence at 0 mM cerulenin.
[d]Highest measured relative GFP fluorescence.
[e]Concentration of cerulenin that produced the highest measured relative GFP fluorescence.
[f]Concentration of cerulenin at half-maximum relative GFP fluorescence, determined by fitting to the dose-response curve.
[g]$GFP_{max}$ / $GFP_{min}$

TABLE 4

Strains and Genotypes.

| Bacterial Strain | Genotype |
|---|---|
| *E. coli* DH5α | $F^-$ φ80lacZΔM15 Δ(lacZYA-argF)U169 recA1 endA1 hsdR17($r_K^-$, $m_K^+$) phoA supE44 $λ^-$ thi-1 gyrA96 relA1 |
| E. cloni ® 10G | $F^-$ mcrA Δ(mrr-hsdRMS-mcrBC) endA1 recA1 φ80dlacZΔM15 ΔlacX74 araD139 Δ(ara,leu)7697 galU galK rpsL($Str^R$) nupG λ-tonA |
| *E. coli* TOP10 | $F^-$ mcrA Δ(mrr-hsdRMS-mcrBC) φ80lacZΔM15 ΔlacX74 recA1 araD139 Δ(ara-leu)7697 galU galK $λ^-$ rpsL($Str^R$) endA1 nupG |
| *E. coli* K207-3 | $F^-$ ompT hsdS ($r_B^-$ $m_B^-$) gal dcm (DE 3) panD::panDS2SA-prpRBCD:: T7 prom-sfp T7 prom-prpE ygfG::T7 prom-accA1-T7 prom-pccB |

Figures 5A, 5B, 5C, 5D:
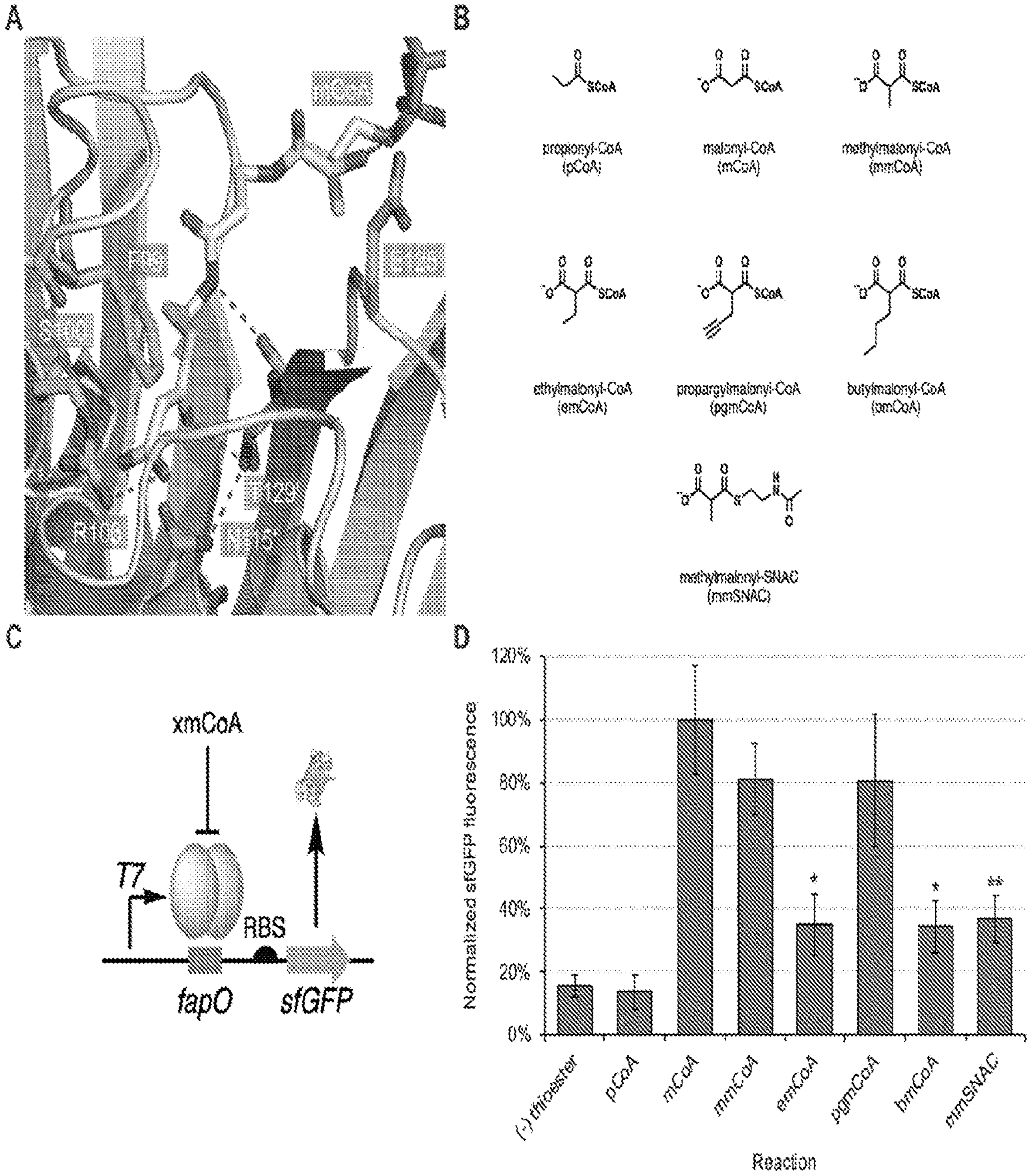
FIGS. 5A-5D show probing the effector promiscuity of FapR with malonyl-CoA derivatives by cell-free transcription-translation.

Probing the Effector Promiscuity of FapR by Cell-Free Transcription-Translation. Aside from mCoA, the ability of other α-carboxyacylmalonyl-CoAs to activate FapR has not been previously reported. Analysis of the crystal structure of FapR reveals that the terminal carboxylate of mCoA is a major factor in effector-binding specificity, forming a salt-bridge with the side-chain of Arg106, and is facilitated by a nearby Phe99 side-chain and Glu73' backbone carbonyl (FIG. 5A). In addition, the thioester of mCoA binds to the side-chain of Asn115'. Notably, while the side-chain of Phe99 orients almost directly towards the α-carbon of mCoA (distance between Phe99-$C_4$ and mCoA-$C_\alpha$ is ~3.2 Å), there is room for substituents in place of the α-hydrogens of mCoA (especially in place of the pro-R hydrogen). Moreover, the loops that form the majority of the ligand binding pocket are disordered in the ligand-free FapR structure which indicates this region is highly dynamic. The lack of residues to restrict potential mCoA α-substituents coupled with the conformational flexibility indicates that mCoA derivatives are FapR effectors. Accordingly, a series of mCoA derivatives with various alkyl and alkynyl functionalities at the C2-position was designed to probe the effector promiscuity of FapR and included methylmalonyl-CoA (mmCoA), ethylmalonyl-CoA (emCoA), propargylmalonyl-CoA (pgmCoA), and butylmalonyl-CoA (bmCoA) (FIG. 5B). Furthermore, the 3'-phospho-nucleoside moiety of mCoA is solvent exposed (FIG. 5A), showing that a large portion of CoA is not required for de-repression of FapR. Accordingly, the truncated analogue mmSNAC was synthesized to confirm this conclusion (FIG. 5B).

Assessing the effector promiscuity of FapR in vivo with the panel of mCoA analogues is challenging for several reasons. First, acyl-CoAs are not cell-permeable and cannot be introduced exogenously. Second, pathways for assembling most non-native mCoA derivatives in *E. coli* have yet to be developed, limiting the high-level in situ biosynthesis of the selected acyl-CoAs. To circumvent these issues, a cell-free transcription-translation (TX-TL) approach was developed that can accurately control the concentration of mCoA within the assay.

Figure 6:
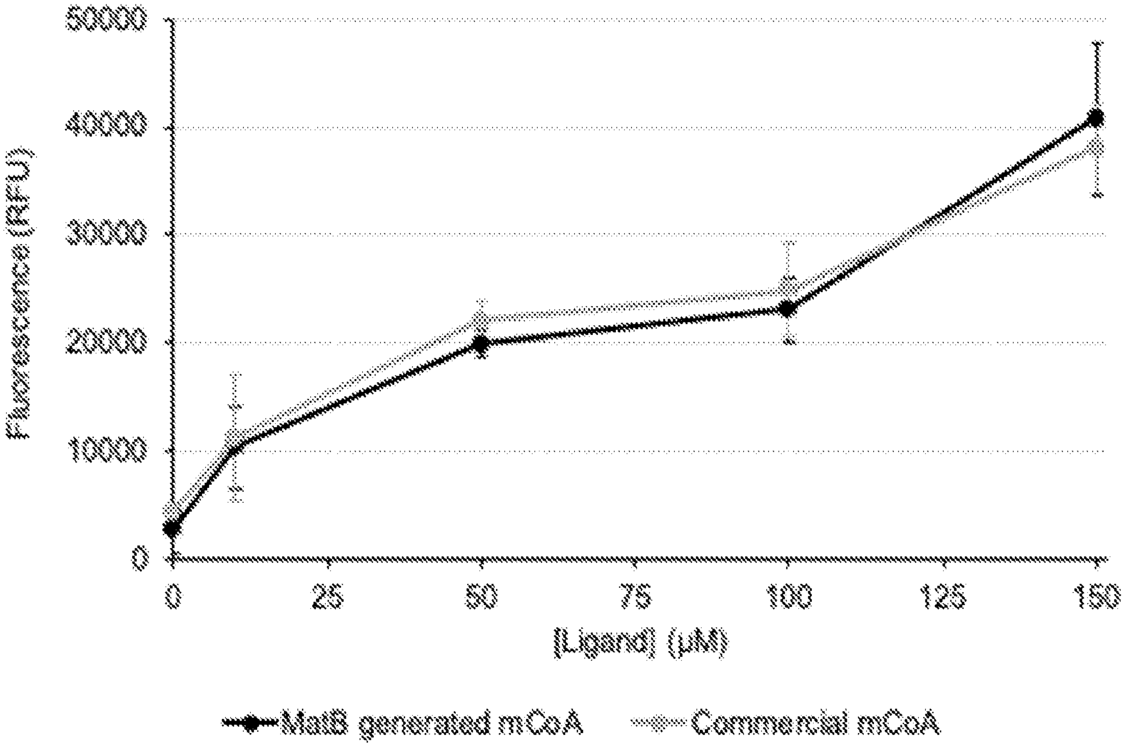
FIG. 6 shows dose-response analysis of the cell-free TX-TL FapR assay. MatB-generated malonyl-CoA (mCoA) or commercial mCoA was included in a cell-free TX-TL mixture with purified FapR and T7-fapO-sfGFP and the sfGFP fluorescence was determined. Error bars are the standard deviation of the mean (3 biological replicates).

To this end, the reporter module of the FapR 2H8 biosensor was cloned into pET28a, replacing the typical lacO site controlling the T7 promoter with a single fapO binding site upstream of the sfGFP gene, producing pET28a-T7-fapO-sfGFP (FIG. 5C). Each α-carboxyacyl-CoA was generated enzymatically from the corresponding malonic acid and CoA using the wild-type malonyl-CoA synthetase MatB or the engineered MatB variant, T207G/M306I. Next, the response of the cell-free TX-TL biosensor assay was evaluated by using various concentrations of MatB-generated native effector, mCoA, along with a fixed amount of purified FapR and T7-fapO-sfGFP. The fluorescence output of the cell-free biosensor was linear up to 150 μM mCoA (FIG. 6) and is consistent with previously reported in vitro transcription activities and binding affinities of FapR and mCoA. In addition, the maximum fluorescence signal was ~15-fold greater than that in the absence of mCoA. Furthermore, to account for potential inhibition of the cell-free biosensor by the MatB reaction mixture, the FapR system was also assayed using a commercial standard of mCoA. Notably, there was no significant difference in the fluorescence output of the cell-free FapR biosensor measured in the presence of the MatB-generated or commercial mCoA (FIG. 6). Together, these data indicate that the cell-free TX-TL assay is suitable to probe the effector promiscuity of FapR with MatB-generated xmCoAs.

Figure 7:
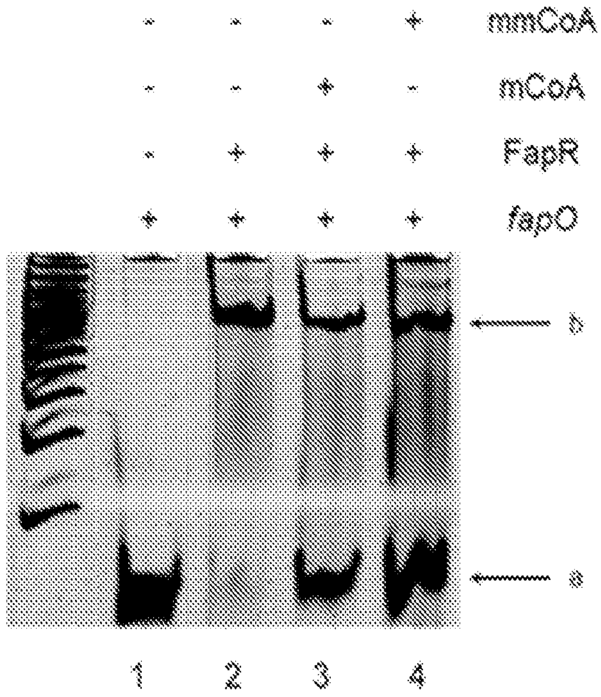
FIG. 7 shows electrophoretic mobility shift assay of FapR and malonyl-CoA or methylmalonyl-CoA. The 40 bp fapO fragment was incubated with purified FapR and either mCoA or mmCoA and visualized on a PAGE gel with SYBR Green I. The gel shift assay demonstrates binding of the fapO DNA by FapR (lane 1 vs. lane 2) and subsequent release upon addition of either malonyl-CoA (lane 3) or methylmalonyl-CoA (lane 4). (a) unbound fapO and (b) bound fapO.

Next, the cell-free FapR biosensor was assayed with each α-carboxyacyl-CoA at a fixed concentration (150 μM). Notably, the fluorescence response with mmCoA was statistically indistinguishable from that with the native ligand, mCoA (FIG. 5D). Furthermore, the ethyl (emCoA), propargyl (pgmCoA), and butyl (bmCoA) derivatives of mCoA were all also identified as effectors, as judged by the cell-free fluorescence data. The ability of pgmCoA to de-repress FapR/T7-fapO-sfGFP was indistinguishable from that of mCoA and mmCoA under the assay conditions used. The saturated alkyl derivatives emCoA and bmCoA were the poorest effectors, based on the fluorescence data. This robust activity of pgmCoA is due in part to the increased rigidity of the alkyne side-chain or additional interactions of the alkynyl it electrons with the FapR ligand-binding site, with the n-rich side-chain of the nearby Phe99 (FIG. 5A). Gratifyingly, de-repression was not observed in the presence of propionyl-CoA and was indistinguishable from the (−) thioester control. To provide further evidence that FapR is de-repressed by derivatives of mCoA, FapR was tested in vitro for DNA-binding and release by electrophoretic mobility shift assay (EMSA) in the presence of mCoA or mmCoA. Using purified wild-type FapR protein, EMSA was run with a 40 bp DNA fragment containing the fapO binding site (FIG. 7). Incubation of the DNA fragment with a two-fold excess of FapR resulted in near-complete binding and a corresponding gel shift. Next, to determine the concentration of mCoA at which half of the DNA would be bound, various concentrations of mCoA were titrated against FapR, revealing that 200 μM was required for this. Incubation with the FapR-fapO complex with mmCoA achieved a similar level of de-repression as that observed with mCoA (FIG. 7). Together, the in vitro data confirm the ability of mmCoA to de-repress the FapR system.

In addition to the full-length α-carboxyacyl-CoAs, the truncated analogue mmSNAC was determined to be an effector, although it provided ~50% the de-repression activity of the corresponding CoA thioester, based upon the fluorescence assay (FIG. 5D). Thus, even though a large portion of CoA is solvent exposed, some of the amide portion of CoA is still required for optimal de-repression of FapR. Remarkably, these data indicate that the promiscuity of FapR extends beyond the previously-established native effector mCoA and includes non-native and non-natural malonyl-thioesters.

Figure 8:
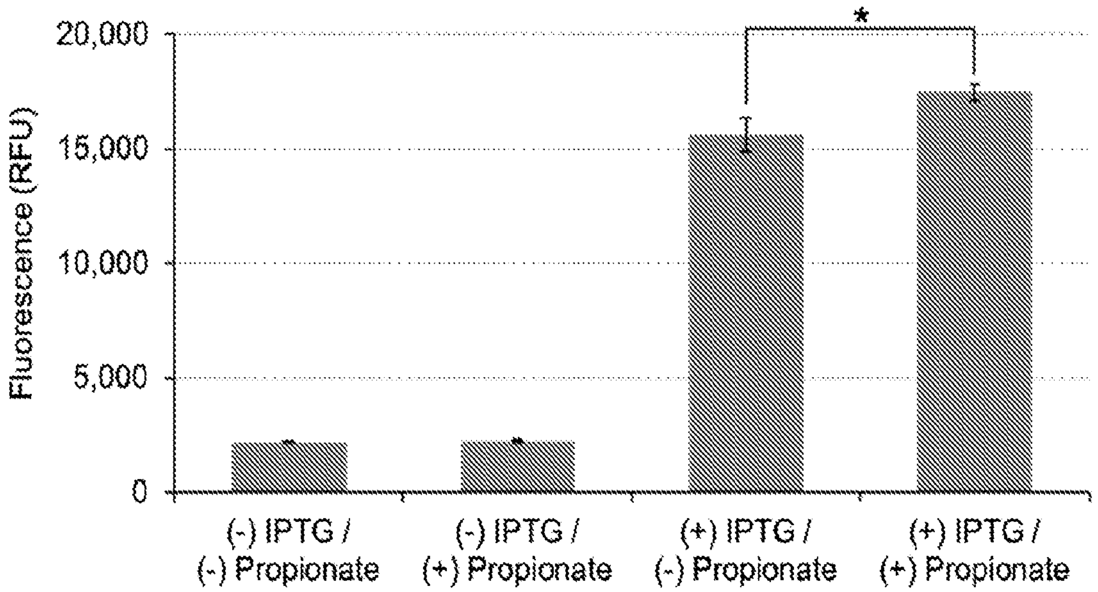
FIG. 8 shows detection of mmCoA in *E. coli* K207-3 by FapR 2H8. Fluorescence output of the 2H8 biosensor was determined in the absence/presence of 1 mM IPTG/1 mM propionate supplemented to the growth media. Error bars represent the standard deviation of three independent biological replicates. *$p<0.05$ by Student's unpaired two-tailed t-test.

FapR-Based Detection of Methylmalonyl-CoA in vivo. The discovery that FapR is de-repressed by several non-native malonyl-CoA derivatives in vitro motivates an investigation of whether the effector promiscuity of FapR can be leveraged to detect non-native acyl-CoAs inside living cells. As an initial test for FapR detection of derivatives of mCoA in vivo, a previously established and engineered *E. coli* strain optimized for high-level production of methylmalonyl-CoA (mmCoA) was selected for analysis. *E. coli* K207-3 includes the propionyl-CoA carboxylase (PCC) genes pccB and accA1 from *Streptomyces coelicolor* under T7 polymerase/LacI control, allowing for production of mmCoA from propionate when induced with IPTG, while endogenous mCoA levels remain unchanged. Accordingly, the FapR biosensor 2H8 was introduced into the K207-3 strain, and the fluorescence output was determined in the presence or absence of IPTG/sodium propionate supplemented to the growth media. In the absence of IPTG, the fluorescence output was low (~2,000 RFU) and similar to the background fluorescence of 2H8 in *E. coli* TOP10, 10G, and DH5α in the absence of cerulenin (FIG. 8). Upon induction of the PCC genes with IPTG, the fluorescence output increased significantly (>15,000 RFU), even in the absence of supplemental propionate (FIG. 8). Furthermore, a small and statistically significant increase in fluorescence signal was observed when the culture media was supplemented with sodium propionate. This indicates that in the absence of enzymatic machinery to otherwise consume mmCoA, and there is sufficient endogenous propionate and/or propionyl-CoA in K207-3 to drive mmCoA biosynthesis to levels detectable by the engineered FapR biosensor.

Discussion

The FapR transcription factor has been used extensively to monitor its native effector, mCoA, and to regulate artificial genetic circuits that produce or consume mCoA. Notably though, applications of FapR-based biosensors have been strictly limited due its assumed strict specificity for mCoA, and genetically-encoded biosensors for derivatives of mCoA have yet be reported. To address this deficiency, the invention disclosed herein first engineers the FapR biosensor by simplifying its circuit architecture and leveraging RBS mutagenesis to improve its ability to detect mCoA in *E. coli*. By testing the engineered biosensor across a series of *E. coli* strains, the impact of different cellular backgrounds was highlighted, revealing that some aspects of the FapR-based detection of mCoA are host-dependent. Next, the effector specificity of FapR beyond mCoA was probed and a panel of various α-carboxylmalonyl-thioesters via enzymatic or chemical synthesis was prepared. Crucially, a cell-free approach was developed to determine effector promiscuity with ligands that are otherwise cell impermeable. Moreover, the cell-free assay allowed the concentrations of each effector to be precisely controlled in the absence of other processes that can otherwise lead to fluctuations in their concentration over time. In this way, four additional CoA-thioesters were identified as effectors of FapR, including mmCoA, a metabolite native to *B. subtilis*. The biosensor was also shown to be de-repressed by an α-carboxylmalonyl-SNAC, indicating that FapR can be harnessed to monitor intracellular levels of these chemically synthesized precursors that are frequently used as non-native and non-natural building blocks for polyketide biosynthesis. Remarkably, the native effector promiscuity of FapR was leveraged to detect mmCoA production in an engineered strain of *E. coli*, K207-3. It is notable that, even though the ability of mCoA and mmCoA to de-repress FapR is indistinguishable (FIG. 5D), the endogenous mCoA levels in K207-3 are not impacted by IPTG induction and/or propionate addition, so that the increase in mmCoA production upon induction is easily detected by the FapR biosensor in K207-3. This result demonstrates the ability of the FapR biosensor to detect fluctuations in mmCoA in engineered microbial strains and paves the way to utilize this ability to guide improvements in mmCoA production and to develop strategies for dynamic metabolic control of mmCoA-dependent pathways. Engineering of the FapR effector binding pocket enables the detection of additional ligands or even specificity towards individual ligands, especially given the precedent of manipulating the effector specificity of other transcription factor based biosensors.

Together, this work has identified FapR as a tool for regulating metabolic pathways that produce or consume mmCoA. Moreover, the hitherto unknown ability of FapR to detect various α-carboxylmalonyl-CoAs allows high-throughput engineering approaches such as directed evolution to be applied to enzymatic pathways responsible for the biosynthesis of natural or non-natural malonyl-CoA derivatives in diverse microbial hosts. In this way, FapR is an invaluable device to expand the scope and utility of a broad range of microbial based platforms for synthesis of products constructed from diverse polyketide extender units.

Materials and Methods

General. Materials and reagents were purchased from Sigma Aldrich (St. Louis, MO) unless otherwise noted. Isopropyl β-D-thiogalactoside (IPTG) was purchased from Calbiochem (Gibbstown, NJ). Primers were purchased from Integrated DNA Technologies (Coralville, IA). E. cloni 10G electrocompetent cells were purchased from Lucigen Corporation (Middleton, WI). Cerulenin was purchased from Cayman Chemical (Ann Arbor, MI), and stocks were dissolved in DMSO. Commercial malonyl-CoA and methylmalonyl-CoA were purchased from CoALA Biosciences (Austin, TX). All cultures were grown in LB media with 100 μg/mL ampicillin unless otherwise stated. Absorbance and fluorescence readings were taken in clear flat-bottom and black flat-bottom 96-well plates (Greiner Bio-One), respectively, in a BioTek Hybrid Synergy 4 plate reader, unless otherwise stated. All Sanger sequencing was performed by Genewiz, Inc. (South Plainfield, NJ).

Construction of Plasmids. The plasmid pSENSE2 was synthesized by Twist Bioscience (San Francisco, CA) in two fragments. The two pieces were assembled using standard restriction digestion and ligation procedures. The fapR-_fapO fragment containing a codon-optimized fapR gene and a fapO operator was synthesized by Genewiz, Inc. and cloned into pSENSE2 between the KpnI and SpeI sites to give pSENSE2FF. FapR was amplified with a 5' NcoI site and a 3' XhoI site and cloned into pET28a to give fapR_pET28a (with a C-terminal $His_6$ tag). T7_fapO_sfGFP was constructed using GenScript GenBuilder (GenScript, Piscataway, NJ) according to the manufacturer's instructions with pET28a (amplified with T7forfapO.Gib1 and T7forfapO.Gib2, see entries 1-2, Table 5) and fapO_sfGFP (amplified from pSENSE2FF with fapOforT7.Gib1 and fapOforT7.Gib2, see entries 3-4, Table 5).

TABLE 5

Sequences of oligonucleotides.

| Entry | Primer Name | Sequence |
|---|---|---|
| 1 | T7forfapO. Gib1 | gtactaatagtCCCACAcctatagtgagtcgt (SEQ ID NO: 32) |
| 2 | T7forfapO. Gib2 | CTCTACAAAAAgcttgggccc (SEQ ID NO: 33) |
| 3 | fapOforT7. Gib1 | tataggTGTGGGactattagtacctagtcttaattgt (SEQ ID NO: 34) |
| 4 | fapOforT7. Gib2 | GCCCAAGCTTTTTGTAGAG (SEQ ID NO: 35) |
| 5 | FapR_RBSLib2. SDM1 | GATCCTCCACTCCGCGGTAVRGAGGHTGCCATatgcgccgca (SEQ ID NO: 36) |
| 6 | FapR_RBSLib2. SDM2 | tgcggcgcatATGGCADCCTCYBTACCGCGGAGTGGAGGATC (SEQ ID NO: 37) |

Abbreviations: V = A, C, or G; R = A or G; H = A, C, or T; D = A, G, or T; Y = C or T; B = C, G, or T.

RBS Library Construction and Screening. The original fapR RBS 1A1 was calculated to have a transcription initiation rate (TIR) of 7,594 au using the Salis online RBS calculator. The calculator was used to design an 18-member RBS library with a maximum TIR of 7,594 au. Site-directed mutagenesis was also used to produce the RBS library (VRGAGGH) using the QuikChange II Site-Directed Mutagenesis protocol with the pSENSE2FF template and primers FapR_RBSLib2.SDM1 and FapR_RBSLib2.SDM2 (see entries 5-6, Table 5). The reaction product was digested with DpnI for 3 h at 37° C. before electroporation into E. cloni® 10G electrocompetent cells (Lucigen). Transformed cells were plated on LB agar supplemented with 100 μg/mL ampicillin and incubated overnight at 37° C. Individual colonies from the library were picked from LB agar plates and used to inoculate 93 wells of a 96-deepwell microplate with 500 μL LB media supplemented with 100 μg/mL ampicillin. The remaining 3 wells were inoculated with colonies from pSENSE2FF RBS 1A1 (SEQ ID NO:1) that had been transformed into *E. coli* DH5α. Cultures were grown overnight at 37° C. and 350 rpm, and 10 μL from each well were used to inoculate 440 μL LB media supplemented with 100 μg/mL ampicillin. The new plates were grown for one hour at 37° C. and 350 rpm. Plates were then treated with either 5 μM, 12.5 μM, or 25 μM cerulenin or the corresponding volume of DMSO. Plates were then grown an additional 15 h. Plates were centrifuged at 3,500 rpm for 7 min, and cell pellets were resuspended in 500 μL PBS. 100 μL from each well was used for analyzing optical density at 600 nm and sfGFP fluorescence (ex 485 nm/em 509 nm). Fluorescence values were divided by $OD_{600}$ to yield growth-corrected relative fluorescence values. 279 individual colonies from the RBS library were screened at the different cerulenin concentrations.

Expression and Purification of Mutant MatB. The expression and purification of MatB T207G/M306I has been previously described. Briefly, *E. coli* BL21(DE3) pLysS competent cells were transformed with plasmid and positive transformants were selected on LB agar supplemented with 30 μg/mL kanamycin. A single colony was transferred to LB (3 mL) supplemented with kanamycin (30 μg/mL) and grown at 37° C. and 250 rpm overnight. The culture was used to inoculate LB media (1 L) supplemented with kanamycin (30 μg/mL). One liter culture was incubated at 37° C. and 250 rpm to an $OD_{600}$ of 0.6, at which time protein synthesis was induced by the addition of IPTG to a final concentration of 1 mM. After incubation at 18° C. and 200 rpm for 18 h, cells were collected by centrifugation at 5,000 g for 20 mM, and resuspended in 100 mM Tris-HCl pH 8.0 (20 mL) containing NaCl (300 mM) and then lysed by sonication. Following centrifugation at 10,000 g, the soluble extract was loaded onto a 1 mL HisTrap HP column (GE Healthcare, Piscataway, NJ) and purified by fast protein liquid chromatography using the following buffers: wash buffer [20 mM sodium phosphate (pH 7.4) containing 0.5 M NaCl and 20 mM imidazole] and elution buffer [20 mM sodium phosphate (pH 7.4) containing 0.5 M NaCl and 200 mM imidazole]. The purified protein was concentrated using an Amicon Ultra 30 kDa MWCO centrifugal filter (Millipore Corp., Billerica, MA) and stored as 10% glycerol stocks at −80° C. Protein purity was verified by SDS-PAGE. Protein quantification was carried out using the Bradford Protein Assay Kit from Bio-Rad.

Synthesis of Acyl-CoAs by MatB. The MatB-catalyzed synthesis of extender units has been previously described. Briefly, reactions were performed in a 50 μL reaction mixture containing 100 mM sodium phosphate (pH 7), $MgCl_2$ (2 mM), ATP (12 mM), coenzyme A (8 mM), malonate or corresponding analogue (16 mM) and wild-type or mutant MatB (10 μg) at 25° C. Aliquots were removed after 3 h incubation, and quenched with an equal volume of ice-cold methanol, centrifuged at 10,000 g for 10 mM, and cleared supernatants used for HPLC analysis on a Varian ProStar HPLC system. A series of linear gradients was developed from 0.1% TFA (A) in water to methanol (HPLC grade, B) using the following protocol: 0-32 mM, 80% B; 32-35 min, 100% A. The flow rate was 1 mL/min, and the absorbance was monitored at 254 nm using Pursuit XRs C18 column (250×4.6 mm, Varian Inc.). To ensure complete conversion, the malonate analog and the acyl-CoA product HPLC peak areas were integrated, and the conversion (%) calculated as a percent of the total peak area. Product elution times and LC-MS data (data not shown) were in complete agreement with that previous described.

Synthesis of mmSNAC. To access the previously reported mmSNAC, the α-carboxy group of the corresponding commercial methylmalonic acid was protected via esterification with $^{t}$Bu, which was then thioesterified with HSNAC, and deprotected via hydrolysis to afford the acyl-SNAC.

Synthesis of N-Acetyl Cysteamine (HSNAC). In an oven-dried round-bottom flask (250 mL) equipped with a magnet was added cysteamine hydrochloride (6.88 g, 60 mmol, 1 eq) followed by deionized water (170 mL). Under strong stirring then was added potassium hydroxide (3.40 g, 61 mmol, 1.01 eq) and sodium bicarbonate (8.65 g, 103 mmol, 1.7 eq). The flask was then cooled to 0° C. and acetic anhydride (5.75 mL, 61 mmol, 1.0 eq) was then added dropwise (300 μL/min). After the addition, the reaction was allowed to warm to room temperature and stirred overnight. The reaction was then cooled again to 0° C. and quenched with concentrated HCl to pH~1. The aqueous layer was extracted with ethyl acetate (4×50 mL). the organic layers were combined washed with brine (40 mL), dried over magnesium sulphate and concentrated in vacuo to give the crude oil which was then vacuum distilled to furnish N-acetyl cysteamine (4.76 g, 66%) as a colourless oil. $^{1}$H NMR (300 MHz, $CDCl_3$) δ 6.91 (s, 1H), 3.38 (q, J=6.5 Hz, 2H), 2.63 (dt, J=8.4, 6.5 Hz, 2H), 2.00 (s, 3H), 1.41 (t, J=8.4 Hz, 1H). $^{13}$C NMR (75 MHz, $CDCl_3$) δ 171.0, 42.7, 24.4, 23.0.

Synthesis of $^{t}$Bu-mm acid. In an oven-dried round bottom flask (50 mL) equipped with a magnetic stirbar was added methylmalonic acid (0.5 mmol) followed by dry THF (5 mL). Under strong stirring condition was then dropwise added pyridine (2.17 mmol) and $^{t}$BuOH (1.82 mmol). The solution was then cooled to 0° C. and MsCl (1.02 mmol) was added dropwise. The reaction mixture was then warmed to room temperature and allowed to react for 3 h. After that, it was quenched with ice cold solution of NaOH (4 M, 5 mL), the aqueous layer was washed with DCM (2×10 mL) acidified to pH~2 and extracted with DCM (3×10 mL). The organic layers were combined, washed with brine (20 mL), dried over $MgSO_4$ and concentrated in vacuo. The crude was then purified with silica gel column chromatography to furnish the product. $^{t}$Bu-mm acid $^{1}$H NMR (300 MHz, $CDCl_3$) δ 10.06 (s, 1H), 3.38 (q, J=7.2 Hz, 1H), 1.44 (s, 9H), 1.39 (d, J=7.2 Hz, 2H). $^{13}$C NMR (75 MHz, $CDCl_3$) δ 176.3, 169.4, 82.5, 47.0, 28.0, 13.8.

Synthesis of the $^{t}$Bu ester of mmSNAC. In an oven-dried round-bottom flask (25 mL) equipped with a magnet was added the mono $^{t}$Bu-ester of methylmalonic acid (1.0 mmol) followed by dry THF (2.5 mL). The solution was then cooled to 0° C. and under strong stirring condition was then subsequently added diimidazolyl ketone (1.2 mmol) and stirred at 0° C. for 30 min followed by stirring at room temperature for 2 h. 4-(dimethylamino)pyridine (0.3 mmol) and HSNAC (1.3 mmol) was added to the reaction flask and the reaction was stirred overnight. The solvent was then removed in vacuo and the reaction mixture was dissolved in ethyl acetate (10 mL), washed with $K_2CO_3$ (2×5 mL, 1 M)

and HCl (2×5 mL, 1M), brine (5 mL), dried over $MgSO_4$ and concentrated in vacuo. Silica gel column chromatography afforded the final compound. $^t$Bu-mmSNAC $^1$H NMR (300 MHz, $CDCl_3$) δ 6.55 (s, 1H), 3.56 (q, J=7.2 Hz, 1H), 3.52-3.35 (m, 2H), 3.18-2.96 (m, 2H), 2.02 (s, 3H), 1.45 (s, 9H), 1.38 (d, J=7.2 Hz, 3H). $^{13}$C NMR (75 MHz, $CDCl_3$) δ 196.3, 170.8, 168.3, 82.1, 55.1, 39.4, 28.4, 27.6, 22.6, 14.1.

Synthesis of mmSNAC. In an oven-dried round bottom flask (10 mL) equipped with a magnet was taken the $^t$Bu ester of mmSNAC (1 mmol) and TFA (5 mL) was added dropwise to it at 0° C. under strong stirring condition. The reaction was kept overnight, the TFA was removed in vacuo and the residual amount of TFA was then co-evaporated with toluene (3×5 mL). The 'crude' material (with trace amount of toluene as seen by NMR) was recovered in 98% yield and thus used without further purification. mmSNAC $^1$H NMR (300 MHz, $CDCl_3$) δ 9.95 (s, 1H), 6.48 (s, 1H), 3.75 (q, J=7.2 Hz, 1H), 3.55 (q, J=6.0 Hz, 2H), 3.21 (dt, J=13.0, 6.0 Hz, 1H), 3.06 (dt, J=13.0, 6.0 Hz, 1H), 2.08 (s, 3H), 1.49 (d, J=7.2 Hz, 3H). $^{13}$C NMR (126 MHz, $CDCl_3$) δ 196.6, 172.3, 171.1, 54.1, 39.7, 28.3, 22.2, 14.1. LCMS m/z 220.0 ($[M+H]^+$).

Dose-response analysis of the cell-free TX-TL FapR assay. A premixed solution for cell-free transcription-translation reactions was purchased from New England Biolabs (PURExpress In Vitro Protein Synthesis Kit). To a PCR tube on ice were added (in the order shown): 4 µL Solution A, 3 µL Solution B, 2.5 µM FapR, 250 nM T7-fapO-sfGFP and 0-150 µM of MatB-generated or commercial mCoA in a total volume of 10 µL. In parallel, control reactions in the absence of thioester were assembled by using boiled MatB in the presence of malonic acid. The reaction was incubated for 16 h at 37° C. and then diluted with PBS buffer to give a final total volume of 50 µL. Then, 50 µL of the diluted mixture was used for determination of the sfGFP fluorescence (ex 485 nm/em 510 nm) using a Tecan infinite F200 plate reader.

Electrophoretic mobility shift assay. The fapO oligonucleotides 5'-CCTAGGACTATTAGTACCTAGTCTTAAT-TGTCCGGCATCC-3' (SEQ ID NO:30) and 5'-GGATGCCGGACAATTAA-GACTAGGTACTAATAGTCCTAGG-3' (SEQ ID NO:31) were annealed per standard procedure. Briefly, the two oligos were added to a final concentration of 10 µM each in annealing buffer (19 mM Tris, pH 7.5, 50 mM NaCl, 1 mM EDTA) and heated to 95° C. for 2 minutes before cooling to 25° C. at a rate of −1° C. $min^{-1}$. Each gel shift assay was carried out in a total volume of 20 µL at 30° C. for 40 mM using 2 pmol fapO and 6 pmol of FapR in reaction buffer (10 mM Tris-HCl, pH 7.5, 1 mM EDTA, 5% v/v glycerol, 100 mM KCl, 0.01 mg/mL BSA). For determination of ligand repression, 200 µM of mCoA or mmCoA were also included. Reactions were then analyzed by electrophoresis on a 6% PAGE gel at 220 V. The gel was stained with SYBR Green I and imaged on a Typhoon FLA 7000.

Figure 9:
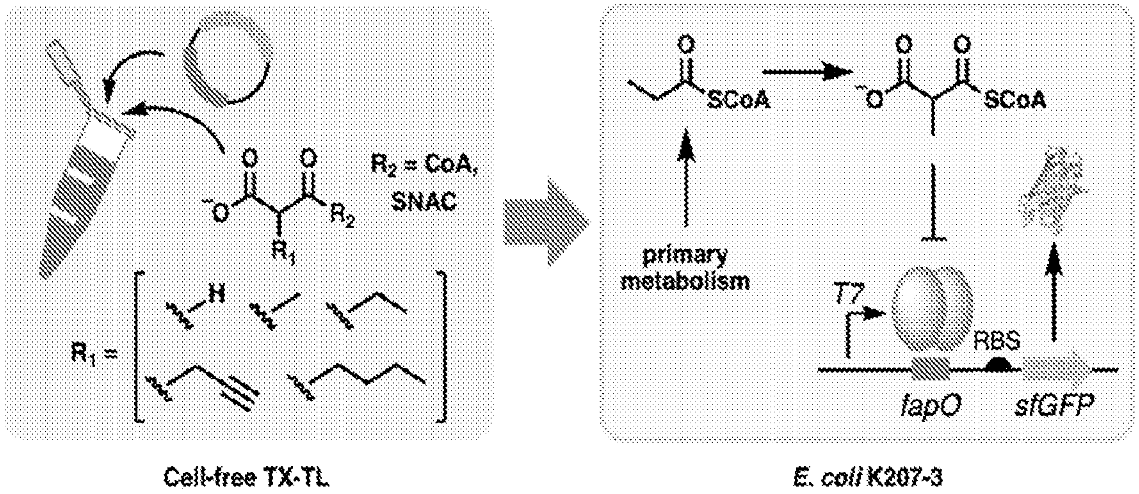
FIG. 9 is a graphic abstract of current invention.

Cell-Free Characterization of FapR Promiscuity. A commercial kit for cell-free transcription-translation reactions was purchased from New England Biolabs (PURExpress In Vitro Protein Synthesis Kit). To a PCR tube on ice were added (in the order shown): 4 µL Solution A, 3 µL Solution B, 2.5 µM FapR, 250 nM T7-fapO-sfGFP and 150 µM of MatB-generated acyl-CoA or mmSNAC in a total volume of 10 µL (FIG. 9). In parallel, control reactions in the absence of thioester were assembled by using boiled MatB. The reaction was incubated for 16 h at 37° C. and then diluted with PBS buffer to give a final total volume of 50 µL. Then, the diluted mixture was used for determination of the sfGFP fluorescence (ex 485 nm/em 510 nm) using a Tecan infinite F200 microplate spectrophotometer.

FapR-Bioassay of Methylmalonyl-CoA Production in *E. coli* K207-3. pSENSE2FF-2H8 was transformed into *E. coli* K207-3 and grown overnight in 1 mL volumes in a 96-deep-well microplate at 37° C. and 350 rpm. These cultures (10 µL) were used to inoculate wells of a fresh 96-deepwell plate containing 440 µL LB and 100 µg $mL^{-1}$ ampicillin which were then incubated at 37° C. and 350 rpm for 2.5 h. Various combinations of IPTG (1 mM final concentration) and sodium propionate (1 mM final concentration) were then added and the cultures incubated for 16 h at 37° C. and 350 rpm. The microplate was centrifuged at 3,500 rpm for 7 min, and the supernatant was discarded. Cell pellets were resuspended in 1 mL PBS and 100 µL of each cell suspension was transferred to flat-bottom 96-well plates and used for determining the optical density at 600 nm ($OD_{600}$) and sfGFP fluorescence (ex 485 nm/em 509 nm). The fluorescence intensity was divided by the $OD_{600}$ to yield a relative GFP fluorescence value.

Purification of FapR. *E. coli* BL21(DE3) competent cells were transformed with fapR_pET28a plasmid and positive transformants were selected on LB agar supplemented with 30 µg/mL kanamycin. A single colony was transferred to LB (3 mL) supplemented with kanamycin (30 µg/mL) and grown at 37° C. and 250 rpm overnight. The culture was used to inoculate LB media (300 mL) supplemented with kanamycin (30 µg/mL). The culture was incubated at 37° C. and 250 rpm to an $OD_{600}$ of 0.6, at which time protein synthesis was induced by the addition of IPTG to a final concentration of 1 mM. After incubation at 22° C. and 250 rpm for 20 h, cells were collected by centrifugation at 5,000 g for 20 min, and resuspended in 100 mM Tris-HCl pH 8.0 (8 mL) containing NaCl (300 mM) and then lysed by sonication. Following centrifugation at 10,000 g, the soluble extract was loaded onto a 1 mL HisTrap HP column (GE Healthcare, Piscataway, NJ) and purified by fast protein liquid chromatography using the following buffers: wash buffer [20 mM sodium phosphate (pH 7.4) containing 0.5 M NaCl and 20 mM imidazole] and elution buffer [20 mM sodium phosphate (pH 7.4) containing 0.5 M NaCl and 200 mM imidazole]. The purified protein was concentrated using an Amicon Ultra 10 kDa MWCO centrifugal filter (Millipore Corp., Billerica, MA) and stored in storage buffer (50 mM HEPES, pH 7.5, 100 mM NaCl, and 10% glycerol) at −80° C. Protein purity was verified by SDS-PAGE. Protein quantification was carried out using the Bradford Protein Assay Kit from Bio-Rad.

Example 2. In Situ Detection of De Novo Malonyl-CoA Biosynthesis in *E. coli*

Figure 10:
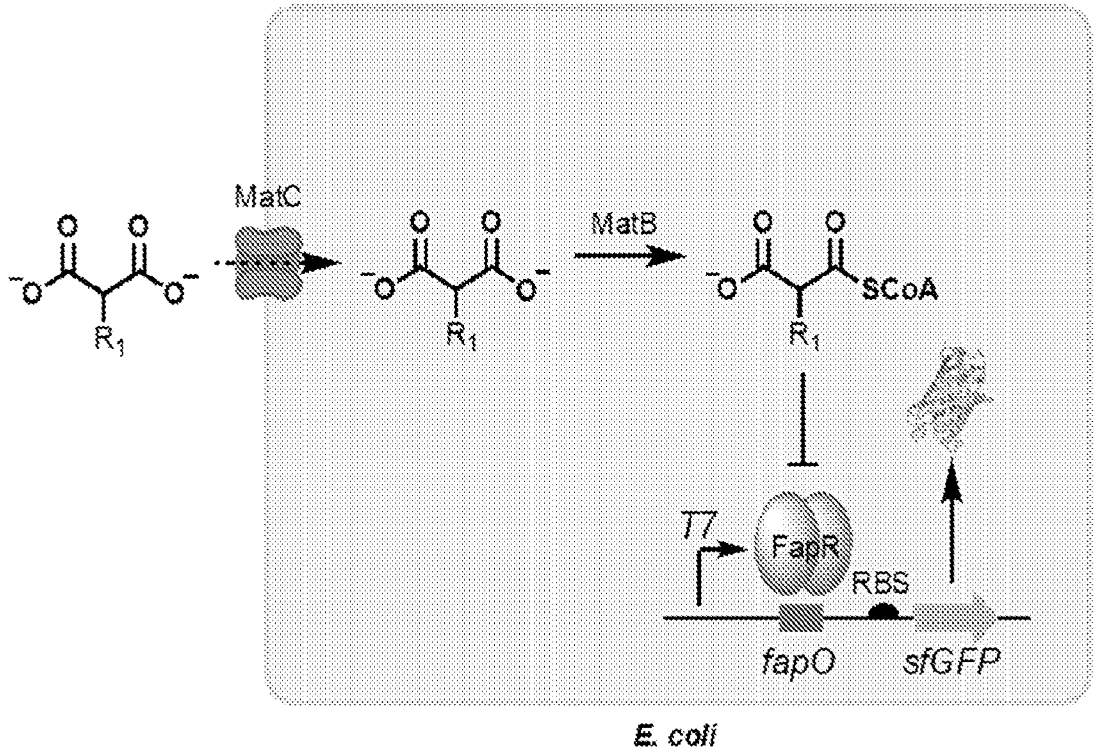
FIG. 10 shows de novo biosynthesis of extender units from malonic acids. Scheme illustrating the combined action of the transport protein MatC and the malonyl-CoA synthetase MatB to furnish de novo extender units in *E. coli*. In the presence of a suitable FapR biosensor, the extender units are detected by quantification of GFP fluorescence.
Figure 11:
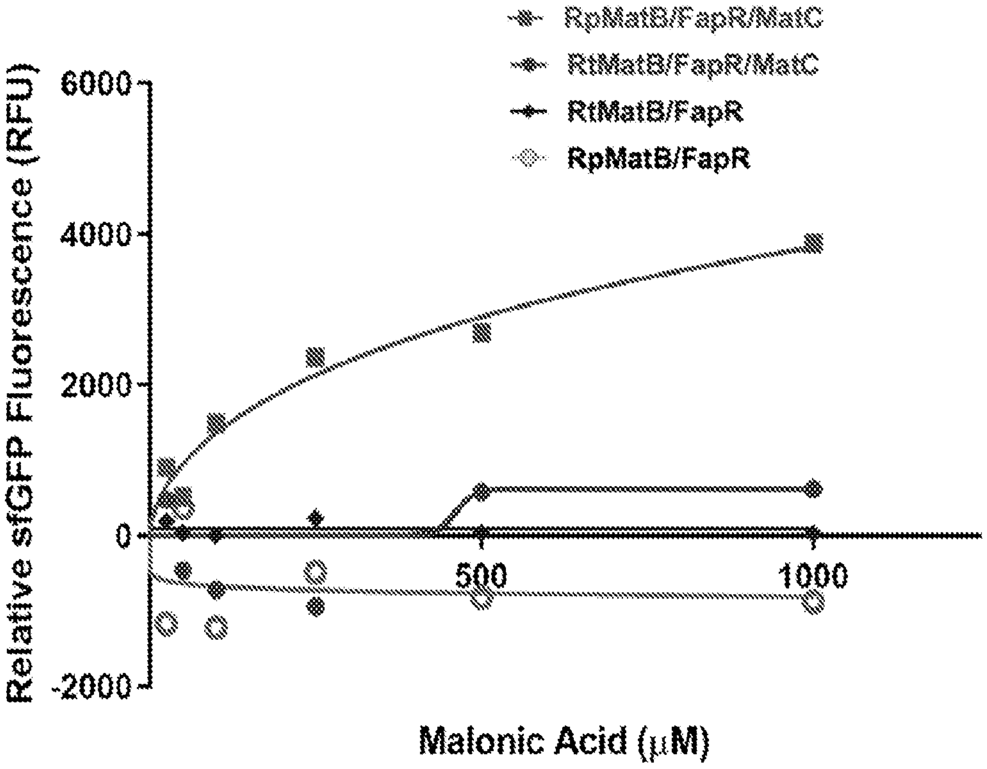
FIG. 11 shows dose-response curves of the FapR biosensor in various *E. coli* strains of BL21(DE3). The relative fluorescence (normalized to cell density) was determined at each indicated malonic concentration and the curves were fit to the Hill equation. In the presence of both MatB and MatC, feeding malonic acid (R=H, FIG. 10) leads to dose-dependent GFP fluorescence. RtMatB, *Rhizobium triffoli* MatB; RpMatB, *Rhodopseudomonas palusris; Rhizobium triffoli* MatC.

The 2H8 FapR biosensor was used to detect malonyl-CoA de novo biosynthesis in *E. coli* via the combined action of a transport protein (MatC) and malonyl-CoA synthetase (MatB, via Psenseffrm, SEQ ID NO:26) (FIG. 10). Notably, the fluorescence readout of the biosensor provided a fast method of evaluating different pathway variants. For example, by omission of the plasmid that carried MatC (pCDFDuet-MatC, SEQ ID NO:27), it was demonstrated that the transport protein was absolutely required for malonyl-CoA biosynthesis and that the MatB from *Rhizobium triffoli* was not active, in contrast to the homolog from *Rhodopseudomonas* (FIG. 11).

Figure 12:
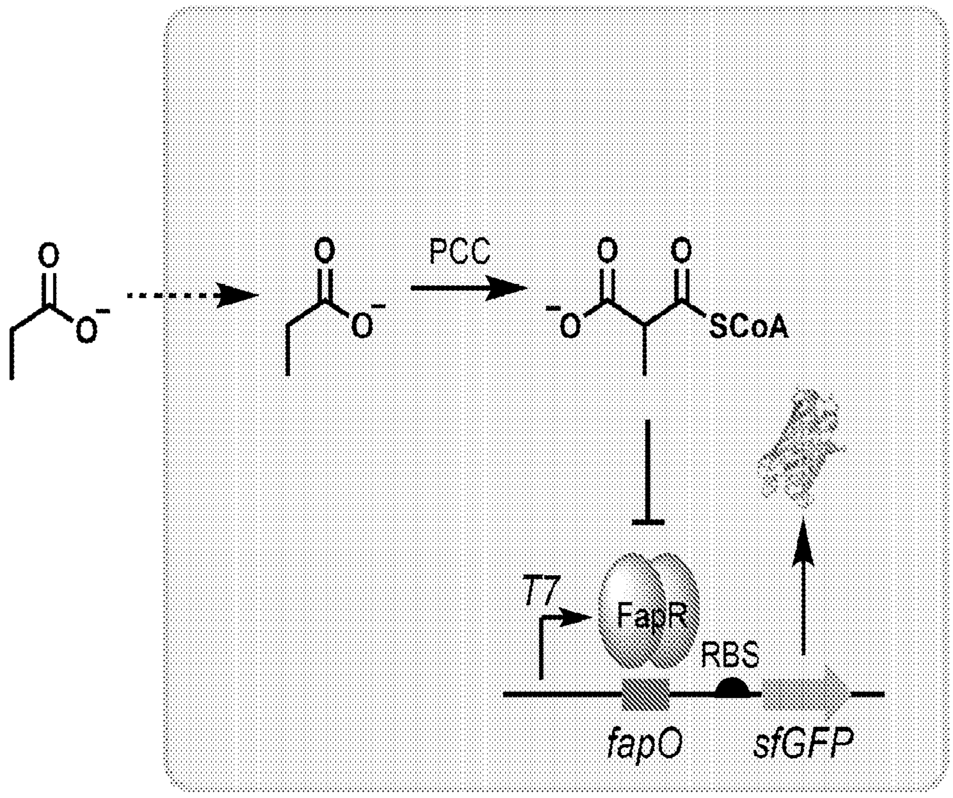
FIG. 12 shows de novo biosynthesis and detection of methylmalonyl-CoA in *E. coli* K207-3. Scheme illustrating the combined action of the propionyl-CoA carboxylase PCC to furnish methylmalonyl-CoA from propionate in *E. coli*. In the presence of a suitable FapR biosensor, methylmalonyl-CoA is detected by quantification of GFP fluorescence.
Figure 13:
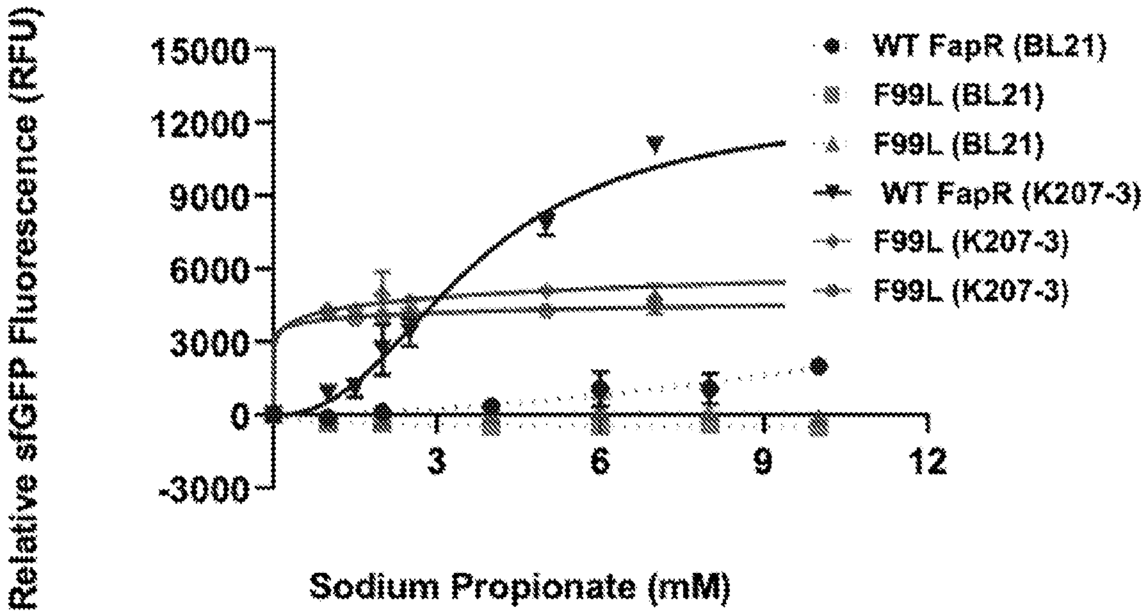
FIG. 13 shows dose-response curves of wild-type and mutant FapR biosensor in various *E. coli* strains. The relative fluorescence (normalized to cell density) was determined at each indicated propionate concentration and the curves were fit to the Hill equation. The GFP fluorescence output of the FapR mutant F99L is higher than of the wild-type FapR biosensor at low (<3 mM) concentrations of propionate, indicating a mutant with better sensitivity towards methylmalonyl-CoA.

Example 3. In Situ Detection of De Novo Methylmalonyl-CoA Biosynthesis in *E. coli* Using an Engineered FapR Mutant The 2H8 FapR biosensor was subjected to saturation mutagenesis at Phe99 to create a library of mutants. This position was predicted to dictate selectivity of the FapR biosensor towards various malonyl-CoA's substituted at the C2-side chain position. *E. coli* K207-3 has been previously described to produce the non-native metabolite methylmalonyl-CoA upon feeding of propionate to the culture medium (FIG. 12). Accordingly, this strain was leveraged here to provide methylmalonyl-CoA de novo. The fluorescence output of the library members was analyzed in 96-well plates in the presence of IPTG and sodium propionate. One mutant in particular was chosen for further analysis. DNA sequencing of the plasmid revealed the mutation Phe99Leu. A comparison of the wild-type (2H8) and F99L mutant FapR was made by determining the GFP-fluorescence of each strain in response to varying concentrations of propionate. The corresponding dose-response curves (FIG. 13) indicate the F99L mutant is more sensitive than the wild-type sensor and can detect concentrations of methylmalonyl-CoA corresponding to propionate concentrations as low as 1 mM. This data indicates that Phe99 is a likely determinant of effector specificity and shows that the effector specificity of FapR can be expanded towards non-native effectors through mutagenesis of the effector binding pocket.

| Construct | Nucleotide Sequence |
|---|---|
| FapR_2H8_ F99L mutant (SEQ ID NO: 24) | ATGCGCCGCAACAAACGCGAACGTCAAGAGCTGTTACAGCAAACCATCCAGGC<br>GACGCCGTTTATTACCGACGAAGAATTGGCAGGTAAGTTCGGCGTCTCGATTCA<br>GACAATCCGTCTGGATCGTCTGGAGTTGTCCATTCCGGAATTGCGTGAACGTATT<br>AAAAACGTCGCCGAAAAGACGTTAGAAGACGAGGTGAAATCTTTATCATTGGA<br>CGAGGTAATTGGCGAAATTATTGACCTTGAATTAGACGACCAGGCTATTTCAAT<br>TTTGGAGATTAAACAGGAACACGTG**CTC**AGTCGTAACCAGATCGCCCGCGGTCA<br>TCATCTGTTCGCGCAGGCCAACAGCCTGGCTGTGGCTGTTATTGATGACGAACTT<br>GCGCTGACCGCTTCGGCAGACATCCGCTTTACCCGTCAGGTGAAACAAGGCGAG<br>CGCGTCGTAGCGAAAGCTAAAGTTACCGCGGTTGAGAAGGAAAAAGGTCGTAC<br>GGTTGTGGAAGTCAACTCATACGTCGGCGAAGAAATCGTGTTTTCAGGACGTTT<br>TGATATGTACCGCAGCAAACACAGCTAA |
| FapR_2H8 (SEQ ID NO: 25) (Wild-type FapR coding sequence) | ATGCGCCGCAACAAACGCGAACGTCAAGAGCTGTTACAGCAAACCATCCAGGC<br>GACGCCGTTTATTACCGACGAAGAATTGGCAGGTAAGTTCGGCGTCTCGATTCA<br>GACAATCCGTCTGGATCGTCTGGAGTTGTCCATTCCGGAATTGCGTGAACGTATT<br>AAAAACGTCGCCGAAAAGACGTTAGAAGACGAGGTGAAATCTTTATCATTGGA<br>CGAGGTAATTGGCGAAATTATTGACCTTGAATTAGACGACCAGGCTATTTCAAT<br>TTTGGAGATTAAACAGGAACACGTG**TTC**AGTCGTAACCAGATCGCCCGCGGTCA<br>TCATCTGTTCGCGCAGGCCAACAGCCTGGCTGTGGCTGTTATTGATGACGAACTT<br>GCGCTGACCGCTTCGGCAGACATCCGCTTTACCCGTCAGGTGAAACAAGGCGAG<br>CGCGTCGTAGCGAAAGCTAAAGTTACCGCGGTTGAGAAGGAAAAAGGTCGTAC<br>GGTTGTGGAAGTCAACTCATACGTCGGCGAAGAAATCGTGTTTTCAGGACGTTT<br>TGATATGTACCGCAGCAAACACAGCTAA |
| pSENSE2FFRM (SEQ ID NO: 26) | acggttatccacagaatcaggggataacgcaggaaagaacatgtgagcaaaaggccagcaaaaggccaggaaccgtaaaaagg<br>ccgcgttgctggcgttTTTCCATAGGCTCCGCCCCCCTGACGAGCATCACAAAAATCGAC<br>GCTCAAGTCAGAGGTGGCGAAACCCGACAGGACTATAAAGATACCAGGCGTTT<br>CCCCCTGGAAGCTCCCTCGTGCGCTCTCCTGTTCCGACCCTGCCGCTTACCGGAT<br>ACCTGTCCGCCTTTCTCCCTTCGGGAAGCGTGGCGCTTTCTCATAGCTCACGCTG<br>TAGGTATCTCAGTTCGGTGTAGGTCGTTCGCTCCAAGCTGGGCTGTGTGCACGA<br>ACCCCCCGTTCAGCCCGACCGCTGCGCCTTATCCGGTAACTATCGTCTTGAGTCC<br>AACCCGGTAAGACACGACTTATCGCCACTGGCAGCAGCCACTGGTAACAGGATT<br>AGCAGAGCGAGGTATGTAGGCGGTGCTACAGAGTTCTTGAAGTGGTGGCCTAAC<br>TACGGCTACACTAGAAGGACAGTATTTGGTATCTGCGCTCTGCTGAAGCCAGTT<br>ACCTTCGGAAAAAGAGTTGGTAGCTCTTGATCCGGCAAACAAACCACCGCTGGT<br>AGCGGTGGTTTTTTTGTTTGCAAGCAGCAGATTACGCGCAGAAAAAAAGGATCT<br>CAAgaagatcctttgatcttttctacggggtctgacgctcagtggaacgaaaactcacgttaagggattttggtcatgagattatcaaa<br>aaggatcttcacctagatccttttaaattaaaaatgaagttttaaatcaatctaaagtatCCATGGatatgagtaaacttggtctgaca<br>gttaccaatgcttaatcagtgaggcacctatctcagcgatctgtctatttcgttcatccatagttgcctgactccccgtcgtgtagataa<br>ctacgatacgggagggcttaccatctggccccagtgctgcaatgataccgcgagacccacgctcaccggctccagatttatcagcaata<br>aaccagccagccggaagggccgagcgcagaagtggtcctgcaactttatccgcctccatccagtctattaattgttgccgggaagct<br>agagtaagtagttcgccagttaatagtttgcgcaacgttgttgccattgctacaggcatcgtggtgtcacgctcgtcgtttggtatggct<br>tcattcagctccggttcccaacgatcaaggcgagttacatgatcccccatgttgtgcaaaaaagcggttagctccttcggtcctccgatc<br>gttgtcagaagtaagttggccgcagtgttatcactcatggttatggcagcactgcataattctcttactgtcatgccatccgtaagatgc<br>ttttctgtgactggtgagtactcaaccaagtcattctgagaatagtgtatgcggcgaccgagttgctcttgcccggcgtcaacacgggat<br>aataccgcgccacatagcagaactttaaaagtgctcatcattggaaaacgttcttcggggcgaaaactctcaaggatcttaccgctgag<br>agatccagttcgatgtaacccactcgtgcacccaactgatcttcagcatcttttactttcaccagcgtttctgggtgagcaaaaacagga<br>aggcaaaatgccgcaaaaaagggaataagggcgacacggaaatgttgaatactcatactcttcatttttcaatattattgaagcatttat<br>cagggttattgtctcatgagcggatacatatttgaatgtatttagaaaaataaacaaaaagaGCATGCgtttgtagaaacgcaaaa<br>aggccatccgtcaggatggccttctgcttaatttgatgcctggcagtttatggcgggcgtcctgcccgccaccctccgggccgttgctt<br>cgcaacgttcaaatccgctcccggcggatttgtcctactcaggagagcgttcaccgacaaacaacagataaaacgaaaggcccagt<br>ctttcgactgagcctttcgttttatttgatgcctggcagttccctactctcgcatggggagaccccacactaccatcggcgctacggcgtt<br>tcacttctgagttcggcatggggtcaggtgggaccaccgcgctactgccgccaggcaaattctgttttatcagaccgcttctgcgttct<br>gatttaatctgtatcaggctgaaaatcttctctcatccgccaaaacagccaagctggagaccgtttaaacgggcccaagcTTTTT<br>GTAGAGCTCATCCATGCCATGTGTAATCCCAGCAGCAGTTACAAACTCAAGAAG<br>GACCATGTGGTCACGCTTTTCGTTGGGATCTTTCGAAAGGACAGATTGTGTCGA<br>CAGGTAATGGTTGTCTGGTAAAAGGACAGGGCCATCGCCAATTGGAGTATTTTG<br>TTGATAATGGTCTGCTAGTTGAACGGAACCATCTTCAACGTTGTGGCGAATTTTG<br>AAGTTAGCTTTGATTCCATTCTTTTGTTTGTCTGCCGTGATGTATACATTGTGTGA<br>GTTAAAGTTGTACTCGAGTTTGTGTCCAAGAATGTTTCCATCTTCTTTAAAATCA<br>ATACCCTTTAACTCGATACGATTAACAAGGGTATCACCTTCAAACTTGACTTCAG |

-continued

CACGCGTCTTGTAGGTCCCGTCATCTTTGAAAGATATAGTGCGTTCCTGTACATA
ACCTTCGGGCATGGCACTCTTGAAAAAGTCATGCCGTTTCATGTGATCCGGATA
ACGGGAAAAGCATTGAACACCATAGGTCAGAGTAGTGACAAGTGTTGGCCACG
GAACAGGTAGTTTTCCAGTAGTGCAAATAAATTTAAGGGTGAGTTTTCCGTTTGT
AGCATCACCTTCACCCTCTCCACGGACAGAAAATTTGTGCCCATTAACATCACC
ATCTAATTCAACAAGAATTGGGACAACTCCAGTGAAAAGTTCTTCTCCTTTGCTC
ATACTAGTAACTCCTTAGCTGTTTCGGATGccggacaattaagactaggtactaatagtCCTAGGca
acatacgagccggaagcataaagtgtaaagcctggggtgcctaatgagtgagctaactcacattaattgcgagcgctctagatggtg
caaaacctttcgcggtatggcatgatagcgcccAACGATCCTCCACTCCGCGGCAAGGAGGTTGCC
ATatgcgccgcaacaaacgcgaacgtcaagagctgttacagcaaaccatccaggcgacgccgtttattaccgacgaagaattggc
aggtaagttcggcgtctcgattcagacaatccgtctggatcgtctggagttgtccattccggaattgcgtgaacgtattaaaaacgtcgc
cgaaaagacgttagaagacgaggtgaaatctttatcattggacgaggtaattggcgaaattattgaccttgaattagacgaccaggcta
tttcaattttggagattaaacaggaacacgtgttcagtcgtaaccagatcgcccgcggtcatcatctgttcgcgcaggccaacagcctg
gctgtggctgttattgatgacgaacttgcgctgaccgcttcggcagacatccgctttacccgtcaggtgaaacaaggcgagcgcgtc
gtagcgaaagctaaagttaccgcggttgagaaggaaaaaggtcgtacggttgtggaagtcaactcatacgtcggcgaagaaatcgt
gttttcaggacgttttgatatgtaccgcagcaaacacagctaaGGTACCATTTTGTTTAACTTTAAGAAGGA
GATATACCATGAACGCGAATCTGTTTGCCCGTTTGTTCGACAAACTGGATGATC
CCCATAAATTGGCCATTGAGACAGCAGCCGGCGACAAGATCTCGTATGCGGAAC
TGGTAGCTCGTGCAGGTCGTGTCGCAAACGTTCTTGTTGCTCGCGGACTGCAAG
TAGGCGACCGCGTGGCAGCACAGACAGAAAAGTCAGTTGAGGCCCTTGTATTAT
ATCTTGCCACAGTACGTGCAGGAGGTGTCTACTTACCACTGAACACTGCGTATA
CGCTGCACGAACTGGATTATTTCATTACGGACGCTGAGCCAAAGATCGTTGTGT
GCGATCCTTCTAAACGTGATGGGATTGCCGCAATTGCTGCTAAAGTGGGTGCTA
CTGTGGAGACATTAGGCCCCGATGGCCGTGGCTCATTAACTGACGCGGCGGCGG
GAGCATCTGAAGCGTTTGCTACAATCGACCGCGGGGCAGATGATCTGGCGGCCA
TTTTATACACCTCTGGGACTACAGGGCGCTCCAAAGGTGCTATGCTGTCACACG
ATAATCTTGCCAGCAACTCATTAACCCTGGTAGACTATTGGCGTTTCACTCCCGA
TGACGTACTTATCCATGCACTTCCCATCTATCATACCCATGGGTTGTTCGTCGCC
TCCAACGTTACTTTATTCGCCCGTGGCAGCATGATCTTCCTGCCCAAGTTCGACC
CTGATAAGATCCTGGATCTTATGGCACGCGCAACAGTTTTGATGGGTGTACCTA
CATTCTATACCCGCTTATTACAATCACCGCGCTTAACGAAAGAAACCACGGGAC
ACATGCGCCTTTTCATTTCCGGCTCGGCCCCACTTTTGGCAGATACGCACCGTGA
ATGGTCTGCGAAGACCGGGCACGCAGTTTTGGAACGTTATGGTATGACTGAGAC
CAATATGAATACCAGCAACCCGTATGACGGAGACCGCGTGCCTGGTGCAGTGG
GGCCTGCCCTGCCCGGTGTAAGTGCACGTGTCACGGACCCGGAGACTGGCAAGG
AGTTACCGCGTGGGGATATTGGTATGATCGAAGTCAAGGGTCCAAACGTCTTTA
AAGGCTATTGGCGTATGCCAGAAAAAACTAAATCAGAATTCCGTGACGATGGTT
TTTTTATTACCGGCGACCTGGGTAAAATCGATGAACGTGGTTATGTTCATATCCT
TGGCCGCGGTAAAGACCTTGTTATTACTGGTGGGTTCAACGTATATCCGAAAGA
AATTGAATCAGAGATTGACGCAATGCCGGGGGTAGTAGAGTCAGCGGTCATTG
GGGTCCCGCACGCGGACTTTGGTGAAGGTGTTACCGCCGTCGTTGTACGCGACA
AGGGAGCCACAATCGATGAGGCTCAAGTTTTGCATGGATTGGACGGTCAGTTAG
CCAAATTTAAAATGCCGAAAAAAGTTATCTTCGTGGATGATTTGCCACGCAACA
CCATGGGGAAGGTGCAGAAAAATGTCTTGCGTGAGACTTACAAAGACATCTATA
AGTAAGCGGCCGCgtgtgcagagtccctgcggcaggcgacgaacacgaccgtcgtcgattagtaccggtacggtcgg
tggtatcgaagtcttgatcactgtacactagaggtaat MatC_ pCDFDuet (SEQ ID NO: 27)

GGGGAATTGTGAGCGGATAACAATTCCCCTGTAGAAATAATTTTGTTTAACTTT
AATAAGGAGATATACCATGAGCAACCACCTGTTTGACGCTATGCGTGCGGCGGC
TCCGGGTGATGCCCCGTTTATCCGTATCGACAATGCTCGTACCTGGACCTACGAT
GACGCAATTGCGCTGAGCGGTCGTATTGCCGGTGCAATGGATGCACTGGGCATT
CGTCCGGGTGACCGCGTTGCTGTCCAGGTGGAAAAATCTGCAGAAGCTCTGATC
CTGTATCTGGCGTGCCTGCGTACCGGTGCCGTGTATCTGCCGCTGAACACCGCGT
ACACGCTGGCCGAACTGGATTATTTTATTGGCGACGCAGAACCGCGTCTGGTGG
TTGTTGCTCCGGCCGCACGCGGCGGTGTCGAAACGATTGCGAAACGTCATGGTG
CCATCGTGGAAACCCTGGATGCGGACGGCCGTGGTAGTCTGCTGGATCTGGCAC
GCGACGAACCGGCTGATTTCGTGGACGCAAGCCGCTCTGCTGATGACCTGGCAG
CTATTCTGTACACGAGCGGCACCACGGGTCGTTCTAAAGGCGCGATGCTGACCC
ATGGTAACCTGCTGTCCAATGCCCTGACGCTGCGTGATTATTGGCGCGTTACCGC
GGATGACCGCCTGATTCACGCCCTGCCGATCTTTCATACCCACGGTCTGTTCGTT
GCCACCAATGTGACCCTGCTGGCCGGTGCCTCAATGTTTCTGCTGTCGAAATTCG
ATGCCGACGAAGTTGTTAGTCTGATGCCGCAGGCAACGATGCTGATGGGCGTTC
CGACCTTTTACGTCCGTCTGCTGCAAAGTCCGCGCCTGGAAAAAGGTGCAGTGG
CTTCCATTCGTCTGTTTATCAGTGGTTCCGCCCCGCTGCTGGCGGAAACCCATGC
AGAATTCCACGCTCGTACCGGTCACGCGATTCTGGAACGCTACGGCATGACCGA
AACGAACATGAATACGTCTAACCCGTATGAAGGTAAACGCATCGCAGGCACCG
TTGGTTTTCCGCTGCCGGATGTTACCGTCCGTGTGACCGACCCGGCAACCGGTCT
GGTGCTGCCGCCGGAAGAAACCGGCATGATCGAAATCAAAGGTCCGAACGTTTT
CAAAGGCTACTGGCGCATGCCGGAAAAAACGGCGGCCGAATTCACCGCGGATG
GCTTTTTCATTAGCGGCGATCTGGGTAAAATCGACCGCGAAGGCTATGTTCATA
TTGTCGGCCGTGGTAAAGATCTGGTTATTTCAGGCGGTTATAACATCTACCCGA
AAGAAGTCGAAGGTGAAATTGATCAAATCGAAGGCGTCGTGGAATCGGCGGTG
ATTGGTGTTCCGCACCCGGATTTTGGCGAAGGTGTGACCGCGGTTGTCGTGTGT
AAACCGGGCGCCGTGCTGGATGAAAAAACCATCGTTAGCGCACTGCAGGATCG
TCTGGCTCGCTATAAACAACCGAAACGCATTATCTTCGCCGATGACCTGCCGCG
TAATACCATGGGCAAAGTCCAGAAAAACATCCTGCGTCAGCAATATGCGGACCT
GTACACCCGTCGCTAAAGCTTGCGGCCGCATAATGCTTAAGTCGAACAGAAAGT
AATCGTATTGTACACGGCCGCATAATCGAAATTAATACGACTCACTATAGGGGA
ATTGTGAGCGGATAACAATTCCCCATCTTAGTATATTAGTTAAGTATAAGAAGG

-continued

AGATATACATATGGGGATCGAGTTACTTGCAATTGGCCTGCTTGTAGCGATGTTT
ATTATCGCGACAATTCAGCCGATTAACATGGGCGCACTTGCCTTCGCCGGCGCC
TTCGTGTTGGGGTCGATGATCATCGGAATGAAGACCAGTGACATTTTTGCCGGC
TTCCCATCAGACTTATTCCTGACCCTGGTGGCTGTAACCTACCTTTTTGCCATCG
CTCAAATTAACGGCACTATCGACTGGCTGGTGGAGTGTGCAGTACGTTTAGTCC
GCGGGCGTATCGGACTGATCCCTTGGGTCATGTTCTTAGTGGCGGCCATTATCAC
AGGGTTTGGAGCCTTGGGTCCCGCTGCAGTCGCCATTTTAGCCCCGGTTGCACTT
TCCTTCGCGGTGCAATACCGTATTCACCCCGTAATGATGGGCCTGATGGTCATTC
ATGGTGCCCAAGCTGGTGGTTTCAGTCCAATTAGCATTTACGGAGGAATCACAA
ATCAAATCGTAGCAAAAGCCGGCCTGCCGTTTGCGCCGACGTCCCTTTTTCTGTC
ATCATTTTTCTTCAATCTGGCGATTGCTGTTCTTGTATTCTTCGTGTTTGGGGGAG
CCCGTGTGATGAAGCAGGATCCTGCCAGTTTCGGCCCACTTCCTGAACTGCACC
CAGAGGGGGTCTCAGAAAGTATCCGCGGCCACGGAGGGACACCGGCCAAGCCT
ATTCGCGAACACGCATACGGGACTGCCGCAGACACCGCCACTTCATTACGTCTG
AATAATGAACGTATCACAACCCTGATCGGATTGACTGCGTTAGGTATCGGAGCT
TTAGTGTTTAAATTCAATGTCGGGCTTGTGGCAATGACCGTCGCCGTGGCACTTG
CGTTGTTGAGTCCAAAGACACAGAAGGCAGCAATTGACAAGGTGAGTTGGAGT
ACAGTTCTGTTAATTAGTGGGATCATTACTTATGTGGGTGTAATGGAAAAGGCG
GGCACAGTTGACTATGTTGCTAATGGTATTTCGAGCCTTGGAATGCCCCTGCTGG
TCGCATTACTGTTGTGTTTTACGGGGGCTATTGTCTCTGCCTTCGCGTCATCGAC
CGCCCTGTTGGGAGCGATTATTCCACTGGCTGTACCATTCCTTTTGCAAGGCCAC
GTGTCGGCAATTGGCGTCGTGGCAGCTATCGCTATTTCTACCACCATCGTAGAC
ACCAGCCCGTTCAGCACAAACGGAGCGCTGGTAGTAGCTAATGCTCCAGATGAT
CGCCGTGAACAAGTCTTGCGCCAACTTCTTATCTACTCAGCTCTGATCGCAATCA
TTGGTCCGATCGTTGCATGGTTCGTATTCGTAGTTAGTGGTCTGGTGTAAGCTGC
TGCCACCGCTGAGCAATAACTAGCATAACCCCTTGGGGCCTCTAAACGGGTCTT
GAGGGGTTTTTTGCTGAAACCTCAGGCATTTGAGAAGCACACGGTCACACTGCT
TCCGGTAGTCAATAAACCGGTAAACCAGCAATAGACATAAGCGGCTATTTAACG
ACCCTGCCCTGAACCGACGACCGGGTCATCGTGGCCGGATCTTGCGGCCCCTCG
GCTTGAACGAATTGTTAGACATTATTTGCCGACTACCTTGGTGATCTCGCCTTTC
ACGTAGTGGACAAATTCTTCCAACTGATCTGCGCGCGAGGCCAAGCGATCTTCT
TCTTGTCCAAGATAAGCCTGTCTAGCTTCAAGTATGACGGGCTGATACTGGGCC
GGCAGGCGCTCCATTGCCCAGTCGGCAGCGACATCCTTCGGCGCGATTTTGCCG
GTTACTGCGCTGTACCAAATGCGGGACAACGTAAGCACTACATTTCGCTCATCG
CCAGCCCAGTCGGGCGGCGAGTTCCATAGCGTTAAGGTTTCATTTAGCGCCTCA
AATAGATCCTGTTCAGGAACCGGATCAAAGAGTTCCTCCGCCGCTGGACCTACC
AAGGCAACGCTATGTTCTCTTGCTTTTGTCAGCAAGATAGCCAGATCAATGTCG
ATCGTGGCTGGCTCGAAGATACCTGCAAGAATGTCATTGCGCTGCCATTCTCCA
AATTGCAGTTCGCGCTTAGCTGGATAACGCCACGGAATGATGTCGTCGTGCACA
ACAATGGTGACTTCTACAGCGCGGAGAATCTCGCTCTCTCCAGGGGAAGCCGAA
GTTTCCAAAAGGTCGTTGATCAAAGCTCGCCGCGTTGTTTCATCAAGCCTTACGG
TCACCGTAACCAGCAAATCAATATCACTGTGTGGCTTCAGGCCGCCATCCACTG
CGGAGCCGTACAAATGTACGGCCAGCAACGTCGGTTCGAGATGGCGCTCGATG
ACGCCAACTACCTCTGATAGTTGAGTCGATACTTCGGCGATCACCGCTTCCCTCA
TACTCTTCCTTTTTCAATATTATTGAAGCATTTATCAGGGTTATTGTCTCATGAGC
GGATACATATTTGAATGTATTTAGAAAAATAAACAAATAGCTAGCTCACTCGGT
CGCTACGCTCCGGGCGTGAGACTGCGGCGGGCGCTGCGGACACATACAAAGTT
ACCCACAGATTCCGTGGATAAGCAGGGGACTAACATGTGAGGCAAAACAGCAG
GGCCGCGCCGGTGGCGTTTTTCCATAGGCTCCGCCCTCCTGCCAGAGTTCACATA
AACAGACGCTTTTCCGGTGCATCTGTGGGAGCCGTGAGGCTCAACCATGAATCT
GACAGTACGGGCGAAACCCGACAGGACTTAAAGATCCCCACCGTTTCCGGCGG
GTCGCTCCCTCTTGCGCTCTCCTGTTCCGACCCTGCCGTTTACCGGATACCTGTTC
CGCCTTTCTCCCTTACGGGAAGTGTGGCGCTTTCTCATAGCTCACACACTGGTAT
CTCGGCTCGGTGTAGGTCGTTCGCTCCAAGCTGGGCTGTAAGCAAGAACTCCCC
GTTCAGCCCGACTGCTGCGCCTTATCCGGTAACTGTTCACTTGAGTCCAACCCGG
AAAAGCACGGTAAAACGCCACTGGCAGCAGCCATTGGTAACTGGGAGTTCGCA
GAGGATTTGTTTAGCTAAACACGCGGTTGCTCTTGAAGTGTGCGCCAAAGTCCG
GCTACACTGGAAGGACAGATTTGGTTGCTGTGCTCTGCGAAAGCCAGTTACCAC
GGTTAAGCAGTTCCCCAACTGACTTAACCTTCGATCAAACCACCTCCCCAGGTG
GTTTTTTCGTTTACAGGGCAAAAGATTACGCGCAGAAAAAAAGGATCTCAAGAA
GATCCTTTGATCTTTTCTACTGAACCGCTCTAGATTTCAGTGCAATTTATCTCTTC
AAATGTAGCACCTGAAGTCAGCCCCATACGATATAAGTTGTAATTCTCATGTTA
GTCATGCCCCGCGCCCACCGGAAGGAGCTGACTGGGTTGAAGGCTCTCAAGGGC
ATCGGTCGAGATCCCGGTGCCTAATGAGTGAGCTAACTTACATTAATTGCGTTG
CGCTCACTGCCCGCTTTCCAGTCGGGAAACCTGTCGTGCCAGCTGCATTAATGA
ATCGGCCAACGCGCGGGGAGAGGCGGTTTGCGTATTGGGCGCCAGGGTGGTTTT
TCTTTTCACCAGTGAGACGGGCAACAGCTGATTGCCCTTCACCGCCTGGCCCTG
AGAGAGTTGCAGCAAGCGGTCCACGCTGGTTTGCCCCAGCAGGCGAAAATCCTG
TTTGATGGTGGTTAACGGCGGGATATAACATGAGCTGTCTTCGGTATCGTCGTAT
CCCACTACCGAGATGTCCGCACCAACGCGCAGCCCGGACTCGGTAATGGCGCGC
ATTGCGCCCAGCGCCATCTGATCGTTGGCAACCAGCATCGCAGTGGGAACGATG
CCCTCATTCAGCATTTGCATGGTTTGTTGAAAACCGGACATGGCACTCCAGTCGC
CTTCCCGTTCCGCTATCGGCTGAATTTGATTGCGAGTGAGATATTTATGCCAGCC
AGCCAGACGCAGACGCGCCGAGACAGAACTTAATGGGCCCGCTAACAGCGCGA
TTTGCTGGTGACCCAATGCGACCAGATGCTCCACGCCCAGTCGCGTACCGTCTTC
ATGGGAGAAAATAATACTGTTGATGGGTGTCTGGTCAGAGACATCAAGAAATA
ACGCCGGAACATTAGTGCAGGCAGCTTCCACAGCAATGGCATCCTGGTCATCCA
GCGGATAGTTAATGATCAGCCCACTGACGCGTTGCGCGAGAAGATTGTGCACCG
CCGCTTTACAGGCTTCGACGCCGCTTCGTTCTACCATCGACACCACCACGCTGGC

-continued

| | |
|---|---|
| | ACCCAGTTGATCGGCGCGAGATTTAATCGCCGCGACAATTTGCGACGGCGCGTG<br>CAGGGCCAGACTGGAGGTGGCAACGCCAATCAGCAACGACTGTTTGCCCGCCA<br>GTTGTTGTGCCACGCGGTTGGGAATGTAATTCAGCTCCGCCATCGCCGCTTCCAC<br>TTTTTCCCGCGTTTTCGCAGAAACGTGGCTGGCCTGGTTCACCACGCGGGAAAC<br>GGTCTGATAAGAGACACCGGCATACTCTGCGACATCGTATAACGTTACTGGTTT<br>CACATTCACCACCCTGAATTGACTCTCTTCCGGGCGCTATCATGCCATACCGCGA<br>AAGGTTTTGCGCCATTCGATGGTGTCCGGGATCTCGACGCTCTCCCTTATGCGAC<br>TCCTGCATTAGGAAATTAATACGACTCACTATA |

| Construct | Amino Acid Sequence |
|---|---|
| FapR_2H8_ F99L mutant (SEQ ID NO: 28) | MRRNKRERQELLQQTIQATPFITDEELAGKFGVSIQTIRLDRLELSIPELRERIKNVAE<br>KTLEDEVKSLSLDEVIGEIIDLELDDQAISILEIKQEHV**L**SRNQIARGHHLFAQANSLA<br>VAVIDDELALTASADIRFTRQVKQGERVVAKAKVTAVEKEKGRTVVEVNSYVGEEI<br>VFSGRFDMYRSKHS* |
| FapR_2H8 (SEQ ID NO: 29) | MRRNKRERQELLQQTIQATPFITDEELAGKFGVSIQTIRLDRLELSIPELRERIKNVAE<br>KTLEDEVKSLSLDEVIGEIIDLELDDQAISILEIKQEHV**F**SRNQIARGHHLFAQANSLA<br>VAVIDDELALTASADIRFTRQVKQGERVVAKAKVTAVEKEKGRTVVEVNSYVGEEI<br>VFSGRFDMYRSKHS* |

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

We claim:

1. A biosensor system comprising:

a first nucleic acid comprising a genetically modified fatty acid biosynthetic pathway repressor (fapR) gene, wherein the nucleic acid comprises at least one genetic mutation and at least 85% sequence identity to SEQ ID NO: 24 when compared to the wild-type fapR gene, wherein the first nucleic acid is operably linked to a first promoter, and wherein the genetically modified fapR gene encodes a fapR transcription factor comprising a F99L amino acid substitution when compared to SEQ ID NO:29; and a second nucleic acid comprising a reporter gene whose transcription is under the control of a second promoter which is regulated by the fapR transcription factor.

2. The biosensor system of claim 1, wherein the first nucleic acid and the second nucleic acid are located on one recombinant DNA vector.

3. The biosensor system of claim 1, wherein the first nucleic acid and second nucleic acid do not comprise a lactose repressor binding site (lacO) sequence.

4. The biosensor system of claim 1, wherein the first nucleic acid comprises a first ribosome binding site.

5. The biosensor system of claim 1, wherein the second nucleic acid comprises a second ribosome binding site and a fapR repressor binding site (fapO) operator.

6. The biosensor system of claim 1, wherein the first promoter and the second promoter initiate transcription in opposite directions.

7. The biosensor system of claim 1, wherein the first promoter and the second promoter initiate transcription in the same direction.

8. The biosensor system of claim 1, wherein the first ribosome binding site sequence is TAVRCAGGH (SEQ ID NO:2); wherein V is A, C, or G; wherein R is A or G; and wherein His A, C, or T.

9. The biosensor system of claim 1, wherein the first ribosome binding site sequence is selected from the group consisting of SEQ ID NO:3, SEQ ID NO: 4, SEQ ID NO:5, SEQ ID NO:6, SEQ ID NO:7, SEQ ID NO:8, SEQ ID NO:9, SEQ ID NO: 10, SEQ ID NO:11, SEQ ID NO: 12, SEQ ID NO:13, SEQ ID NO: 14, SEQ ID NO: 15, SEQ ID NO:16, SEQ ID NO:17, SEQ ID NO:18, SEQ ID NO:19, and SEQ ID NO: 20.

10. The biosensor system of claim 1, wherein the wild-type fapR gene comprises the polynucleotide sequence of SEQ ID NO:25.

11. The biosensor system of claim 1, wherein the fapR transcription factor comprises an amino acid sequence of SEQ ID NO: 28.

12. The biosensor system of claim 1, wherein the genetically modified fapR gene comprises the polynucleotide sequence of SEQ ID NO:24.

13. The biosensor system of claim 1, wherein the genetically modified fapR gene confers detection of one or more polyketide synthase extender units.

14. The biosensor system of claim 13, wherein the one or more polyketide synthase extender units comprise malonyl-CoA or a derivative thereof.

15. The biosensor system of claim 14, wherein the derivative comprises methylmalonyl-CoA or propargylmalonyl-CoA.

16. The biosensor system of any one of claim 1, wherein the reporter gene comprises a gene encoding for chloramphenicol acetyltransferase, beta-galactosidase, luciferase, or a fluorescent protein.

17. A method for detecting one or more polyketide synthase extender units, said method comprising:

introducing into a cell a recombinant DNA vector comprising:

a first nucleic acid comprising a genetically modified fatty acid biosynthetic pathway repressor (fapR) gene, wherein the nucleic acid comprises at least one genetic mutation and at least 85% sequence identity to SEQ ID NO: 24 when compared to the wild-type fapR gene, and wherein the first nucleic acid is operably linked to a first promoter, and wherein the genetically modified fapR gene encodes a fapR transcription factor comprising a F99L amino acid substitution when compared to SEQ ID NO:29; and a second nucleic acid comprising a reporter gene whose transcription is under the control of a second promoter which is regulated by the fapR transcription factor; and measuring the one or more polyketide synthase extender units based on the expression of the reporter gene in the cell.

* * * * *